(12) United States Patent
Tang et al.

(10) Patent No.: US 12,168,385 B2
(45) Date of Patent: Dec. 17, 2024

(54) THERMAL MANAGEMENT SYSTEM FOR AUTOMOBILE AND THERMAL MANAGEMENT METHOD BASED ON SAME

(71) Applicant: Huawei Technologies Co., Ltd., Shenzhen (CN)

(72) Inventors: Weier Tang, Shenzhen (CN); Haomang Hu, Shanghai (CN); Liguan Lin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 383 days.

(21) Appl. No.: 17/677,013

(22) Filed: Feb. 22, 2022

(65) Prior Publication Data

US 2022/0176774 A1 Jun. 9, 2022

Related U.S. Application Data

(63) Continuation of application No. PCT/CN2020/110631, filed on Aug. 21, 2020.

(30) Foreign Application Priority Data

Aug. 23, 2019 (CN) .......................... 201910789070.2

(51) Int. Cl.
*B60H 1/32* (2006.01)
*B60H 1/00* (2006.01)
*B60K 1/00* (2006.01)

(52) U.S. Cl.
CPC ..... *B60H 1/00278* (2013.01); *B60H 1/00392* (2013.01); *B60H 1/00485* (2013.01);
(Continued)

(58) Field of Classification Search
CPC ............ B60H 1/00278; B60H 1/00392; B60H 1/00485; B60H 1/3227; B60H 1/00271;
(Continued)

(56) References Cited

U.S. PATENT DOCUMENTS 10,252,599 B2 4/2019 Kim et al.
10,279,647 B2 5/2019 Tasiopoulos et al.
(Continued)

FOREIGN PATENT DOCUMENTS

CN 103287252 A 9/2013
CN 103625242 A 3/2014
(Continued)

OTHER PUBLICATIONS

English translation of Wu et al. (CN 103625242 A). (Year: 2014).*
(Continued)

*Primary Examiner* — Miguel A Diaz
(74) *Attorney, Agent, or Firm* — Conley Rose, P.C.

(57) ABSTRACT

A thermal management system includes a refrigerant loop system that includes a compressor, a refrigerant four-way reversing valve, a plate heat exchanger, a throttle valve, another plate heat exchanger, and a gas-liquid separator, to form a refrigerant loop, and a motor liquid cooling loop system includes a motor liquid cooling loop that circulates coolant through a motor, and a pipe in the motor liquid cooling loop is connected to a liquid cooling channel in the plate heat exchanger to exchange heat with the refrigerant loop system using the plate heat exchanger.

20 Claims, 24 Drawing Sheets

(52) U.S. Cl.
CPC . *B60H 1/3227* (2013.01); *B60H 2001/00307* (2013.01); *B60K 2001/006* (2013.01)

(58) Field of Classification Search
CPC .............. B60H 1/3228; B60H 1/32284; B60H 2001/00307; B60K 2001/006
See application file for complete search history.

(56) References Cited

U.S. PATENT DOCUMENTS

| | | | |
|---|---|---|---|
| 2008/0223064 | A1 | 9/2008 | Feuerecker et al. |
| 2009/0241573 | A1 | 10/2009 | Ikegami et al. |
| 2012/0174602 | A1* | 7/2012 | Olivier ............... B60H 1/32284 62/238.1 |
| 2012/0183815 | A1* | 7/2012 | Johnston ................. B60L 58/26 429/50 |
| 2012/0222441 | A1 | 9/2012 | Sawada et al. |
| 2012/0297809 | A1 | 11/2012 | Carpenter |
| 2015/0314669 | A1 | 11/2015 | Noda |
| 2016/0107501 | A1* | 4/2016 | Johnston ............ B60H 1/00278 165/41 |
| 2016/0318373 | A1 | 11/2016 | Kang et al. |
| 2016/0344075 | A1 | 11/2016 | Blatchley et al. |
| 2016/0361974 | A1 | 12/2016 | Porras et al. |
| 2017/0182864 | A1 | 6/2017 | Heyl |
| 2017/0274727 | A1 | 9/2017 | Tasiopoulos et al. |
| 2018/0072130 | A1 | 3/2018 | Kim |
| 2018/0117986 | A1 | 5/2018 | Kim et al. |
| 2018/0117991 | A1 | 5/2018 | Kim et al. |
| 2018/0178615 | A1 | 6/2018 | Xia et al. |
| 2018/0264913 | A1 | 9/2018 | Enomoto et al. |
| 2018/0361828 | A1 | 12/2018 | Kato et al. |
| 2019/0016230 | A1 | 1/2019 | Wang et al. |
| 2019/0030989 | A1 | 1/2019 | Miura et al. |
| 2019/0210427 | A1 | 7/2019 | Lee et al. |
| 2019/0241093 | A1 | 8/2019 | Shimauchi et al. |
| 2019/0255910 | A1 | 8/2019 | Kuroda et al. |

FOREIGN PATENT DOCUMENTS

| | | |
|---|---|---|
| CN | 104999890 A | 10/2015 |
| CN | 205130860 U | 4/2016 |
| CN | 105682955 A | 6/2016 |
| CN | 106004337 A | 10/2016 |
| CN | 107020915 A | 8/2017 |
| CN | 107444060 A | 12/2017 |
| CN | 107599782 A | 1/2018 |
| CN | 107791783 A | 3/2018 |
| CN | 108016235 A | 5/2018 |
| CN | 108116192 A | 6/2018 |
| CN | 108407568 A | 8/2018 |
| CN | 108461868 A | 8/2018 |
| CN | 108482067 A | 9/2018 |
| CN | 108779942 A | 11/2018 |
| CN | 109572367 A | 4/2019 |
| CN | 109649119 A | 4/2019 |
| CN | 109910590 A | 6/2019 |
| CN | 109968940 A | 7/2019 |
| DE | 60319291 T2 | 2/2009 |
| DE | 102016000316 A1 | 7/2017 |
| EP | 1261053 A1 | 11/2002 |
| FR | 2965516 A1 | 4/2012 |
| JP | H07329544 A | 12/1995 |
| JP | 2008006894 A | 1/2008 |
| JP | 2013500903 A | 1/2013 |
| JP | 2014131914 A | 7/2014 |
| JP | 2016144963 A | 8/2016 |
| JP | 2017171245 A | 9/2017 |
| JP | 2019085102 A | 6/2019 |
| WO | 2014087645 A1 | 6/2014 |
| WO | 2014143621 A1 | 9/2014 |

OTHER PUBLICATIONS

Tong Lirui et al., "Advances of electric vehicle air conditioning systems," Refrigeration, 2015, with an English abstract, 7 pages.
Li Hongliang, "China Chemical Equipment Product Manual," Chemical Industry Press, May 2001, with an English abstract, 5 pages.
Wang Zhiyi et al., "Three Problems During the Test and Adjustment of Air-Cooled Heat-Pump Air Conditioning System," Refrigeration and Air Conditioning, vol. 2, No. 1, Feb. 2002, with an English abstract, 3 pages.

* cited by examiner

THERMAL MANAGEMENT SYSTEM FOR AUTOMOBILE AND THERMAL MANAGEMENT METHOD BASED ON SAME

CROSS-REFERENCE TO RELATED APPLICATIONS

This is a continuation of International Patent Application No. PCT/CN2020/110631 filed on Aug. 21, 2020, which claims priority to Chinese Patent Application No. 201910789070.2 filed on Aug. 23, 2019. The disclosures of the aforementioned applications are hereby incorporated by reference in their entireties.

TECHNICAL FIELD

Embodiments of this disclosure relates to automobile thermal management technologies, and furthermore, to a thermal management system for an automobile and a thermal management method based on the system.

BACKGROUND

An electric vehicle is usually driven by an electric machinery. This poses a challenge to heating function of an air-conditioning system of the vehicle. An air conditioner in the electric vehicle usually heating by using an electric heating device. However, the electric heating device has low heat efficiency with high power consumption. Therefore, the electric heating device is not economical for the electric vehicle. Because a heat pump technology has relatively high heating efficiency, more vehicle manufacturers tend to use the heat pump technology to improve power economy of the air-conditioning system of the electric vehicle.

At present, a condenser used in a vehicle heat pump air-conditioning system is mainly a parallel-flow heat exchanger. The parallel-flow heat exchanger usually utilizes air as a heat transfer medium. By introducing air, the parallel-flow heat exchanger forces air flowing through modules in the heat exchanger to dissipate heat. The parallel-flow heat exchanger usually includes a fan, an air intake/exhaust channel, and the like. The parallel-flow heat exchanger has a relatively large size, and has a relatively high requirement for an air volume. Therefore, it is difficult to integrate the parallel-flow heat exchanger with other components, such as a compressor, a throttle device, a water pump, and a valve, in a thermal management system in the vehicle. Therefore, the parallel-flow heat exchanger is usually installed outside a front compartment of the vehicle for better contacting with air. However, the other components in the thermal management system are usually distributed in various installation positions of the front compartment of the vehicle. This leads to complex manifold in the thermal management system, and is not conducive to saving front compartment space and reducing costs of the thermal management system.

SUMMARY

Embodiments of this application provide a thermal management system for a vehicle and a thermal management method based on the system, to help save front compartment space of the vehicle and reduce costs of the thermal management system.

According to a first aspect, this application provides a thermal management system for a vehicle, including a refrigerant loop system, a motor liquid cooling loop system, and an air conditioner liquid cooling loop system. The refrigerant loop system includes a compressor (1), a refrigerant four-way reversing valve (2), a plate heat exchanger (3), a throttle valve (4), a plate heat exchanger (5), and a gas-liquid separator (6). An outlet of the compressor (1) is connected to a first end of the refrigerant four-way reversing valve (2) by using a pipe, a second end of the refrigerant four-way reversing valve (2) is connected to a first end of a refrigerant channel in the plate heat exchanger (3), a second end of the refrigerant channel in the plate heat exchanger (3) is connected to a first end of the throttle valve (4), a second end of the throttle valve (4) is connected to a first end of a refrigerant channel in the plate heat exchanger (5), a second end of the refrigerant channel in the plate heat exchanger (5) is connected to a third end of the refrigerant four-way reversing valve (2), a fourth end of the refrigerant four-way reversing valve (2) is connected to a first end of the gas-liquid separator (6), and a second end of the gas-liquid separator (6) is connected to an inlet of the compressor (1), to form a refrigerant loop.

The motor liquid cooling loop system includes a motor liquid cooling loop that circulates coolant through a motor, pipes in the motor liquid cooling loop are respectively connected to a first end and a second end of a liquid cooling channel in the plate heat exchanger (3), and the motor liquid cooling loop system and the refrigerant loop system exchange heat by using the plate heat exchanger (3).

The air conditioner liquid cooling loop system includes an air conditioner liquid cooling loop that circulates coolant through a heating, ventilation and air conditioning (HVAC) unit, pipes in the air conditioner liquid cooling loop are respectively connected to a first end and a second end of a liquid cooling channel in the plate heat exchanger (5), and the air conditioner liquid cooling loop system and the refrigerant loop system exchange heat by using the plate heat exchanger (5).

The thermal management system in this embodiment of this application may be applied to a conventional energy vehicle (an internal combustion engine vehicle), or may be applied to a new energy vehicle (for example, an electric vehicle or a hybrid vehicle).

It can be learned that in this embodiment of this application, the refrigerant four-way reversing valve is used to simplify the loop of the refrigerant loop system. The two plate heat exchangers are used, so that a refrigerant in the refrigerant loop can exchange heat with the coolant in the motor liquid cooling loop by using the plate heat exchanger (3), and exchange heat with the coolant in the air conditioner liquid cooling loop by using the plate heat exchanger (5), and/or exchange heat with the coolant in the battery liquid cooling loop by using the plate heat exchanger (5). Therefore, use of a parallel-flow heat exchanger is avoided. Because the plate heat exchanger has a relatively small volume, the thermal management system can be configured as an integrated structure by using the plate heat exchanger and according to a coolant heat exchange method. Therefore, this embodiment of this application helps reduce space occupied by a front compartment in the thermal management system, and also helps reduce costs of the thermal management system.

According to the first aspect, in a possible implementation, the thermal management system further includes a battery liquid cooling loop system. The battery liquid cooling loop system includes a battery liquid cooling loop that circulates coolant through a battery pack. The battery liquid cooling loop uses the same pipes as the air conditioner liquid cooling loop system to connect to the first end and the second end of the liquid cooling channel in the plate heat exchanger (5). The battery liquid cooling loop system and the refrigerant loop system exchange heat by using the plate heat exchanger (5).

The thermal management system in this embodiment of this application may be applied to a new energy vehicle (for example, an electric vehicle or a hybrid vehicle).

It can be learned that in this embodiment of this application, the refrigerant four-way reversing valve is used to simplify the loop of the refrigerant loop system. The two plate heat exchangers are used, so that a refrigerant in the refrigerant loop can exchange heat with the coolant in the motor liquid cooling loop by using the plate heat exchanger (3), and exchange heat with the coolant in the air conditioner liquid cooling loop by using the plate heat exchanger (5), and/or exchange heat with the coolant in the battery liquid cooling loop by using the plate heat exchanger (5). Therefore, use of a parallel-flow heat exchanger is avoided. Because the plate heat exchanger has a relatively small volume, a structural integration solution and an electronic control integration solution of the thermal management system can be implemented by using the plate heat exchanger and according to a coolant heat exchange method. Therefore, this embodiment of this application helps reduce space occupied by a front compartment in the thermal management system, and also helps reduce costs of the thermal management system.

According to the first aspect, in a possible implementation, the motor liquid cooling loop system includes a multi-functional valve (8), a power device (9), a motor controller (10), a motor (11), a radiator heat exchanger (12), and an integrated valve (14). The multi-functional valve (8), the power device (9), the motor controller (10), the motor (11), the radiator heat exchanger (12), and the integrated valve (14) are serially connected, the multi-functional valve (8) is further connected to the first end of the liquid cooling channel of the plate heat exchanger (3), the integrated valve (14) is further connected to the second end of the liquid cooling channel of the plate heat exchanger (3), and the motor (11) is further directly connected to the integrated valve (14).

The multi-functional valve (8) is configured to implement a water pump function, a water flow reversing function, and a water storage function, and the integrated valve (14) is configured to implement the water flow reversing function.

According to the first aspect, in a possible implementation, the air conditioner liquid cooling loop system includes an air conditioner heat exchanger (21) and an integrated valve pump (15), the air conditioner heat exchanger (21) is connected to the integrated valve pump (15), the air conditioner heat exchanger (21) is further connected to the first end of the liquid cooling channel of the plate heat exchanger (5), and the integrated valve pump (15) is further connected to the second end of the liquid cooling channel of the plate heat exchanger (5).

According to the first aspect, in a possible implementation, the battery liquid cooling loop system includes a battery pack (16), an electric heater (17), and the integrated valve pump (15). The battery pack (16), the electric heater (17), and the integrated valve pump (15) are serially connected, the battery pack (16) is further connected to the first end of the liquid cooling channel of the plate heat exchanger (5), the integrated valve pump (15) is further connected to the second end of the liquid cooling channel of the plate heat exchanger (5), and the integrated valve pump (15) is configured to implement the water pump function and the water flow reversing function.

According to the first aspect, in a possible implementation, the thermal management system may further include a warm-air liquid cooling loop system, the warm-air liquid cooling loop system includes a warm-air liquid cooling loop that circulates coolant through a heater core (20), and the warm-air liquid cooling loop includes an integrated kettle pump (18), an electric heater (19), and the heater core (20). The integrated kettle pump (18), the electric heater (19), and the heater core (20) included in the warm-air liquid cooling loop are serially connected, and the integrated kettle pump (18) is configured to implement the water pump function and the water storage function.

According to the first aspect, in a possible implementation, the integrated kettle pump (18) includes an expansion kettle (18-1) and a water pump (18-2). The expansion kettle (18-1) is connected to the water pump (18-2), the expansion kettle (18-1) is further connected to the heater core (20), and the water pump (18-2) is further connected to the electric heater (19).

According to the first aspect, in a possible implementation, the multi-functional valve (8) is an integrated body including a water pump (8-1), an expansion kettle (8-2), and a water path three-way valve (8-3). A first end of the water path three-way valve (8-3) is connected to the expansion kettle (8-2), a second end of the water path three-way valve (8-3) is connected to the battery pack (16), a third end of the water path three-way valve (8-3) is connected to the first end of the liquid cooling channel of the plate heat exchanger (3), the expansion kettle (8-2) is connected to the water pump (8-1), and the water pump (8-1) is connected to the power device (9).

According to the first aspect, in a possible implementation, the integrated valve (14) is an integrated body including a water path three-way valve (14-1) and a three-way water pipe. A first end of the water path three-way valve (14-1) is connected to the motor (11), a second end of the water path three-way valve (14-1) is connected to the radiator heat exchanger (12), a third end of the water path three-way valve (14-1) is connected to a first end of the three-way water pipe, a second end of the three-way water pipe is connected to the second end of the liquid cooling channel of the plate heat exchanger (3), and a third end of the three-way water pipe is connected to the integrated valve pump (15).

According to the first aspect, in a possible implementation, the integrated valve pump (15) is an integrated body including a water pump (15-1) and a water path three-way valve (15-2). The water pump (15-1) is separately connected to the second end of the liquid cooling channel of the plate heat exchanger (5) and a first end of the water path three-way valve (15-2), a second end of the water path three-way valve (15-2) is separately connected to the three-way water pipe of the integrated valve (14) and the electric heater (17), and a third end of the water path three-way valve (15-2) is connected to the air conditioner heat exchanger (21).

According to the first aspect, in a possible implementation, a plurality of plate heat exchangers (the plate heat exchanger (3) and the plate heat exchanger (5)), the refrigerant four-way reversing valve (2), and the throttle valve (4) may form an integrated body (7). A refrigerant temperature and pressure sensor can be deployed on the pipes that connect the integrated elements.

According to the first aspect, in a possible implementation, at least one of the integrated body (7), the integrated kettle pump (18), the multi-functional valve (8), the integrated valve (14), and the integrated valve pump (15) is structurally configured as an integrated structure.

According to the first aspect, in a possible implementation, the integrated body (7), the integrated kettle pump (18), the multi-functional valve (8), the integrated valve (14), and the integrated valve pump (15) may be jointly integrated into a thermal management integration module.

It can be learned that in this application, structures of installation positions of thermal management components are integrated, so that the installation volume of the thermal management system of the electric vehicle can be greatly reduced, and the occupied space can be saved. In addition, the battery and a passenger compartment can be operated within a proper temperature range under various working conditions, flow resistance in a cooling system can be reduced, and energy efficiency of the system can be improved.

According to a second aspect, an embodiment of this application provides a thermal management system for a vehicle, including: a refrigerant loop system, a motor liquid cooling loop system, and a warm-air liquid cooling loop system.

The refrigerant loop system includes a compressor (101), a plate heat exchanger (102), a throttle valve (103), a plate heat exchanger (104), a throttle valve (109), an air conditioner evaporator (110), and a gas-liquid separator (107), where the compressor (101), the plate heat exchanger (102), the throttle valve (103), the plate heat exchanger (104), the throttle valve (109), the air conditioner evaporator (110), and the gas-liquid separator (107) are serially connected to form a first refrigerant loop.

The motor liquid cooling loop system includes a motor liquid cooling loop that circulates coolant through a motor, pipes in the motor liquid cooling loop are respectively connected to a first end and a second end of a liquid cooling channel in the plate heat exchanger (104), and the motor liquid cooling loop system and the first refrigerant loop system exchange heat by using the plate heat exchanger (104).

The warm-air liquid cooling loop system includes a warm-air liquid cooling loop that circulates coolant through a heater core, pipes in the warm-air liquid cooling loop are respectively connected to a first end and a second end of a liquid cooling channel in the plate heat exchanger (102), and the warm-air liquid cooling loop system and the first refrigerant loop system exchange heat by using the plate heat exchanger (102).

It can be learned that in this embodiment of this application, when the refrigerant four-way valve is not used, the loop of the refrigerant loop system is simplified, and when the refrigerant loop has only one flow direction, a cooling function and/or a heating function are/is implemented on the passenger compartment by using a heat pump air-conditioning system. The two plate heat exchangers are used, so that refrigerant in the refrigerant loop can exchange heat with the coolant in the motor liquid cooling loop by using the plate heat exchanger (104), and exchange heat with the coolant in the warm-air liquid cooling loop by using the plate heat exchanger (102). Therefore, use of a parallel-flow heat exchanger is avoided. Because the plate heat exchanger has a relatively small volume, the thermal management system can be configured as an integrated structure by using the plate heat exchanger and according to a coolant heat exchange method. Therefore, this embodiment of this application helps reduce space occupied by a front compartment in the thermal management system, and also helps reduce costs of the thermal management system.

According to the second aspect, in a possible implementation, an outlet of the compressor (101) is connected to a first end of a refrigerant channel in the plate heat exchanger (102) by using a pipe, a second end of the refrigerant channel in the plate heat exchanger (102) is connected to a first end of the throttle valve (103), a second end of the throttle valve (103) is connected to a first end of a refrigerant channel in the plate heat exchanger (104), a second end of the refrigerant channel in the plate heat exchanger (104) is connected to a first end of the throttle valve (109), a second end of the throttle valve (109) is connected to a first end of the air conditioner evaporator (110), a second end of the air conditioner evaporator (110) is connected to a first end of the gas-liquid separator (107), and a second end of the gas-liquid separator (107) is connected to an inlet of the compressor (101).

According to the second aspect, in a possible implementation, the thermal management system further includes a battery liquid cooling loop system, and the refrigerant loop system further includes a refrigerant branch.

The refrigerant branch includes a throttle valve (105) and a plate heat exchanger (106), and the compressor (101), the plate heat exchanger (102), the throttle valve (103), the plate heat exchanger (104), the throttle valve (105), the plate heat exchanger (106) and the gas-liquid separator (107) are serially connected to form a second refrigerant loop.

The battery liquid cooling loop system includes a battery liquid cooling loop that circulates coolant through a battery pack, and two pipes in the battery liquid cooling loop are respectively connected to a first end and a second end of a first liquid cooling channel in the plate heat exchanger (106).

Pipes in the warm-air liquid cooling loop system are respectively connected to a first end and a second end of a second liquid cooling channel in the plate heat exchanger (106).

The battery liquid cooling loop system and the refrigerant loop system exchange heat by using the plate heat exchanger (106).

Alternatively, the warm-air liquid cooling loop system and the refrigerant loop system further exchange heat by using the plate heat exchanger (106).

Alternatively, the warm-air liquid cooling loop system and the battery liquid cooling loop system exchange heat by using the plate heat exchanger (106).

According to the second aspect, in a possible implementation, a first end of the throttle valve (105) is connected to the second end of the refrigerant channel in the plate heat exchanger (104), a second end of the throttle valve (105) is connected to a first end of a refrigerant channel in the plate heat exchanger (106), and a second end of the refrigerant channel of the plate heat exchanger (106) is connected to the first end of the gas-liquid separator (107).

According to the second aspect, in a possible implementation, the motor liquid cooling loop system includes: a power device (117), a motor controller (118), a motor (119), a radiator heat exchanger (115), and a multi-functional valve body (122). The power device (117), the motor controller (118), the motor (119), the radiator heat exchanger (115), and the multi-functional valve body (122) are serially connected, the multi-functional valve (122) is separately connected to the second end of the liquid cooling channel of the plate heat exchanger (102) and the second end of the liquid cooling channel of the plate heat exchanger (104), the power device (117) is further connected to the first end of the liquid cooling channel of the plate heat exchanger (104), and the motor is further directly connected to the multi-functional valve body (122).

The multi-functional valve body (122) is used to implement a water pump function, a water flow reversing function, and a water storage function.

According to the second aspect, in a possible implementation, the battery liquid cooling loop system includes a battery pack (120) and an integrated kettle pump (121). The battery pack (120) is connected to the integrated kettle pump (121), the integrated kettle pump (121) is further connected to the first end of the first liquid cooling channel of the plate heat exchanger (106), the battery pack (120) is further connected to the second end of the first liquid cooling channel of the plate heat exchanger (106), and the integrated kettle pump (121) is configured to implement the water pump function and the water storage function.

According to the second aspect, in a possible implementation manner, the warm-air liquid cooling loop system includes the multi-functional valve body (122), an electric heater (114), and a heater core (111). The multi-functional valve body (122), the electric heater (114) and the heater core (111) are serially connected, and the multi-functional valve body (122) is further separately connected to the second end of the liquid cooling channel of the plate heat exchanger (102) and the first end and the second end of the second liquid cooling channel of the plate heat exchanger (106).

According to the second aspect, in a possible implementation, the multi-functional valve body (122) includes a water pump (122-1), a water pump (122-6), a three-way water valve (122-2), a three-way water valve (122-4), a water path four-way valve (122-3), and a kettle (122-5). The water path four-way valve (122-3) is separately connected to the water pump (122-1), the three-way water valve (122-2), the three-way water valve (122-4), and the kettle (122-5), and the kettle (122-5) is further connected to the water pump (122-6).

The three-way water valve (122-2) is further separately connected to the motor (119) and the radiator heat exchanger (115).

The water pump (122-1) is further separately connected to the second end of the liquid cooling channel of the plate heat exchanger (102) and the first end of the second liquid cooling channel of the plate heat exchanger (106).

The three-way water valve (122-4) is further separately connected to the second end of the second liquid cooling channel of the plate heat exchanger (106) and the heater core (111).

The water pump (122-6) is further connected to the second end of the liquid cooling channel of the plate heat exchanger (104).

According to the second aspect, in a possible implementation, the integrated kettle pump (121) includes an expansion kettle (121-2) and a water pump (121-12). The expansion kettle (121-2) is connected to the water pump (121-12), the expansion kettle (121-2) is further connected to the battery pack (120), and the water pump (121-12) is further connected to the first end of the first liquid cooling channel of the plate heat exchanger (106).

According to the second aspect, in a possible implementation, at least one of the multi-functional valve body (122) and the integrated kettle pump (121) is structurally configured as an integrated structure.

According to the second aspect, in a possible implementation, a plurality of plate heat exchangers (the plate heat exchanger (102), the plate heat exchanger (104), and the plate heat exchanger (106)) and a plurality of throttle valves (the throttle valve 103 and the throttle valve 105) may be integrated into an integrated body (123). A temperature and pressure sensor may also be deployed on the pipes that connect the integrated components.

According to the second aspect, in a possible implementation, the integrated kettle pump (121), the multi-functional valve body (122), the integrated body (123), and the integrated body (124) may also be jointly integrated to form a thermal management integration module.

It can be learned that in this embodiment of this application, when the refrigerant four-way valve is not used, and when the refrigerant loop has only one flow direction, a cooling function and/or a heating function are/is implemented on the passenger compartment, and/or a cooling function and/or a heating function are/is implemented on the battery pack by using a heat pump air-conditioning system. A water path four-way reversing valve is used to switch flow directions of different water pipes, so that the cooling loop has only one flow direction and performance of a cooling system can be maximized.

Three plate heat exchangers are designed, so that the refrigerant in the refrigerant loop can exchange heat with the coolant in the motor liquid cooling loop by using the plate heat exchanger (104), exchange heat with the coolant in the warm-air liquid cooling loop by using the plate heat exchanger (102) and the plate heat exchanger (106), and exchange heat with the coolant in the battery liquid cooling loop by using the plate heat exchanger (106). Therefore, use of a parallel-flow heat exchanger is avoided. Because the plate heat exchanger has a relatively small volume, a structural integration solution of the thermal management system can be implemented by using the plate heat exchanger and according to a coolant heat exchange method and main components in the system can be integrated into different integrated bodies. An electronic control integration solution of the thermal management system can also be implemented to shorten refrigerant pipes and electric control wires. In addition, this embodiment of this application may also be applicable to various actual application scenarios, for example, cooling/heating/dehumidification of the passenger compartment, battery cooling/heating, and motor cooling/heat recovery. Therefore, this embodiment of this application helps reduce space occupied by a front compartment in the thermal management system, and also helps reduce costs of the thermal management system.

According to the second aspect, in a possible implementation, a connection relationship of the refrigerant loop is as follows: An outlet of the compressor (101) is connected to one end of a plate heat exchanger (202), the other end of the plate heat exchanger (202) is connected to one end of a throttle valve (203), the other end of the throttle valve (203) is connected to one end of a plate heat exchanger (204), the other end of the plate heat exchanger (204) is separately connected to one end of a throttle valve (205) and one end of a throttle valve (209), the other end of the throttle valve (205) is connected to one end of a plate heat exchanger (206), the other end of the throttle valve (209) is connected to one end of an air conditioner evaporator (210), and the other end of the air conditioner evaporator (210) and the other end of the plate heat exchanger (206) are connected to an inlet of a gas-liquid separator (207). The other end of the plate heat exchanger (204) is connected to one end of a solenoid valve (208). The other end of the solenoid valve (208) is connected to the inlet of the gas-liquid separator (207). An outlet of the gas-liquid separator (207) is connected to an inlet of the compressor (101), to form a refrigerant loop.

According to the second aspect, in a possible implementation, a connection relationship of the warm-air liquid cooling loop is as follows: An end A of a water path four-way valve (213) is connected to the end of the plate heat exchanger (202), an end B is connected to one end of an electric heater (223), the other end of the electric heater (223) is connected to an inlet of a three-way valve (224), an end B of the three-way valve (224) is connected to one end of a heater core (211), an end A is connected to the end of the plate heat exchanger (206), the other end of the plate heat exchanger (206) and the other end of the heater core are connected to an inlet of a water pump (222), and an outlet of the water pump (222) is connected to the other end of the plate heat exchanger (202).

According to the second aspect, in a possible implementation, a connection relationship of the battery liquid cooling loop is as follows: An outlet B of a water pump (225) is connected to the end of the plate heat exchanger (206), the other end of the plate heat exchanger (206) is connected to one end of a cooling device of a battery pack (227), the other end of the cooling device of the battery pack (227) is connected to an inlet of a kettle (226), and an outlet of the kettle (226) is connected to an inlet of the water pump (225).

According to the second aspect, in a possible implementation, an integrated kettle pump (231) is an integrated body including a kettle (220), a water pump (221), and the water pump (222), and is configured to implement a water pump function and a water storage function.

According to the second aspect, in a possible implementation, an integrated kettle pump (232) is an integrated body including the kettle (226) and the water pump (225), and is configured to implement the water pump function and the water storage function.

According to the second aspect, in a possible implementation, an integrated body (228) includes the plurality of plate heat exchangers (the plate heat exchanger (202), the plate heat exchanger (204), and the plate heat exchanger (206)) and the plurality of throttle valves (the throttle valve (203) and the throttle valve (205)). The temperature and pressure sensor may also be arranged on the pipes connected to various integrated components.

According to the second aspect, in a possible implementation, the integrated body (233) includes the gas-liquid separator (207) and the solenoid valve (208).

According to the second aspect, in a possible implementation, the integrated kettle pump (231), the integrated kettle pump (232), the integrated body (228), and the integrated body (233) may also be jointly integrated to form the thermal management integration module.

It can be learned that in this embodiment of this application, when the refrigerant four-way valve is not used, and when the refrigerant loop has only one flow direction, a cooling function and/or a heating function are/is implemented on the passenger compartment, and/or a cooling function and/or a heating function are/is implemented on the battery pack, by using a heat pump air-conditioning system. After a position of the water path four-way reversing valve is changed, the coolant passes through the plate heat exchanger (204) which is at the rear of the refrigerant loop and then the plate heat exchanger (202) which is at the front. This improves energy efficiency of the system during cooling, and reduces energy consumption of the system during cooling.

Three plate heat exchangers are designed, so that the refrigerant in the refrigerant loop can exchange heat with the coolant in the motor liquid cooling loop by using the plate heat exchanger, exchange heat with the coolant in the warm-air liquid cooling loop by using the plate heat exchanger, and exchange heat with the coolant in the battery liquid cooling loop by using the plate heat exchanger. Therefore, use of a parallel-flow heat exchanger is avoided. Because the plate heat exchanger has a relatively small volume, a structural integration solution of the thermal management system can be implemented by using the plate heat exchanger and according to a coolant heat exchange method, and main components in the system can be integrated into different integrated bodies. An electronic control integration solution of the thermal management system can also be implemented to shorten refrigerant pipes and electric control wires. In addition, this embodiment of this application may also be applicable to various actual application scenarios, for example, cooling/heating/dehumidification of the passenger compartment, battery cooling/heating, and motor cooling/heat recovery. Therefore, this embodiment of this application helps reduce space occupied by a front compartment in the thermal management system, and also helps reduce costs of the thermal management system.

According to a third aspect, an embodiment of this application provides a thermal management method for a thermal management system. The method includes: A controller obtains a sensor signal and a thermal management request; the controller generates a control signal based on the sensor signal and the thermal management request; and the controller sends the control signal to a drive board, where the control signal is used to indicate the drive board to drive a plurality of components in the thermal management system to work. The drive board includes a drive unit of each of the plurality of components in the thermal management system, and the thermal management system is the thermal management system according to any embodiment of the first aspect or the second aspect.

It can be seen that, in this embodiment of this application, because an electric control integration integrates an independent drive board of each thermal management component into an integrated drive board, a thermal management controller only needs to send the control signal (a requirement signal) to the integrated drive board, and subsequently, the integrated drive board performs corresponding signal conversion based on the control signal (the requirement signal), and simultaneously drives execution mechanisms of the plurality of components to execute corresponding instructions. Therefore, this application can effectively shorten a wire length of the thermal management system, save cabling space, reduce cabling costs, and further ensure normal implementation of functions in various specific application scenarios.

According to a fourth aspect, an embodiment of this application provides a controller for a thermal management system. The controller includes a processing chip and a communications interface. The communications interface is configured to obtain a sensor signal and a thermal management request. The processing chip is configured to generate a control signal based on the sensor signal and the thermal management request. The communications interface is further configured to send the control signal to a drive board. The control signal is used to indicate the drive board to drive a plurality of components in the thermal management system to work. The thermal management system is the thermal management system according to any embodiment of the first aspect or the second aspect.

According to a fifth aspect, an embodiment of this application provides a drive board for a thermal management system. The drive board includes a communications interface and a drive unit of each of a plurality of components in the thermal management system. The drive unit of each component is configured to drive each component to work.

The communications interface is configured to receive a control signal from a controller of the thermal management system. The drive unit of each component is configured to drive, based on the control signal, each component to work. The thermal management system is the thermal management system according to any embodiment of the first aspect or the second aspect.

It can be learned that in this embodiment of this application, an electric control integration is performed on the drive units of the components, so that the drive single board of each component does not need to be connected to a thermal management controller by using an independent wire, to reduce a total wire length. At the same time, structures of thermal management components in a front compartment are integrated, so that connected wire between the component and the integrated drive board is shortened greatly. Therefore, this application can effectively reduce a wire length of the thermal management system, save cabling space, and reduce cabling costs.

According to a sixth aspect, an embodiment of the present disclosure provides a readable non-volatile storage medium for storing a computer instruction. The readable non-volatile storage medium includes a computer instruction, and the computer instruction is executed to implement the method described in the third aspect.

According to a seventh aspect, an embodiment of the present disclosure provides a computer program product. When the computer program product runs on a computer, the computer program product is executed to implement the method described in the third aspect.

In conclusion, in this application, structures of installation positions of thermal management components are integrated, so that an installation volume of a thermal management system of an electric vehicle can be greatly reduced, and occupied space can be saved. In addition, a battery and a passenger compartment can be operated within a proper temperature range under various working conditions, flow resistance in a cooling system can be reduced, and energy efficiency of the system can be improved. An electric control integration is performed on the drive units of the components, so that the drive single board of each component does not need to be connected to a thermal management controller by using an independent wire, to reduce a total wire length. At the same time, structures of thermal management components in a front compartment are integrated, so that connected wire between the component and the integrated drive board is shortened greatly. Therefore, this application can effectively reduce the wire length of the thermal management system, save cabling space, and reduce cabling costs.

DESCRIPTION OF EMBODIMENTS

Figure 1:
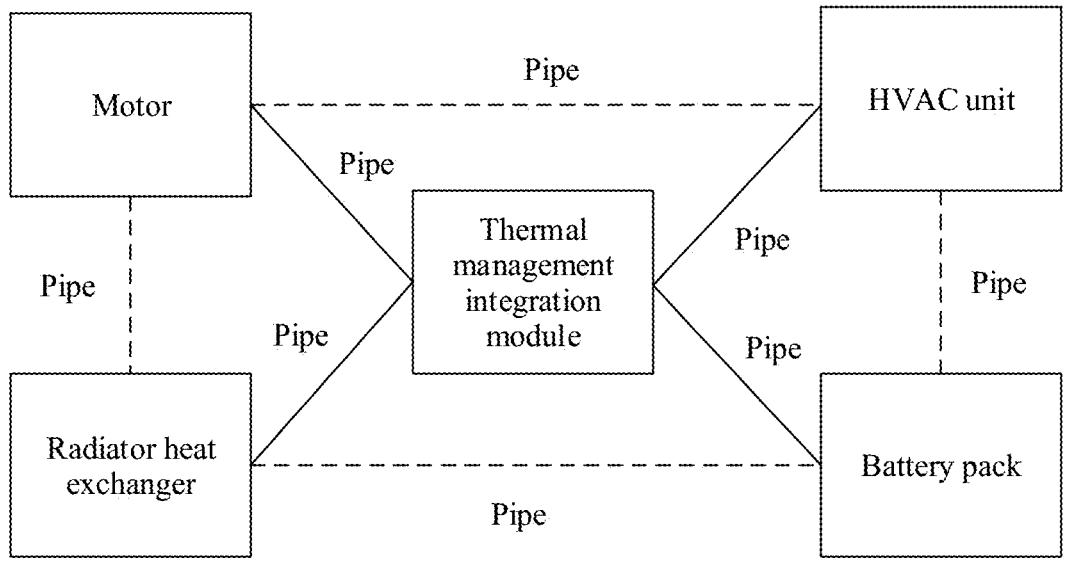
FIG. 1 is a schematic diagram of structural integration of a thermal management system according to an embodiment of this application.

The following describes various implementation solutions of this application in detail based on the accompanying drawings. It should be understood that this specification is not intended to limit this application to those example implementations. Rather, the present application is intended to cover these exemplary implementations, and various alternatives, modifications, equivalents, and other implementations that may be included within the spirit and scope of this application as defined by the appended claims.

In this specification, descriptions of content that is not related to this application are omitted to clearly describe this application, and a same accompanying drawing mark in the entire specification represent a same element. In addition, for ease of description, a size, a thickness, an appearance shape, a connection line shape, and the like of each component shown in the accompanying drawings are merely used for illustration rather than limitation. Further, specific implementation of this application is not limited to content shown in the accompanying drawings.

The technical solutions of this application may be applied to a conventional energy vehicle, or may be applied to a new energy vehicle. The conventional energy vehicle may be, for example, an internal combustion engine vehicle such as a gasoline vehicle or a diesel vehicle. The new energy vehicle may be, for example, an electric vehicle, a range-extended electric vehicle, a hybrid electric vehicle, a fuel cell electric vehicle, or other new energy vehicle.

An electric drive and control system is a core of the electric vehicle, which is also the biggest difference from the internal combustion engine vehicle. The electric drive and control system include a driving motor (a motor), a power source (or referred to as a battery pack), and a speed control device of the motor. Other devices of the electric vehicle can be roughly the same as those of the internal combustion engine vehicle.

A thermal management system in the electric vehicle may include thermal management components such as a compressor, a water pump, a condenser, a throttle device, a heat exchanger, an evaporator, a battery chiller, a water pump, and a valve. The thermal management system controls the components by using a controller, to ensure that battery and passenger compartment are in a proper temperature range under various working conditions. Generally, these components are separately installed in various positions of a front compartment of the vehicle. Because the components in the thermal management system need to be connected by corresponding pipes, separate installation positions of the components may lead to complex pipes in the thermal management system. In addition, a corresponding installation position and installation space need to be considered when each component is installed, which brings severe challenges to installation arrangement of the whole vehicle.

In some embodiments of this application, the thermal management system is redesigned to facilitate integration of the thermal management components. In some embodiments, two aspects of integration may be included: structural integration of the thermal management components, and electric control integration of the thermal management components.

First, some implementations of the structural integration in this application are described.

FIG. 1 is a schematic diagram of structural integration of a thermal management system according to an embodiment of this application. As shown in FIG. 1, in this application, components such as a compressor, a heat exchanger (for example, a plate heat exchanger described in the following embodiments), a water pump, and a water valve that can actively provide a cooling flow, a heating flow, and a water flow that are required by the thermal management system are structurally integrated in a thermal management integration module through compact design and installation. Other components that have a thermal management requirement, such as a motor, a radiator, a battery pack, and an air handling unit in a vehicle, are connected to the thermal management integration module by using a water pipe. The thermal management system is structurally integrated through flow of cold water and hot water in the connected water pipe.

Figure 2:
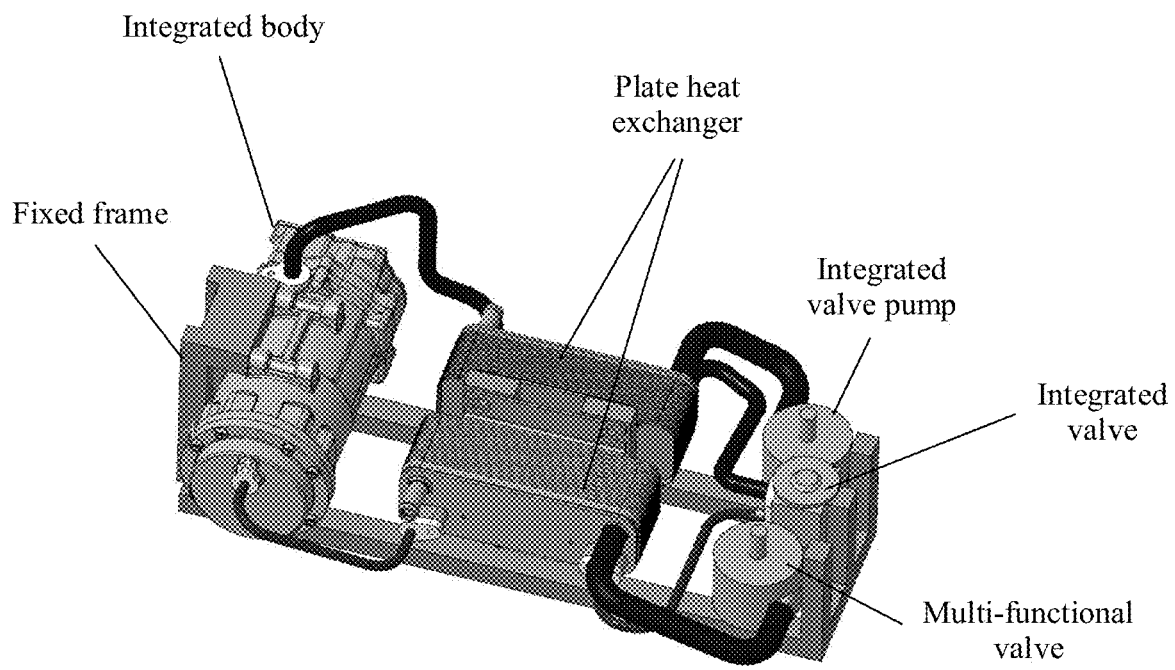
FIG. 2 is an example diagram of a thermal management integration module according to an embodiment of this application.

For example, FIG. 2 is an example diagram of the thermal management integration module. As shown in FIG. 2, the thermal management integration module may include components such as a compressor, a plate heat exchanger, an integrated valve, an integrated valve pump, and a multi-functional valve, the components may be connected by pipes. For example, the multi-functional valve may be an integrated body formed by a water pump, an expansion kettle, and a water path three-way valve. The integrated valve may be an integrated body formed by a water path three-way valve and a three-way water pipe. The integrated valve pump may be an integrated body formed by a water pump and a water path three-way valve. The foregoing components may be arranged together by using a fixed frame, to form an integrated body structure as a whole. The integrated body structure can be easily installed in a front compartment of the vehicle through modularization, and helps to save the occupied space through the integrated design.

It should be noted that FIG. 2 is merely used as an example to explain an integration solution in this application, but is not intended to limit this application. The shape, the installation position, and the connection relationship of each component in the integrated body structure are examples rather than limitations.

It should be further noted that, alternatively, the components in the thermal management integration module may be integrated in another manner instead of by using the fixed frame. For example, different components may be connected by using a pipe, and are compactly close in distance, to implement integration; for another example, different components may alternatively be designed in an integrated manner, to implement integration; and the like.

In actual application, other integration solutions may be further put forward based on the technical enlightenment in this application.

For example, one or more components that can actively provide cooling flow, heating flow, and water flow that are required by a thermal management system, for example, one or more thermal management components such as a compressor, a throttle device, a heat exchanger, a gas-liquid separator, a solenoid valve, a water pump, and a valve may be integrated.

Integration of the several components may be implemented by fixing the components by using a fixed frame, or may be implemented in another manner. For example, integration may be implemented by fixed pipes that connected the components, or integration may be implemented in an integrated design.

Figure 3A:
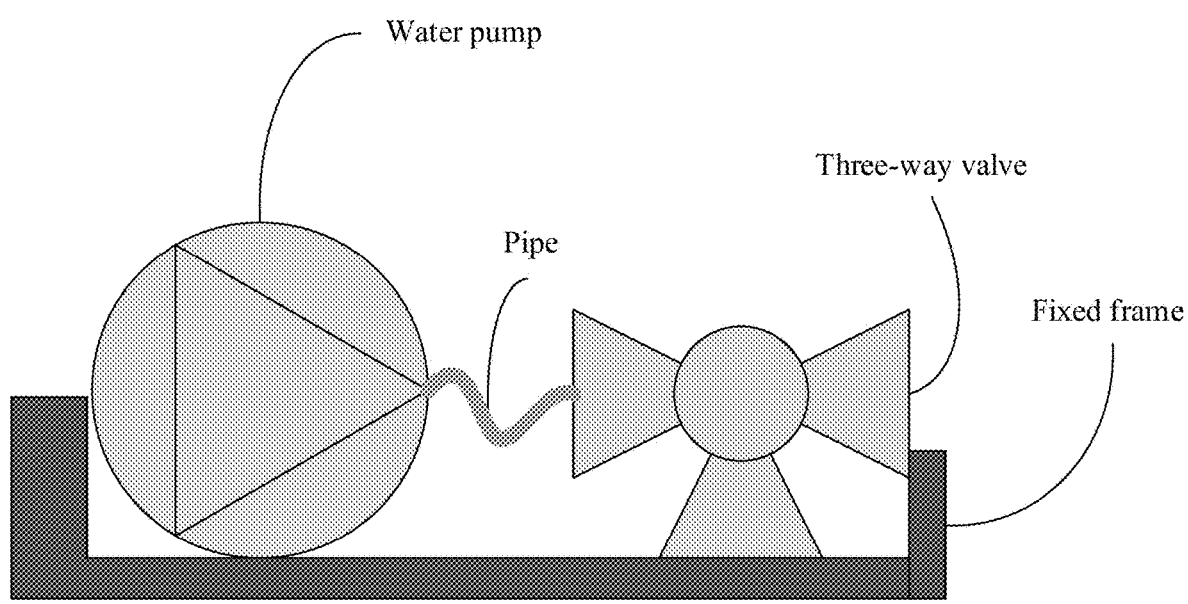
FIG. 3A is an example diagram of an integrated valve pump according to an embodiment of this application.

For another example, FIG. 3A is an example diagram of an integrated valve pump according to some embodiments of this application. As shown in FIG. 3A, a water pump and a water path three-way valve may be firmly installed together by using a fixed frame, and an output end of the water pump is connected to an input end of the three-way valve through a hose or a hard pipe.

Figure 3B:
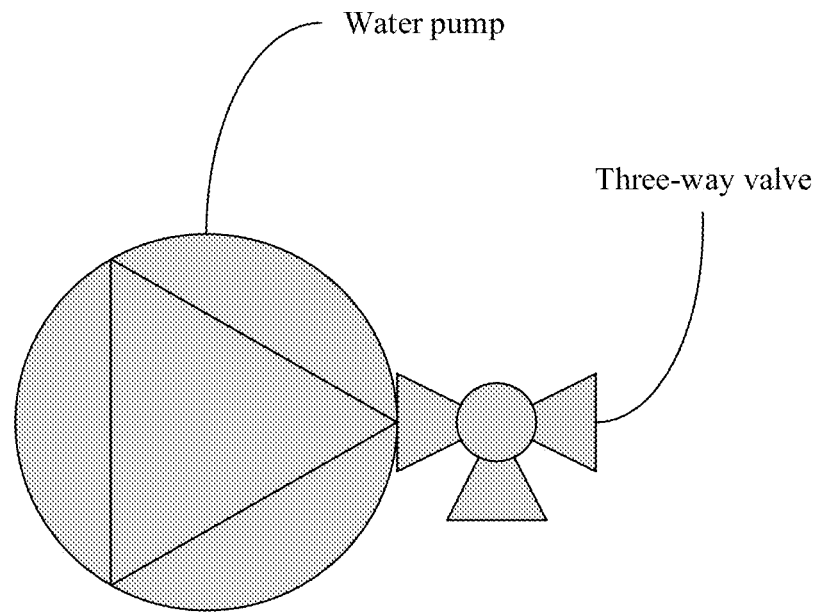
FIG. 3B is an example diagram of an integrated valve pump according to an embodiment of this application.

For another example, FIG. 3B is an example diagram of an integrated valve pump according to some embodiments of this application. As shown in FIG. 3B, a water pump and a water path three-way valve may be firmly installed together to form an integrated design, in other words, an output end of the water pump could directly connected to an input end of the three-way valve.

Figure 3C:
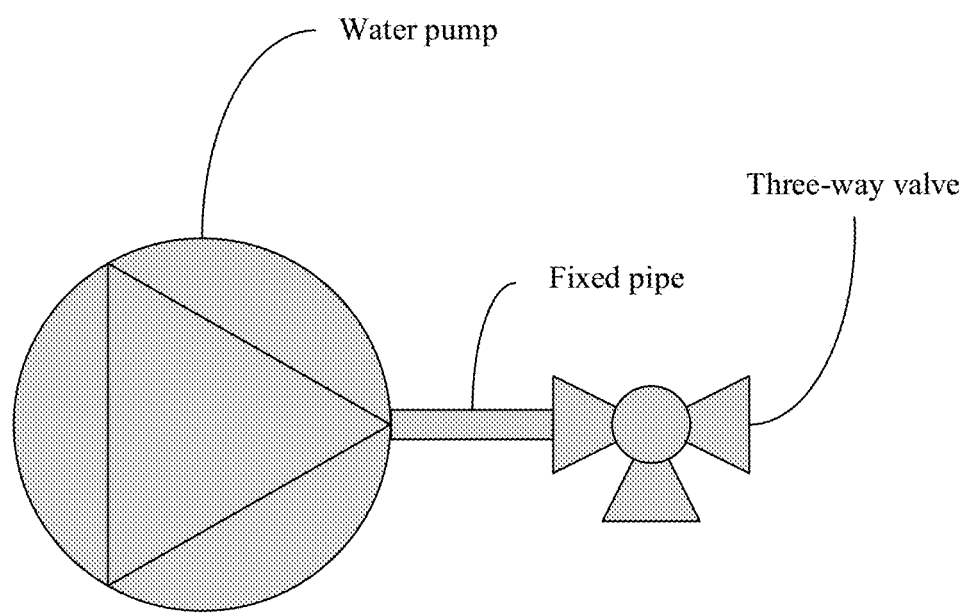
FIG. 3C is an example diagram of an integrated valve pump according to an embodiment of this application.

For another example, FIG. 3C is an example diagram of still another integrated valve pump according to some embodiments of this application. As shown in FIG. 3C, a water pump and a water path three-way valve may be disposed together by a fixed pipe, in other words, an output end of the water pump is connected to one end of the fixed pipe, and the other end of the fixed pipe is connected to an input end of the three-way valve.

It should be noted that the several components may be integrated in other manners. The foregoing embodiments shown in FIG. 3A, FIG. 3B, and FIG. 3C are merely used to explain the solution in this application, but are not limited thereto.

In some approaches, components in a thermal management system of a vehicle (for example, an electric vehicle) are separately and dispersedly installed in a front compartment and a passenger compartment. Installation space, bracket design, and the like need to be considered when each component is arranged and installed. This brings difficulties to the installation and layout of the vehicle. In addition, because the components in the thermal management system are dispersed, a relatively long pipe is required for the refrigerant system, a refrigerant flows along the pipe with increased resistance, and a refrigerant flow decreases due to the increased resistance. Therefore, system energy efficiency is reduced.

However, in this application, structures of installation positions of thermal management components are integrated, so that an installation volume of the thermal management system of the electric vehicle can be greatly reduced, and the occupied space can be saved. In addition, the battery and a passenger compartment can be operated within a proper temperature range under various working conditions, flow resistance in a cooling system can be reduced, and energy efficiency of the system can be improved.

The following describes some implementations of electric control integration in this application.

Figure 4:
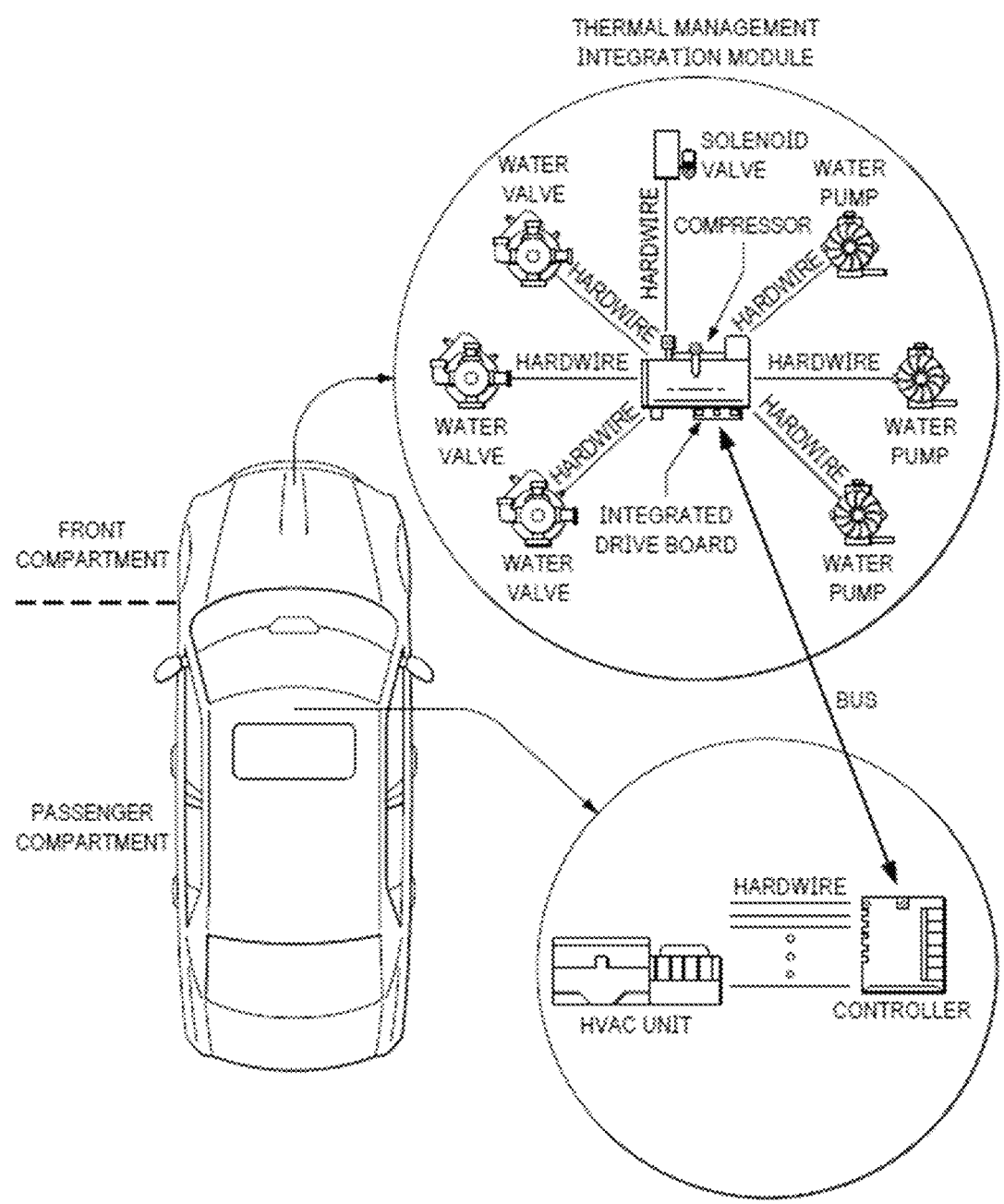
FIG. 4 is a schematic diagram of electric control integration of a thermal management system according to an embodiment of this application.

FIG. 4 is a schematic diagram of electric control integration of a thermal management system according to an embodiment of this application. The thermal management system includes a controller (or referred to as a thermal management controller) configured to perform thermal management control. The controller is configured to control a component (which may also be referred to as a controlled component) such as a compressor, a heat exchanger, a water pump, or a water valve that can actively provide a cooling flow, a heating flow, and a water flow that are required by the thermal management system to work. In this way, a related service is provided for another component having a thermal management requirement, such as a motor, a radiator heat exchanger, a battery pack, or an HVAC unit in a vehicle. In a possible implementation, the controller may be deployed near the HVAC unit of a passenger compartment, to save passenger compartment space.

In one embodiment of this application, a drive unit (or referred to as a drive circuit, or referred to as a drive element, or referred to as a drive module, or referred to as a drive single board) of the controlled component such as the water pump, the valve, the compressor, or a throttle device may be separated from an execution mechanism. Then, the drive units of the controlled components are jointly integrated on a drive board (also referred to as an integrated drive board or an integrated circuit board), to implement electric control integration of the controlled components. In one possible embodiment, the drive board may be installed in the compressor in a front compartment, or may be separately installed in another place. In this way, the controller only needs to be connected to the drive board in a front compartment by using one bus, and the execution mechanism of each controlled component is electrically connected to the drive board. That is, the controller may send a control instruction to the drive board in a unified manner, to further drive, by using the drive board, a related component to work, to implement a function of the thermal management system.

In some approaches, electric control elements of the components of the thermal management system of the vehicle (for example, an electric vehicle) are relatively independent, and a wire needs to be used for electric connection between an electric control element of each component and the thermal management controller. Some of the components are distributed in the front compartment, and mainly include the water pump, the compressor, the valve, and some temperature sensors. The other components are distributed in the passenger compartment, and mainly include the execution mechanism in the HVAC unit, a sensor in the passenger compartment, and the like. The thermal management controller is a conventional air conditioner controller located in the passenger compartment. All the controlled components are connected to the thermal management controller. Therefore, the wire of the electric control system is too long.

However, in this application, an electric control integration is performed on the drive units of the components, so that the drive single board of each component does not need to be connected to the thermal management controller by dedicated wire, therefore the total wire length is reduced. Furthermore, structures of thermal management components in the front compartment are integrated, so that the connected wire among the components and the integrated drive board is shortened greatly. Therefore, the aforementioned embodiments of the application can effectively reduce the wire length of the thermal management system, save cabling space, and reduce wiring costs.

The following describes some structural connection solutions and structure-based function implementation solutions of the thermal management system provided in some embodiments of this application. In the accompanying drawings in the following embodiments, for ease of description, only connection relationships among some thermal management components and thermal requirement components and flow directions of working medium (such as a refrigerant flow direction and a coolant flow direction) in function implementation are shown, and specific structure integration in some components is not shown. In addition, the controller, drive board, and electrically connected wire in the electric control integration are not shown. Based on the foregoing description, man skilled in the art are familiar with specific implementation solutions in a case of structural integration and/or electric control integration. Details of these specific implementation solutions are not described in this specification.

Figure 5:
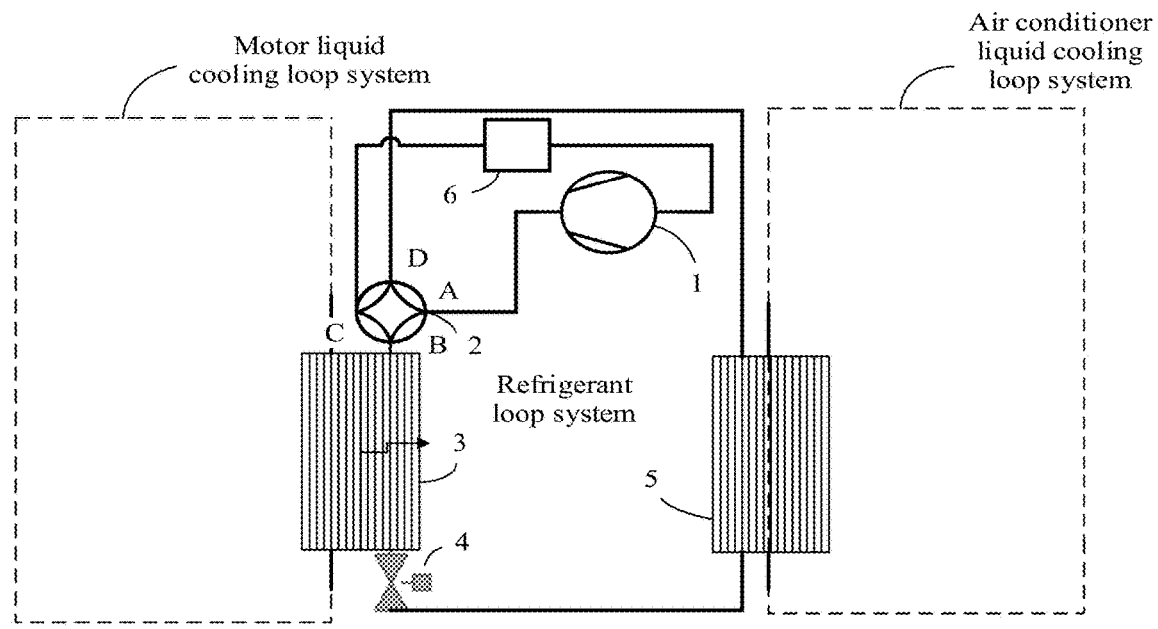
FIG. 5 is a schematic structural diagram of a thermal management system according to an embodiment of this application.

FIG. 5 is a schematic structural diagram of a thermal management system according to some embodiments of this application. As shown in FIG. 4, the thermal management system includes a refrigerant loop system, a motor liquid cooling loop system, and an air conditioner liquid cooling loop system.

The refrigerant loop system includes a compressor 1, a refrigerant four-way reversing valve 2, a plate heat exchanger 3, a throttle valve 4, a plate heat exchanger 5, and a gas-liquid separator 6. Both the plate heat exchanger 3 and the plate heat exchanger 5 include two pairs of inlet and outlet channels. One pair of the inlet and outlet channels is a refrigerant channel used for circulating refrigerant, and the other pair of the inlet and outlet channels is a liquid cooling channel used for circulating coolant. Heat can be exchanged between the refrigerant in the refrigerant channel and the coolant in the liquid cooling channel.

An outlet of the compressor 1 is connected to a first end (namely, an end A) of the refrigerant four-way reversing valve 2 by a pipe. A second end (namely, an end B) of the four-way reversing valve 2 is connected to a first end of the refrigerant channel in the plate heat exchanger 3. A second end of the refrigerant channel in the plate heat exchanger 3 is connected to a first end of the throttle valve 4. A second end of the throttle valve 4 is connected to a first end of the refrigerant channel in the plate heat exchanger 5. A second end of the refrigerant channel in the plate heat exchanger 5 is connected to a third end (namely, an end C) of the refrigerant four-way reversing valve 2. A fourth end (namely, an end D) of the refrigerant four-way reversing valve 2 is connected to a first end of the gas-liquid separator 6. A second end of the gas-liquid separator 6 is connected to an inlet of the compressor 1, to form a refrigerant loop. The refrigerant loop is used to circulate the refrigerant.

The motor liquid cooling loop system includes a motor liquid cooling loop that circulates coolant through a motor, and two pipes in the motor liquid cooling loop are respectively connected to a first end and a second end of the liquid cooling channel in the plate heat exchanger 3. The motor liquid cooling loop system and the refrigerant loop system exchange heat by using the plate heat exchanger 3, in other words, the coolant in the motor liquid cooling loop system and the refrigerant in the refrigerant loop system exchange heat by using the plate heat exchanger 3.

The air conditioner liquid cooling loop system includes an air conditioner liquid cooling loop that circulates coolant through an HVAC unit, and pipes in the air conditioner liquid cooling loop are respectively connected to a first end and a second end of the liquid cooling channel in the plate heat exchanger 5. The air conditioner liquid cooling loop system and the refrigerant loop system exchange heat by using the plate heat exchanger 5, in other words, the coolant in the air conditioner liquid cooling loop system and the refrigerant in the refrigerant loop system may exchange heat by using the plate heat exchanger 5.

In one embodiment, the end A and the end B of the refrigerant four-way valve are connected, and the end C and the end D of the refrigerant four-way valve are connected. High-temperature refrigerant discharged by the compressor 1 passes through the end A and the end B of the refrigerant four-way valve 2 and enters the plate heat exchanger 3 for condensation and heat dissipation. After the high-temperature refrigerant passes through the throttle valve 4, the high-temperature refrigerant is throttled into a low-temperature gas-liquid two-phase refrigerant, and then the low-temperature gas-liquid two-phase refrigerant is evaporated through the plate heat exchanger 5 to absorb heat from the passenger compartment (the HVAC unit is installed in the passenger compartment). Finally, the low-temperature gas-liquid two-phase refrigerant enters the gas-liquid separator 6 through the end C and the end D of the refrigerant four-way valve 2, and enters a suction vent of the compressor 1 through an outlet of the gas-liquid separator 6. In this way, the refrigerant is circulated. The coolant in the motor liquid cooling loop system may absorb heat by using the plate heat exchanger 3, and implement heat dissipation by using the motor liquid cooling loop.

In another embodiment, the end A and the end D of the refrigerant four-way valve are connected, and the end B and the end C of the refrigerant four-way valve are connected. A high-temperature refrigerant discharged by the compressor 1 passes through the end A and the end D of the refrigerant four-way valve 2, and enters the plate heat exchanger 5 for condensation and heat dissipation. Heat required for heating the passenger compartment (the HVAC unit is installed in the passenger compartment) is supplied. After the high-temperature refrigerant passes through the throttle valve 4, the high-temperature refrigerant is throttled into a low-temperature gas-liquid two-phase refrigerant, and then the low-temperature gas-liquid two-phase refrigerant is evaporated through the plate heat exchanger 3 to absorb heat. Finally, the low-temperature gas-liquid two-phase refrigerant enters the gas-liquid separator 6 through the end B and the end C of the four-way valve 2, and enters a suction vent of the compressor 1 through an outlet of the gas-liquid separator 6. The coolant in the motor liquid cooling loop system could absorb heat in the motor liquid cooling loop (for example, heat of the motor), and release the heat by the plate heat exchanger 3, to implement heat recovery and improve working efficiency of the refrigerant loop system.

The thermal management system in this embodiment of this application may be applied to a conventional energy vehicle (an internal combustion engine vehicle), or may be applied to a new energy vehicle (for example, an electric vehicle or a hybrid vehicle).

It can be learned that in some embodiments of this application, the refrigerant four-way reversing valve is used to simplify the loop of the refrigerant loop system. The two plate heat exchangers are used, so that the refrigerant in the refrigerant loop can exchange heat with the coolant in the motor liquid cooling loop by using the plate heat exchanger 3, and exchange heat with the coolant in the air conditioner liquid cooling loop by using the plate heat exchanger 5. Therefore, use of a parallel-flow heat exchanger is avoided. Because the plate heat exchanger has a relatively small volume, a structural integration solution and an electronic control integration solution of the thermal management system can be implemented by using the plate heat exchanger and according to a coolant heat exchange method. Therefore, embodiments of this application help to reduce space occupied by a front compartment in the thermal management system, and also help to reduce costs of the thermal management system.

Figure 6:
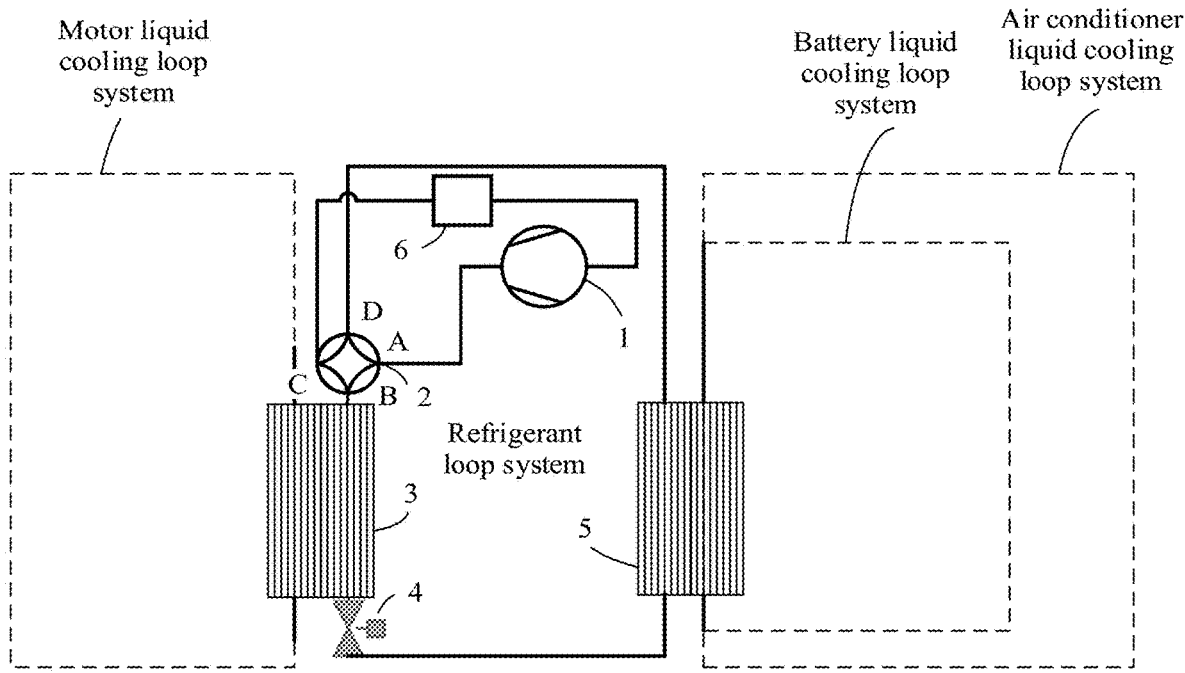
FIG. 6 is a schematic structural diagram of a thermal management system according to an embodiment of this application.

FIG. 6 is a schematic structural diagram of another thermal management system according to some embodiments of this application. As shown in FIG. 6, a difference between the thermal management system and the thermal management system shown in FIG. 5 lies in that a battery liquid cooling loop system is added to the thermal management system shown in FIG. 6 compared to that in the FIG. 5. The battery liquid cooling loop system includes a battery liquid cooling loop that circulates coolant through a battery pack. The battery liquid cooling loop uses the same pipes as the foregoing air conditioner liquid cooling loop system to connect to a first end and a second end of a liquid cooling channel in a plate heat exchanger 5. The battery liquid cooling loop system and a refrigerant loop system exchange heat by using the plate heat exchanger 5, in other words, the coolant in the battery liquid cooling loop system and the refrigerant in the refrigerant loop system may also exchange heat by using the plate heat exchanger 5.

In one embodiment, the end A and the end B of the refrigerant four-way valve are connected, and the end C and the end D of the refrigerant four-way valve are connected. A high-temperature refrigerant discharged by a compressor 1 enters a plate heat exchanger 3 through the end A and the end B of the refrigerant four-way valve 2 for condensation and heat dissipation. After the high-temperature refrigerant passes through a throttle valve 4, the high-temperature refrigerant is throttled into a low-temperature gas-liquid two-phase refrigerant, and then the low-temperature gas-liquid two-phase refrigerant is evaporated through the plate heat exchanger 5 to absorb heat from the passenger compartment (the HVAC unit is installed in the passenger compartment), and/or to absorb heat from the battery pack of the battery liquid cooling loop. Finally, the low-temperature gas-liquid two-phase refrigerant enters a gas-liquid separator 6 through the end C and the end D of the refrigerant four-way valve 2, and enters a suction vent of a compressor 1 through an outlet of the gas-liquid separator 6. In this way, the refrigerant is circulated. The coolant in the motor liquid cooling loop system may absorb heat by using the plate heat exchanger 3, and implement heat dissipation by using the motor liquid cooling loop.

In another embodiment, the end A and the end D of the refrigerant four-way valve are connected, and the end B and the end C of the refrigerant four-way valve are connected. A high-temperature refrigerant discharged by a compressor 1 passes through the end A and the end D of the refrigerant four-way valve 2 and enters the plate heat exchanger 5 for condensation and heat dissipation. Heat required for heating the passenger compartment (the HVAC unit is installed in the passenger compartment) is supplied, and/or heat required for heating the battery pack of the battery liquid cooling loop is supplied. After the high-temperature refrigerant passes through a throttle valve 4, the high-temperature refrigerant is throttled into a low-temperature gas-liquid two-phase refrigerant, and then the low-temperature gas-liquid two-phase refrigerant is evaporated through the plate heat exchanger 3 to absorb heat. Finally, the low-temperature gas-liquid two-phase refrigerant enters the gas-liquid separator 6 through the end B and the end C of the four-way valve 2, and enters a suction vent of the compressor 1 through an outlet of the gas-liquid separator 6. The coolant in the motor liquid cooling loop system may absorb heat in the motor liquid cooling loop (for example, heat of the motor), and release the heat by using the plate heat exchanger 3, to implement heat recovery and improve working efficiency of the refrigerant loop system.

The thermal management system in this embodiment of this application may be applied to a new energy vehicle (for example, an electric vehicle or a hybrid vehicle).

It can be learned that in this embodiment of this application, the refrigerant four-way reversing valve is used to simplify the loop of the refrigerant loop system. The two plate heat exchangers are used, so that a refrigerant in the refrigerant loop can exchange heat with the coolant in the motor liquid cooling loop by using the plate heat exchanger 3, and exchange heat with the coolant in the air conditioner liquid cooling loop by using the plate heat exchanger 5, and/or exchange heat with the coolant in the battery liquid cooling loop by using the plate heat exchanger 5. Therefore, use of a parallel-flow heat exchanger is avoided. Because the plate heat exchanger has a relatively small volume, a structural integration solution and an electronic control integration solution of the thermal management system can be implemented by using the plate heat exchanger and according to a coolant heat exchange method. Therefore, this embodiment of this application helps reduce space occupied by a front compartment in the thermal management system, and also helps reduce costs of the thermal management system.

Figure 7:
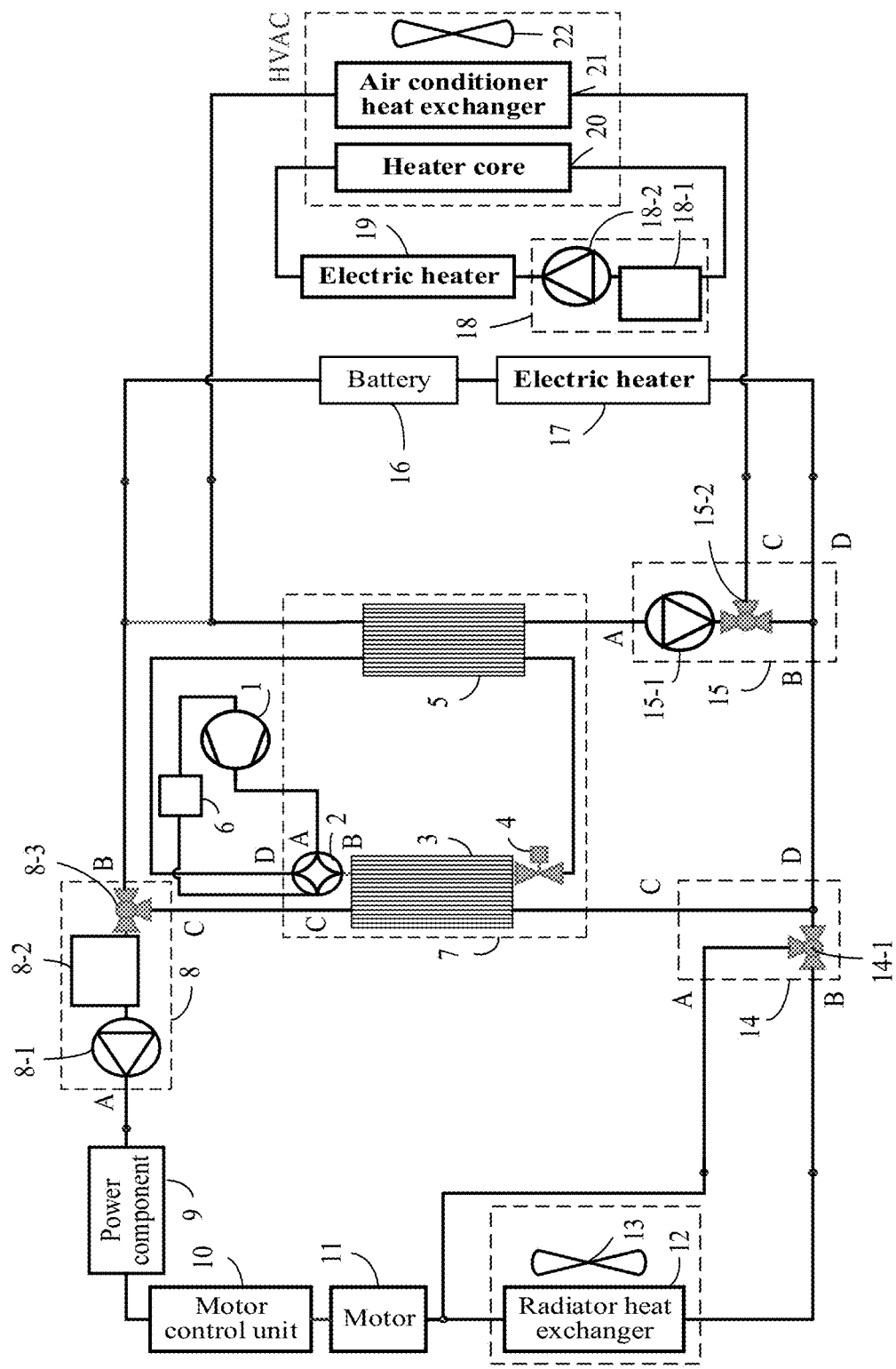
FIG. 7 is a detailed schematic structural diagram of a thermal management system according to an embodiment of this application.

Based on the thermal management system shown in the embodiment in FIG. 6, the following describes a connection relationship between related components in a thermal management system in an implementation scenario by using an example. For details, refer to FIG. 7. FIG. 7 is a detailed schematic structural diagram of a thermal management system according to an embodiment of this application. As shown in FIG. 7, the thermal management system is an integrated thermal management system including a refrigerant four-way reversing valve structure. An integrated body 7, a multi-functional valve 8, an integrated valve 14, an integrated valve pump 15 and an integrated kettle pump 18 are integrated in the thermal management system.

The integrated body 7 includes a plurality of plate heat exchangers (a plate heat exchanger 3 and a plate heat exchanger 5), a refrigerant four-way reversing valve 2, and a throttle valve 4. A refrigerant temperature and pressure sensor may be disposed on the pipes connected to various integrated elements.

The multi-functional valve 8 is an integrated body formed by a water pump 8-1, an expansion kettle 8-2, and a water path three-way valve 8-3. The multi-functional valve 8 is configured to implement a water pump function, a water flow reversing function (or referred to as a coolant reversing function), and a water storage function. A first end of the water path three-way valve 8-3 is connected to one end of the expansion kettle 8-2. A second end of the water path three-way valve 8-3 provides an external interface (marked as an end B in FIG. 7, for example, may be configured to connect to a battery pack 16). A third end of the water pipe three-way valve 8-3 provides an external interface (marked as an end C in FIG. 7, for example, may be configured to connect to the plate heat exchanger 3). The other end of the expansion kettle 8-2 is connected to one end of the water pump 8-1. The other end of the water pump 8-1 provides an external interface (marked as an end A in FIG. 7, for example, may be configured to connect to the power device 9).

The integrated valve 14 is an integrated body formed by a water path three-way valve 14-1 and a three-way water pipe, and is configured to implement the water flow reversing function. A first end of the water path three-way valve 14-1 provides an external interface (marked as an end A in FIG. 7, for example, configured to connect to the motor 11). A second end of the water path three-way valve 14-1 provides an external interface (marked as an end B in FIG. 7, for example, configured to connect to a radiator heat exchanger 12). A third end of the water path three-way valve 14-1 is connected to a first end of the three-way water pipe. A second end of the three-way water pipe provides an external interface (marked as an end C in FIG. 7, for example, configured to connect to the plate heat exchanger 3). A third end of the three-way water pipe provides an external interface (marked as an end C in FIG. 7, for example, configured to connect to the integrated valve pump 15).

The integrated valve pump 15 is an integrated body formed by a water pump 15-1 and a water path three-way valve 15-2, and is configured to implement the water pump function and the water flow reversing function. One end of the water pump 15-1 provides an external interface (marked as an end A in FIG. 7, for example, configured to connect to the plate heat exchanger 5). The other end of the water pump 15-1 is connected to a first end of the water path three-way valve 15-2. A second end of the water path three-way valve 15-2 provides two external interfaces, for example, in FIG. 7, may provide external interfaces: an end B and an end D by using a three-way water pipe. The end B is configured to connect to the integrated valve 14, and the end D is configured to connect to the electric heater 17. A third end of the water path three-way valve 15-2 provides an external interface (marked as an end C in FIG. 7, for example, configured to connect to an air conditioner heat exchanger 21).

The integrated kettle pump 18 is an integrated body formed by a water pump 18-2 and an expansion kettle 18-1, and is configured to implement the water pump function and the water storage function. One end of the expansion kettle 18-1 is connected to one end of the water pump 18-2. The other end of the expansion kettle 18-1 provides an external interface (for example, configured to connect to the heater core 20). The other end of the water pump 18-2 provides an external interface (for example, configured to connect to an electric heater 19).

In the thermal management system shown in FIG. 7, a connection relationship of the refrigerant loop is as follows: an outlet of a compressor 1 is connected to an end A of the refrigerant four-way reversing valve 2. An end B of the refrigerant four-way reversing valve 2 is connected to one end of the plate heat exchanger 3 (namely, one end of a refrigerant channel of the plate heat exchanger 3). The other end of the plate heat exchanger 3 (namely, the other end of the refrigerant channel of the plate heat exchanger 3) is connected to one end of the throttle valve 4. The other end of the throttle valve 4 is connected to one end of the plate heat exchanger 5 (namely, one end of a refrigerant channel of the plate heat exchanger 5). The other end of the plate heat exchanger 5 (namely, the other end of the refrigerant channel of the plate heat exchanger 5) is connected to an end D of the refrigerant four-way reversing valve 2. An end C of the refrigerant four-way reversing valve is connected to one end of a gas-liquid separator 6. The other end of the gas-liquid separator 6 is connected to an inlet of the compressor 1. The throttle valve 4 herein may be a bidirectional throttle valve, and the throttle valve 4 may be implemented by using a component having a throttling function, such as a capillary tube or an expansion valve.

In the thermal management system shown in FIG. 7, a connection relationship of the battery liquid cooling loop is as follows: an end A of the integrated valve pump 15 is connected to one end of the plate heat exchanger 5 (namely, one end of a liquid cooling channel of the plate heat exchanger 5). The end D is connected to one end of the electric heater 17. The other end of the electric heater 17 is connected to an inlet of a cooling device of a battery pack 15. An outlet of a cooling device of the battery pack 16 may be connected to the other end of the plate heat exchanger 5 (namely, the other end of the liquid cooling channel of the plate heat exchanger 5) and an end B of the multi-functional valve 8 by using a three-way water pipe.

The cooling device of the battery pack 15 is an apparatus that implements heating or cooling of the battery pack by circulating coolant. For example, the cooling device of the battery pack 15 may be a water-cooling coil pipe, a cooling plate, or the like in contact with the battery pack. This is not limited in this specification.

In addition, it should be noted that, in this specification, for ease of description, "the cooling device connected to the battery pack 15" is sometimes briefly described as "a connected battery pack 15", "the inlet of the cooling device of the battery pack 15" is briefly described as "the inlet of the battery pack 15", and "an outlet of the cooling device of the battery pack 15" as "an outlet of the battery pack 15".

In the thermal management system shown in FIG. 7, a connection relationship of the air conditioner liquid cooling loop (which may also be referred to as a passenger compartment liquid cooling loop herein) is as follows: an end C of the integrated valve pump 15 is connected to an end of the air conditioner heat exchanger 21 in a HVAC system, the other end of the air conditioner heat exchanger 21 may be connected to the other end of the plate heat exchanger 5 after being combined with the outlet of the battery pack 16 by using a three-way water pipe. The HVAC system may include the air conditioner heat exchanger 21, the heater core 20, and a fan 22. The air conditioner heat exchanger 21 may be configured to implement a cooling function of the passenger compartment, the heater core 20 may be configured to implement a heating function of the passenger compartment, and the fan 22 may be configured to implement a blowing function of the passenger compartment. A combination of the foregoing devices may further implement another function. For example, the air conditioner heat exchanger 21 and the heater core 20 are jointly configured to implement a dehumidification function of the passenger compartment.

In addition, in a possible embodiment, the thermal management system shown in FIG. 7 may further include a warm-air liquid cooling loop (which may also be referred to as a passenger compartment warm-air loop). A connection relationship of the warm-air liquid cooling loop is as follows: an outlet of the integrated kettle pump 18 (namely, an outlet of the water pump 18-2) is connected to the electric heater 19, the other end of the electric heater 19 is connected to the heater core 20 in the HVAC, the other end of the heater core 20 is connected to an inlet of the integrated kettle pump 18 (namely, an inlet of the expansion kettle 18-1).

In the thermal management system shown in FIG. 7, a connection relationship of the motor liquid cooling loop (which may also be referred to as a power system liquid cooling loop) is as follows: An end C of the multi-functional valve 8 (namely, an end C of the water path three-way valve 8-3, or a third end of the multi-functional valve 8) is connected to one end of the plate heat exchanger 3. An end A of the multi-functional valve 8 (namely, an end A of the water pump 8-1) is connected to one end of a cooling device of the power device 8. The other end of a cooling device of the power device 9 is connected to one end of a cooling device of the motor controller 10. The other end of the cooling device of the motor controller 10 is connected to one end of a cooling device of the motor 11. The other end of the cooling device of the motor 11 is separately connected to the radiator heat exchanger 12 and an end A of the integrated valve 14 (namely, an end A of the water path three-way valve 14-1). The other end of the radiator heat exchanger 12 is connected to an end B of the integrated valve 14 (namely, an end B of the water path three-way valve 14-1). An end C of the integrated valve 14 (namely, an end C of the water path three-way valve 14-1) is connected to the other end of the plate heat exchanger 3. An end D of the integrated valve 14 (namely, one end of the three-way water pipe) may be connected to an end B of the integrated valve pump 15.

It should be noted that the cooling device of the power device 9 is an apparatus that implements heating or cooling of the power device by circulating coolant, the cooling device of the motor controller 10 is an apparatus that implements heating or cooling of the motor controller by circulating coolant, and the cooling device of the motor 11 is an apparatus that implements heating or cooling of the motor by circulating coolant.

In this specification, for ease of description, sometimes "the cooling device connected to the power device 9" is briefly described as "the connected power device 9", "the cooling device connected to the motor controller 10" is briefly described as "the connected motor controller 10", and "the cooling device connected to the motor 11" is briefly described as "the connected motor 11".

It should be noted that, for specific integration manners of the integrated body 7, the multi-functional valve 8, the integrated valve 14, the integrated valve pump 15, and the integrated kettle pump 18, refer to related descriptions in the embodiments of FIG. 3A, FIG. 3B, and FIG. 3C. For brevity of the specification, details are not described herein again.

In addition, the integrated body 7, the multi-functional valve 8, the integrated valve 14, the integrated valve pump 15, and the integrated kettle pump 18 may also be jointly integrated to form the thermal management integration module described above.

Based on the structural connection relationship in the embodiment in FIG. 7, the following describes an example of a main application scenario.

Figure 8:
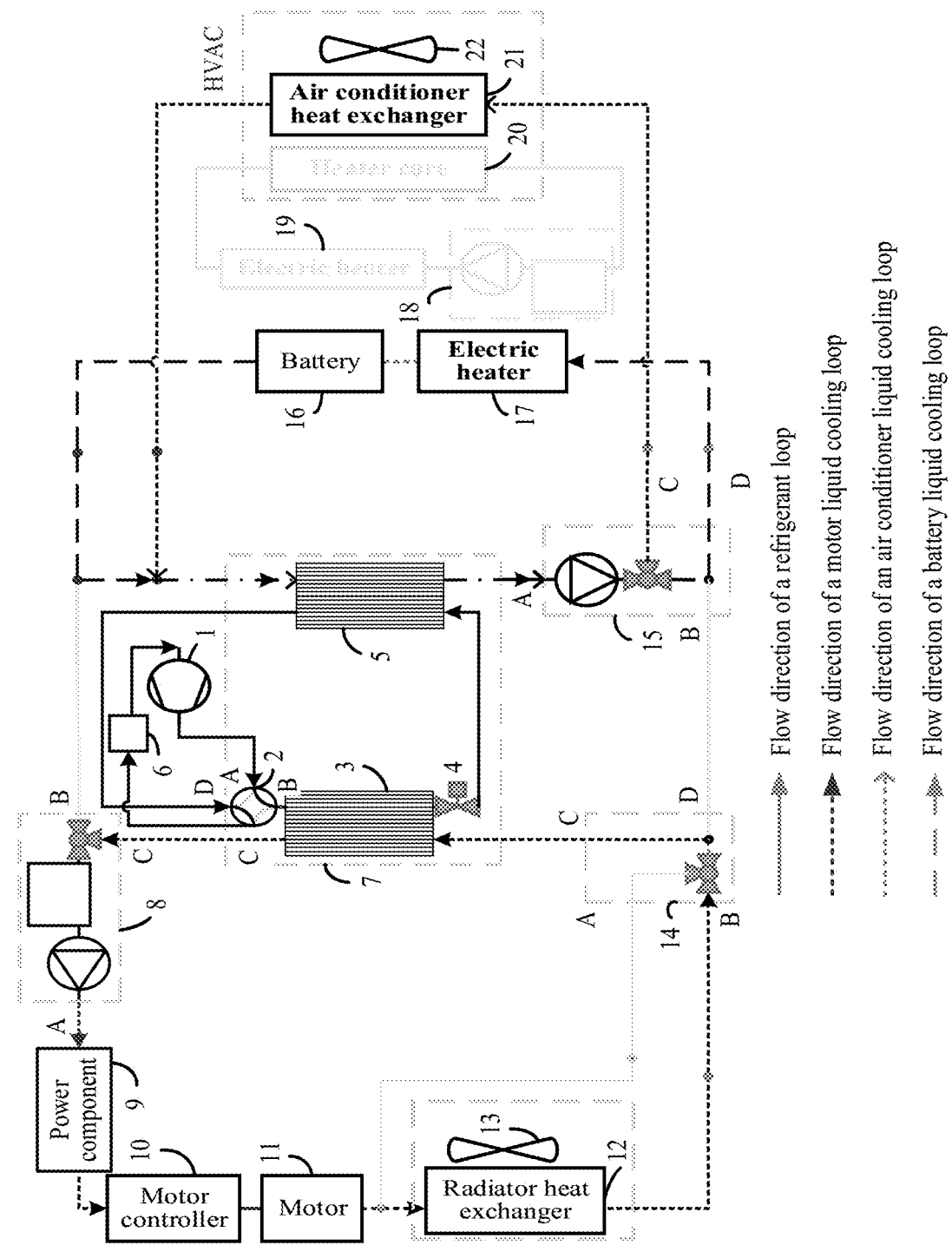
FIG. 8 is a schematic diagram of a flow direction of a related working medium in a thermal management system according to an embodiment of this application.

FIG. 8 is a schematic diagram of a flow direction of a related working medium in a thermal management system in a scenario in which a passenger compartment, a battery, and a motor are cooled. In some embodiments, the schematic diagram includes a flow direction of a refrigerant loop, a flow direction of a motor liquid cooling loop, a flow direction of an air conditioner liquid cooling loop, and a flow direction of a battery liquid cooling loop. Here, a gray area in the thermal management system indicates a loop that does not require the working medium to pass through.

As shown in FIG. 8, the flow direction of the refrigerant loop is described as follows: An end A and an end B of the refrigerant four-way valve 2 are connected, and an end D and an end C of the refrigerant four-way valve 2 are connected. A high-temperature refrigerant discharged by a compressor 1 passes through the end A and the end B of the refrigerant four-way valve 2 and enters a plate heat exchanger 3 for condensation and heat dissipation. After the high-temperature refrigerant passes through a throttle valve 4, the high-temperature refrigerant is throttled into a low-temperature gas-liquid two-phase refrigerant, and then the low-temperature gas-liquid two-phase refrigerant is evaporated through a plate heat exchanger 5 to absorb heat from a battery and a passenger compartment. Finally, the low-temperature gas-liquid two-phase refrigerant enters a gas-liquid separator 6 through the end C and the end D of the refrigerant four-way valve 2, and enters a suction vent of a compressor 1 through an outlet of the gas-liquid separator 6.

The flow direction of the motor liquid cooling loop is described as follows: An end B of a multi-functional valve 8 of the motor liquid cooling loop is closed. An end C receives a high-temperature liquid output from the plate heat exchanger 3. After the high-temperature liquid is output through an end A, the high-temperature liquid sequentially passes through a power device 9, a motor controller 10, and a motor 11. By closing an end A of an integrated valve 14, the high-temperature liquid is cooled by a radiator 12. In some embodiments, a fan 13 may be further used for heat dissipation, and then the high-temperature liquid enters the plate heat exchanger 3 again.

The flow direction of the air conditioner liquid cooling loop and the flow direction of the battery liquid cooling loop are respectively described as follows: An end C and an end D of an integrated valve pump 15 belonging to the battery liquid cooling loop and the air conditioner liquid cooling loop are opened. The end A receives a low-temperature liquid output from the plate heat exchanger 5. A part of the low-temperature liquid is output from the end C, and passes through an air-conditioning heat exchanger 21, to cool the passenger compartment. The other part of the low-temperature liquid is output from the end D, passes through an electric heater 17, and absorbs heat of a battery in a battery pack 16, to cool the battery pack 16. At this time, the electric heater 17 is not turned on, and is only used as a circulation function. After absorbing the heat of the battery and the passenger compartment, the liquid passes through the three-way water pipe and enters the plate heat exchanger 5 again. In some embodiments, an opening of the water path three-way valve in the integrated valve pump 15 is adjusted to adjust cooling flow allocation of the battery pack and the passenger compartment may be implemented by.

Figure 9:
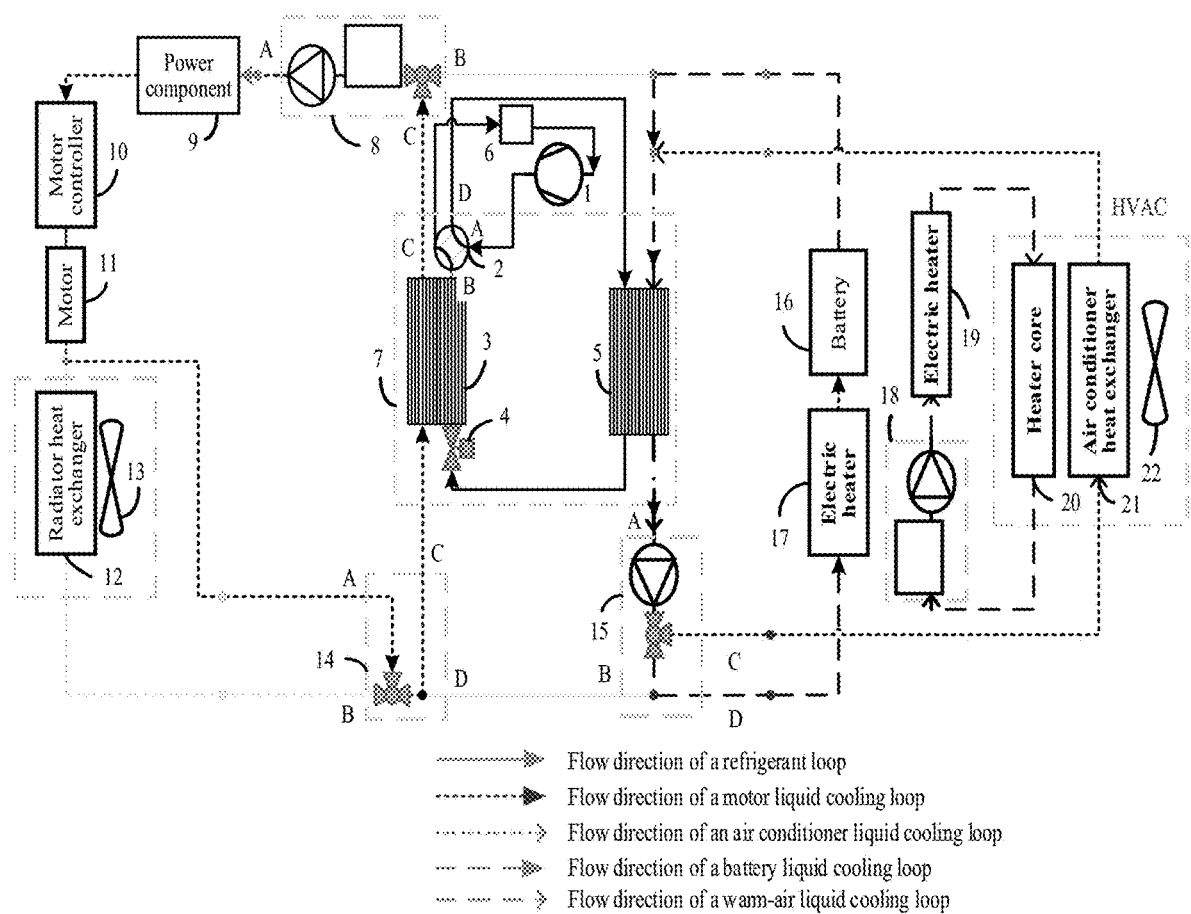
FIG. 9 is a schematic diagram of a flow direction of a related working medium in a thermal management system according to an embodiment of this application.

FIG. 9 is a schematic diagram of a flow direction of a related working medium in a thermal management system in a scenario in which a passenger compartment and a battery are heated. In some embodiments, the schematic diagram includes a flow direction of a refrigerant loop, a flow direction of a motor liquid cooling loop, a flow direction of an air conditioner liquid cooling loop, a flow direction of a battery liquid cooling loop, and a flow direction of a warm-air liquid cooling loop.

As shown in FIG. 9, the flow direction of the refrigerant loop is described as follows: An end A and an end D of a refrigerant four-way valve 2 are connected, and an end B and an end C of the refrigerant four-way valve 2 are connected. A high-temperature refrigerant discharged by a compressor 1 passes through the end A and the end D of the refrigerant four-way valve 2 and enters a plate heat exchanger 5 for condensation and heat dissipation. Heat required for heating a battery and a passenger compartment is supplied. After the high-temperature refrigerant passes through a throttle valve 4, the high-temperature refrigerant is throttled into a low-temperature gas-liquid two-phase refrigerant, and then the low-temperature gas-liquid two-phase refrigerant is evaporated through a plate heat exchanger 3 to absorb heat, to obtain residual heat of a motor in the plate heat exchanger 3 or heat in the environment. Finally, the low-temperature gas-liquid two-phase refrigerant enters a gas-liquid separator 6 through the end B and the end C of the four-way valve 2, and enters a suction vent of the compressor 1 through an outlet of the gas-liquid separator 6.

The flow direction of the motor liquid cooling loop is described as follows: An end B of a multi-functional valve 8 of the motor liquid cooling loop is closed. An end C receives a low-temperature liquid output from the plate heat exchanger 3. After the low-temperature liquid is output through an end A, the low-temperature liquid sequentially passes through a power device 9, a motor controller 10, and a motor 11. When the motor is started, an end B of an integrated valve 14 may be closed, so that the high-temperature liquid discharged by the motor 11 directly enters an end A of the integrated valve 14 and is output to the plate heat exchanger 3 from an end C of the integrated valve 14, to provide heat required for evaporation. When the motor is turned off, the end A of the integrated valve 14 is turned off, and the end B is turned on, so that after the low-temperature liquid is discharged by the motor 11, the low-temperature liquid absorbs heat from the environment, and then enters the plate heat exchanger 3 from the end C of the integrated valve.

The flow direction of the air conditioner liquid cooling loop and the flow direction of the battery liquid cooling loop are respectively described as follows: An end C and an end D of an integrated valve pump 15 belonging to the battery liquid cooling loop and the air conditioner liquid cooling loop are opened. An end A receives the high-temperature liquid output from the plate heat exchanger 5. A part of the high-temperature liquid is output from the end C and passes through an air conditioner heat exchanger 21, to heat the passenger compartment. The other part of the high-temperature liquid is output from the end D and passed through an electric heater 17, to heat a battery pack 16. The low-temperature liquid after heating the battery and the passenger compartment passes through a three-way water pipe and enters the plate heat exchanger 5 again. In some embodiments, an opening of a water path three-way valve in the integrated valve pump 15 is adjusted to adjust heat allocation of the battery and the passenger compartment.

The flow direction of the warm-air liquid cooling loop is described as follows: If water temperatures at the end C and the end D of the integrated valve pump 15 are relatively low, the electric heater 17 may be opened to help heat the battery, and an integrated kettle pump 18 and an electric heater 19 may be opened to help heat the passenger compartment.

Figure 10:
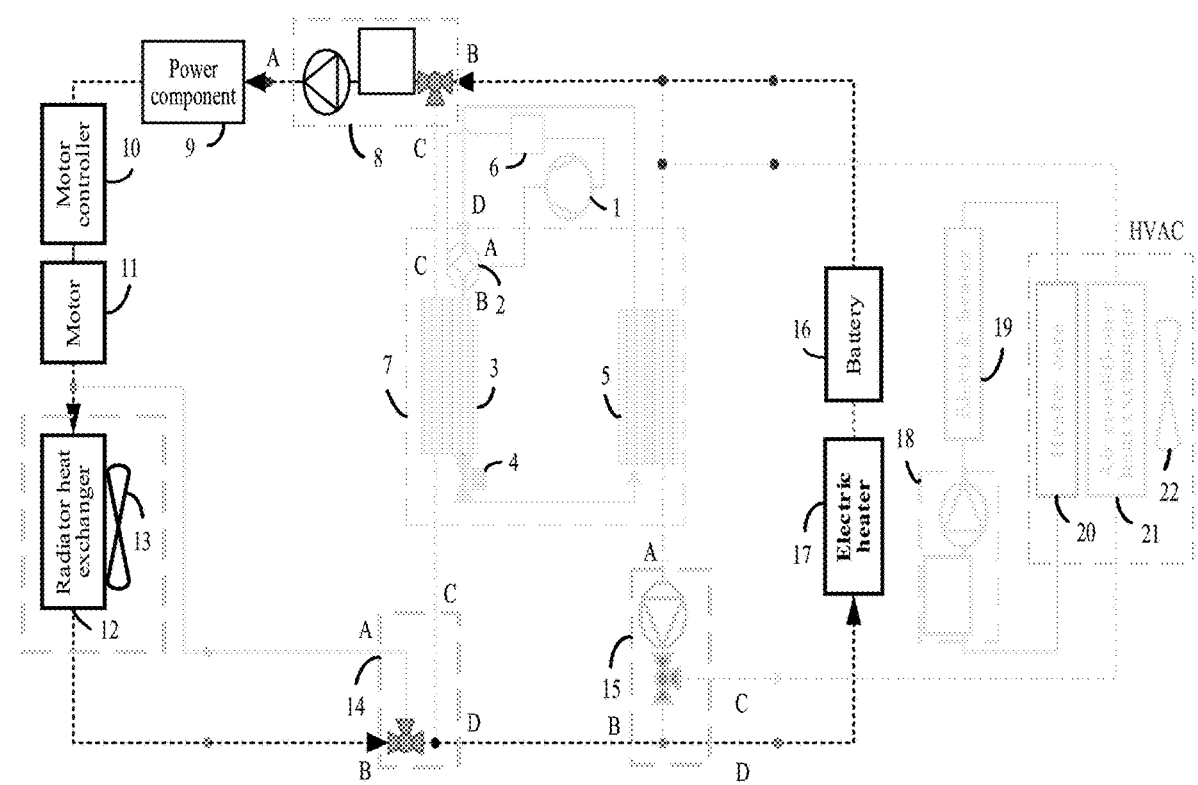
FIG. 10 is a schematic diagram of a flow direction of a related working medium in a thermal management system according to an embodiment of this application.

FIG. 10 is a schematic diagram of a flow direction of a related working medium in a heat management system in a scenario in which a battery is naturally cooled. As shown in FIG. 10, when an ambient temperature is relatively low and only a battery and a motor are naturally cooled, a refrigerant loop is closed. Heat generated by the battery and the motor can be naturally cooled by a radiator 12.

In some embodiments, a direction of a liquid cooling loop is described as follows: An end C of a multi-functional valve 8 is closed, an end B receives a high-temperature liquid from an outlet of a battery pack 16, and the high-temperature liquid discharged from an end A passes through a power device 9, a motor controller 10, and a motor 11. In this case, an end A of an integrated valve 14 is closed, so that the high-temperature liquid at an outlet of the motor 11 is cooled to a low-temperature liquid through a radiator 12. Because the end C of the multi-functional valve 8 is closed, the low-temperature liquid from the radiator 12 can enter an end B of an integrated valve pump 15 only through an end D of the integrated valve 14. In this case, an end that connects the end B and an end D and that is of a three-way water valve in the integrated valve pump 15 is closed, so that the low-temperature liquid is discharged from the end D of the integrated valve pump 15, and flows through an electric heater 17 that is not turned on, to enter the battery pack 16 to cool the battery.

Figure 11:
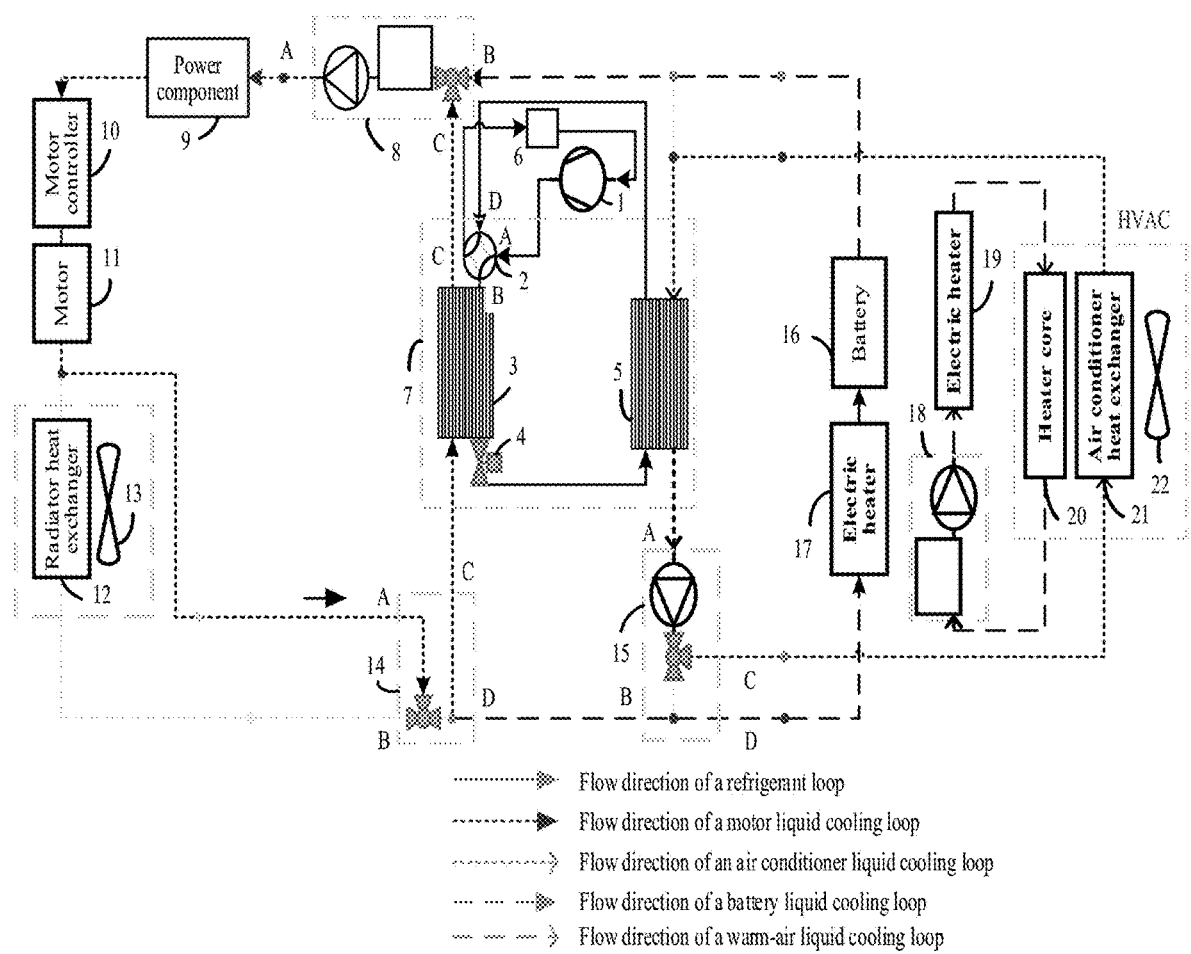
FIG. 11 is a schematic diagram of a flow direction of a related working medium in a thermal management system according to an embodiment of this application.

FIG. 11 is a schematic diagram of a flow direction of a related working medium in a thermal management system in a scenario in which a battery is heated and a passenger compartment is dehumidified. In some embodiments, the schematic diagram includes a flow direction of a refrigerant loop, a flow direction of a motor liquid cooling loop, a flow direction of an air conditioner liquid cooling loop, a flow direction of a battery liquid cooling loop, and a flow direction of a warm-air liquid cooling loop.

As shown in FIG. 11, the flow direction of the refrigerant loop is described as follows: An end A and an end B of the refrigerant four-way valve 2 are connected, and an end D and an end C of the refrigerant four-way valve 2 are connected. High-temperature refrigerant discharged by a compressor 1 passes through the end A and the end B of the refrigerant four-way valve 2 and enters a plate heat exchanger 3 for condensation and heat dissipation. After the high-temperature refrigerant passes through a throttle valve 4, the high-temperature refrigerant is throttled into a low-temperature gas-liquid two-phase refrigerant, and then the low-temperature gas-liquid two-phase refrigerant is evaporated through a plate heat exchanger 5 to absorb heat from a passenger compartment. Finally, the low-temperature gas-liquid two-phase refrigerant enters a gas-liquid separator 6 through the end C and the end D of the refrigerant four-way valve 2, and enters a suction vent of a compressor 1 through an outlet of the gas-liquid separator 6.

The flow direction of the motor liquid cooling loop is described as follows: An end B and an end C of a multi-functional valve 8 of the motor liquid cooling loop are opened at the same time, the end C receives the high-temperature liquid output from the plate heat exchanger 3, the end B receives the low-temperature liquid output from the battery pack 16, and after the low-temperature liquid is output through an end A, the low-temperature liquid sequentially passes through a power device 9, a motor controller 10, and a motor 11. In this scenario, an end B of an integrated valve 14 is closed, so that the high-temperature liquid from the motor 11 enters from an end A of an integrated valve 14. A part of the high-temperature liquid is output from an end C of the integrated valve 14 to the plate heat exchanger 3. The other part of the high-temperature liquid is output from an end D of the integrated valve 14, passes through an end B and an end D of an integrated valve pump 15, passes through an electric heater 17, and flows into a battery pack 16.

The flow direction of the air conditioner liquid cooling loop is described as follows: An end A of the integrated valve pump 15 of the air conditioner liquid cooling loop receives the low-temperature liquid output by the plate heat exchanger 5. The low-temperature liquid is output from an end C and then enters an air conditioner heat exchanger 21 in HVAC. A high-temperature liquid at an outlet of the air conditioner heat exchanger 21 returns to the plate heat exchanger 5.

The flow direction of the warm-air liquid cooling loop is described as follows: An integrated kettle pump 18 and an electric heater 19 of the warm-air liquid cooling loop are opened, so that a cooling function of the air conditioner heat exchanger 21, a heating function of the heater core 20, and a dehumidification function of a passenger compartment are implemented.

The flow direction of the battery liquid cooling loop is described as follows: The end B of the multi-functional valve 8 receives the low-temperature liquid from an outlet of a battery pack 16, and the low-temperature liquid discharged from the end A passes through the power device 9, the motor controller 10, and the motor 11. In this case, the end B of the integrated valve 14 is closed, so that the high-temperature liquid at an outlet of the motor 11 enters from the end A of the integrated valve 14, enters the end B of the integrated valve 15 from the end D of the integrated valve 14, and flows out to the electric heater 17 from the end D, and enters the battery pack 16, to heat the battery.

Figure 12:
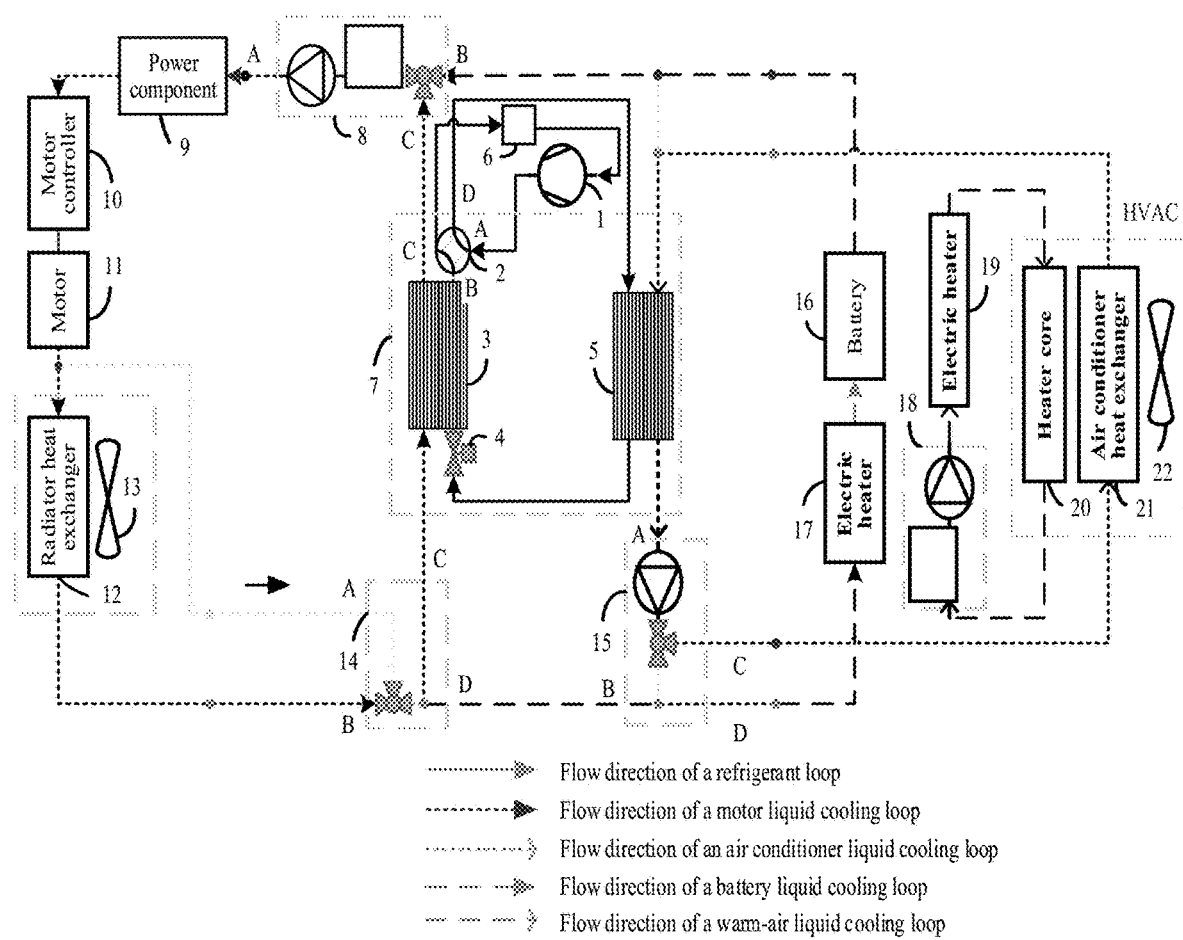
FIG. 12 is a schematic diagram of a flow direction of a related working medium in a thermal management system according to an embodiment of this application.

FIG. 12 is a schematic diagram of a flow direction of a related working medium in a thermal management system in a scenario in which a battery is naturally cooled and a passenger compartment is heated. In some embodiments, the schematic diagram includes a flow direction of a refrigerant loop, a flow direction of a motor liquid cooling loop, a flow direction of an air conditioner liquid cooling loop, a flow direction of a battery liquid cooling loop, and a flow direction of a warm-air liquid cooling loop.

As shown in FIG. 12, the flow direction of the refrigerant loop is described as follows: An end A and an end D of a refrigerant four-way valve 2 are connected, and an end B and an end C of the refrigerant four-way valve 2 are connected. A high-temperature refrigerant discharged by a compressor 1 passes through the end A and the end D of the refrigerant four-way valve 2 and enters a plate heat exchanger 5 for condensation and heat dissipation. Heat required for heating a passenger compartment is supplied. After the high-temperature refrigerant passes through a throttle valve 4, the high-temperature refrigerant is throttled into a low-temperature gas-liquid two-phase refrigerant, and then the low-temperature gas-liquid two-phase refrigerant is evaporated through a plate heat exchanger 3 to absorb heat. Finally, the low-temperature gas-liquid two-phase refrigerant enters a gas-liquid separator 6 through the end B and the end C of the four-way valve 2, and enters a suction vent of the compressor 1 through an outlet of the gas-liquid separator 6.

The flow direction of the motor liquid cooling loop is described as follows: An end B and an end C of a multi-functional valve 8 of the motor liquid cooling loop are opened at the same time, the end C receives the low-temperature liquid output from the plate heat exchanger 3, the end B receives the high-temperature liquid output from a battery pack 16, and after the high-temperature liquid is output through an end A, the high-temperature liquid sequentially passes through a power device 9, a motor controller 10, and a motor 11. In this scenario, an end A of an integrated valve 14 is closed, so that the high-temperature liquid from the motor 11 is cooled to a low-temperature liquid by using a radiator heat exchanger 12, and the low-temperature liquid enters from an end B of the integrated valve 14. Apart of the low-temperature liquid is output from an end C of the integrated valve 14 to the plate heat exchanger 3. The other part of the low-temperature liquid is output from an end D of the integrated valve 14 to an end B and an end D of an integrated valve pump 15, passes through an electric heater 17, and then enters a battery pack 16.

The flow direction of the air conditioner liquid cooling loop is described as follows: An end A of the integrated valve pump 15 of a passenger compartment liquid cooling loop receives the high-temperature liquid output by the plate heat exchanger 5. The high-temperature liquid is output from an end C and then enters an air conditioner heat exchanger 21 in HVAC. A low-temperature liquid at an outlet of the air conditioner heat exchanger 21 returns to the plate heat exchanger 5.

The flow direction of the warm-air liquid cooling loop is described as follows: If heat temperature at the end C of the integrated valve pump 15 is relatively low, an integrated kettle pump 18 and an electric heater 19 of the passenger compartment warm-air loop may be opened, to help heat the passenger compartment.

The flow direction of the battery liquid cooling loop is described as follows: The end B of the multi-functional valve 8 receives the high-temperature liquid from an outlet of the battery pack 16, and the high-temperature liquid discharged from the end A passes through the power device 9, the motor controller 10, and the motor 11. In this case, the end A of the integrated valve 14 is closed, so that the high-temperature liquid at an outlet of the motor 11 is cooled to the low-temperature liquid through the radiator heat exchanger 12, and the low-temperature liquid enters from the end B of the integrated valve 14, then enters the end B of the integrated valve 15 from the end D of the integrated valve 14, flows out from the end D, and flows through the electric heater 17 that is not turned on, to enter the battery pack 16 to naturally cool the battery.

It can be learned that in this embodiment of this application, the refrigerant four-way reversing valve is used to simplify the loop of the refrigerant loop system. The two plate heat exchangers are used, so that a refrigerant in the refrigerant loop can exchange heat with the coolant in the motor liquid cooling loop by using the plate heat exchanger 3, and exchange heat with the coolant in the air conditioner liquid cooling loop by using the plate heat exchanger 5, and/or exchange heat with the coolant in the battery liquid cooling loop by using the plate heat exchanger 5. Therefore, use of a parallel-flow heat exchanger is avoided. Because the plate heat exchanger has a relatively small volume, a structural integration solution of the thermal management system can be implemented by using the plate heat exchanger and according to a coolant heat exchange method, and main components in the system can be integrated into different integrated bodies. An electronic control integration solution of the thermal management system can also be implemented to shorten refrigerant pipes and electric control wires. In addition, this embodiment of this application may also be applicable to various actual application scenarios, for example, cooling/heating/dehumidification of the passenger compartment, battery cooling/heating, and motor cooling/heat recovery. Therefore, this embodiment of this application helps reduce space occupied by a front compartment in the thermal management system, and also helps reduce costs of the thermal management system.

Figure 13:
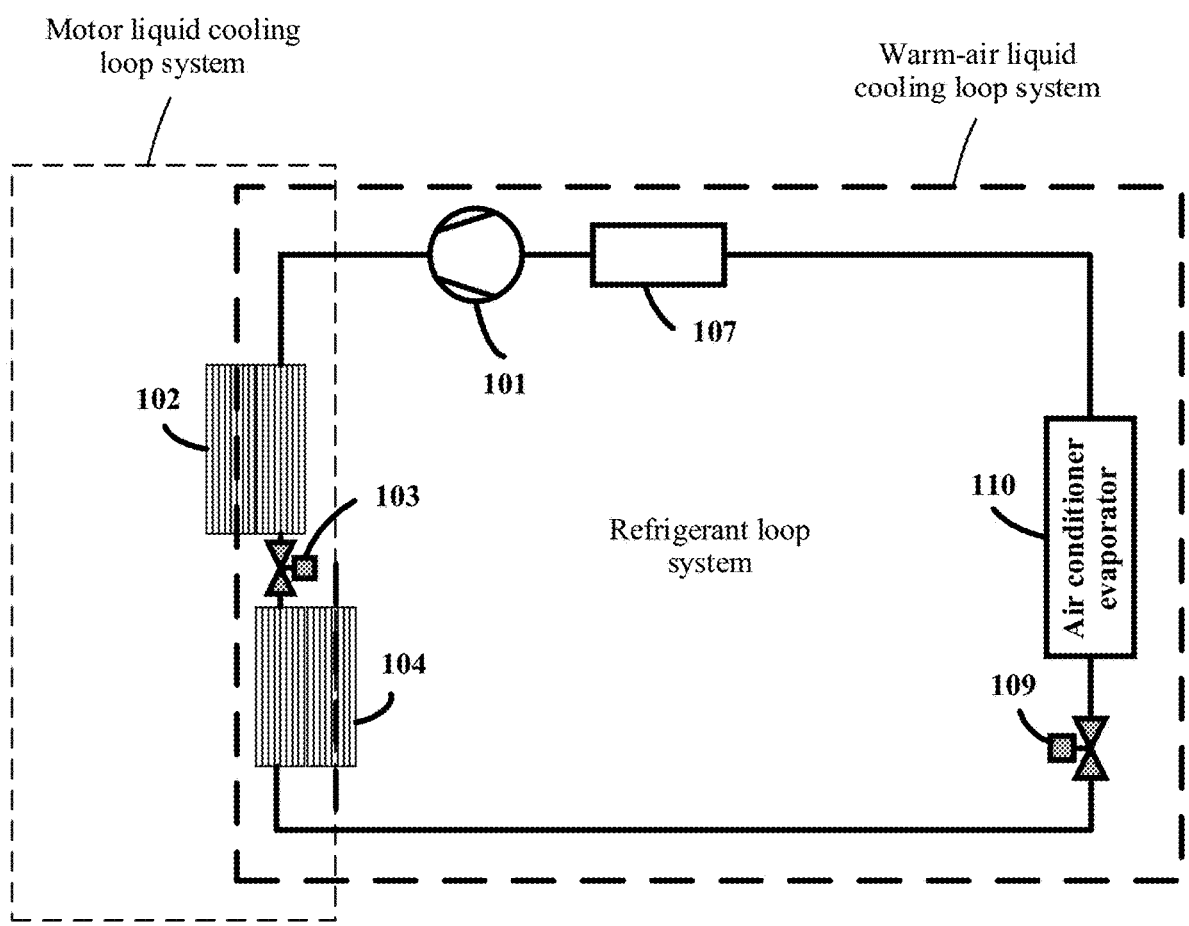
FIG. 13 is a schematic structural diagram of a thermal management system according to an embodiment of this application.

FIG. 13 is a schematic structural diagram of still another thermal management system according to an embodiment of this application. As shown in FIG. 13, the thermal management system includes a refrigerant loop system, a motor liquid cooling loop system, and a warm-air liquid cooling loop system.

The refrigerant loop system includes a compressor 101, a plate heat exchanger 102, a throttle valve 103, a plate heat exchanger 104, a throttle valve 109, an evaporator 110 (or referred to as an air conditioner evaporator 110), and a gas-liquid separator 107. Both the plate heat exchanger 102 and the plate heat exchanger 104 include two pairs of inlet and outlet channels. One pair of the inlet and outlet channels is a refrigerant channel used for circulating refrigerant, and the other pair of the inlet and outlet channels is a liquid cooling channel used for circulating coolant. Heat can be exchanged between the refrigerant in the refrigerant channel and the coolant in the liquid cooling channel.

The compressor 101, the plate heat exchanger 102, the throttle valve 103, the plate heat exchanger 104, the throttle valve 109, the air conditioner evaporator 110, and the gas-liquid separator 107 are sequentially serially connected to form a loop. In some embodiments, an outlet of the compressor 101 is connected to a first end of the refrigerant channel in the plate heat exchanger 102 by using a pipe. A second end of the refrigerant channel in the plate heat exchanger 102 is connected to a first end of the throttle valve 103. A second end of the throttle valve 103 is connected to a first end of the refrigerant channel in the plate heat exchanger 104. A second end of the refrigerant channel in the plate heat exchanger 104 is connected to a first end of the throttle valve 109. A second end of the throttle valve 109 is connected to a first end of the air conditioner evaporator 110. A second end of the air conditioner evaporator 110 is connected to a first end of the gas-liquid separator 107. A second end of the gas-liquid separator 107 is connected to an inlet of the compressor 101. Therefore, a refrigerant loop (or referred to as a first refrigerant loop) is formed, and the refrigerant loop is used to circulate the refrigerant.

The motor liquid cooling loop system includes a motor liquid cooling loop that circulates coolant through a motor, and two pipes in the motor liquid cooling loop are respectively connected to a first end and a second end of the liquid cooling channel in the plate heat exchanger 103. The motor liquid cooling loop system and the refrigerant loop system exchange heat by using the plate heat exchanger 103, in other words, the coolant in the motor liquid cooling loop system and the refrigerant in the refrigerant loop system exchange heat by using the plate heat exchanger 103.

The warm-air liquid cooling loop system includes a warm-air liquid cooling loop that circulates coolant through a heater core, and pipes in the warm-air liquid cooling loop are respectively connected to a first end and a second end of the liquid cooling channel in the plate heat exchanger 102. The warm-air liquid cooling loop system and the refrigerant loop system exchange heat by using the plate heat exchanger 102, in other words, the coolant in the air conditioner liquid cooling loop system and the refrigerant in the refrigerant loop system may exchange heat by using the plate heat exchanger 102.

In a specific implementation solution, the throttle valve 103 may be fully opened to a pipe diameter, and the throttle valve 109 performs throttling normally. In this case, the high-temperature refrigerant discharged by the compressor 101 sequentially enters the plate heat exchanger 102 and the plate heat exchanger 104 for condensation and heat dissipation. The high-temperature refrigerant is throttled into a low-temperature gas-liquid two-phase refrigerant by the throttle valve 109. The low-temperature gas-liquid two-phase refrigerant passes through the air conditioner evaporator 110 to absorb heat from a passenger compartment (the air conditioner evaporator is installed in the passenger compartment). Finally, the low-temperature gas-liquid two-phase refrigerant enters the gas-liquid separator 107 and enters a suction vent of the compressor 101. In this way, the refrigerant is circulated. The coolant in the motor liquid cooling loop system may absorb heat by using the plate heat exchanger 104, and implement heat dissipation by using the motor liquid cooling loop. The coolant in the warm-air liquid cooling loop system may absorb heat by using the plate heat exchanger 102, and output heat in the warm-air liquid cooling loop. For example, the passenger compartment is heated by using the heater core, to achieve a dehumidification purpose through cooling of the air conditioner evaporator 110.

The thermal management system in this embodiment of this application may be applied to a conventional energy vehicle (an internal combustion engine vehicle), or may be applied to a new energy vehicle (for example, an electric vehicle or a hybrid vehicle).

It can be learned that in this embodiment of this application, when the refrigerant four-way valve is not used, the loop of the refrigerant loop system is simplified, and when the refrigerant loop has only one flow direction, a heat pump cooling function and/or a heat pump heating function are/is implemented on the passenger compartment by using a heat pump air-conditioning system. The two plate heat exchangers are used, so that the refrigerant in the refrigerant loop can exchange heat with the coolant in the motor liquid cooling loop by using the plate heat exchanger 104, and exchange heat with the coolant in the warm-air liquid cooling loop by using the plate heat exchanger 102. Therefore, use of a parallel-flow heat exchanger is avoided. Because the plate heat exchanger has a relatively small volume, a structural integration solution and an electronic control integration solution of the thermal management system can be implemented by using the plate heat exchanger and according to a coolant heat exchange method. Therefore, this embodiment of this application helps reduce space occupied by a front compartment in the thermal management system, and also helps reduce costs of the thermal management system.

Figure 14:
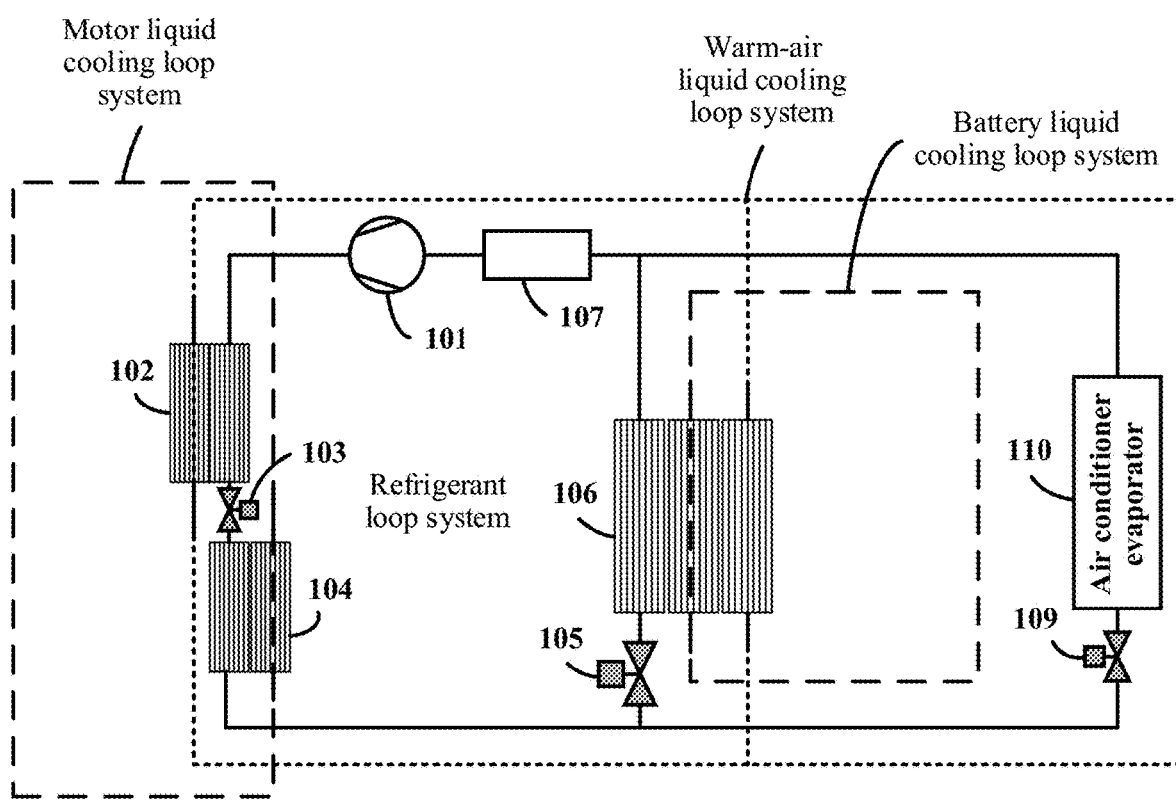
FIG. 14 is a schematic structural diagram of a thermal management system according to an embodiment of this application.

FIG. 14 is a schematic structural diagram of still another thermal management system according to an embodiment of this application. As shown in FIG. 14, a difference between the thermal management system and the thermal management system shown in FIG. 13 lies in that a battery liquid cooling loop system is added to the thermal management system shown in FIG. 14, and a refrigerant branch including the plate heat exchanger 106 is added in FIG. 14, so that another refrigerant loop (or referred to as a second refrigerant loop) is formed. The warm-air liquid cooling system may implement heat exchange by using the plate heat exchanger 102, or may implement heat exchange by using the plate heat exchanger 106. Details are described as follows:

The plate heat exchanger 106 includes three pairs of inlet and outlet channels. One pair of the inlet and outlet channels is a refrigerant channel configured to circulate refrigerant, and the other two pairs of the inlet and outlet channels are liquid cooling channels. One of the liquid cooling channels (which may be referred to as a first liquid cooling channel) is configured to circulate coolant in the battery liquid cooling loop system, and the other liquid cooling channel (which may be referred to as a second liquid cooling channel) is configured to circulate coolant in the warm-air liquid cooling loop system. Heat can be exchanged between the refrigerant in the refrigerant channel and the coolant in the two liquid cooling channels.

Based on FIG. 14, the newly added refrigerant branch includes a throttle valve 105 and a plate heat exchanger 106. In addition to being connected to a first end of a throttle valve 109, a second end of a refrigerant channel in a plate heat exchanger 104 is further connected to a first end of the throttle valve 105. A second end of the throttle valve 105 is connected to a first end of the refrigerant channel of the plate heat exchanger 106. A second end of the refrigerant channel of the plate heat exchanger 106 is connected to a first end of a gas-liquid separator 107, to form a second refrigerant loop including the compressor 101, the plate heat exchanger 102, the throttle valve 103, the plate heat exchanger 104, the throttle valve 105, the plate heat exchanger 106, and the gas-liquid separator 107.

The battery liquid cooling loop system includes a battery liquid cooling loop that circulates coolant through a battery pack. Two pipes in the battery liquid cooling loop are respectively connected to a first end and a second end of the first liquid cooling channel in the plate heat exchanger 106. The battery liquid cooling loop system and the refrigerant loop system exchange heat by using the plate heat exchanger 106, in other words, the coolant in the battery liquid cooling loop system and the refrigerant in the refrigerant loop system exchange heat by using the plate heat exchanger 106.

Pipes in the warm-air liquid cooling loop are further connected to a first end and a second end of the second liquid cooling channel in the plate heat exchanger 106. The warm-air liquid cooling loop system and the refrigerant loop system may exchange heat by using the plate heat exchanger 102 and/or the plate heat exchanger 106, in other words, the coolant in the air conditioner liquid cooling loop system and the refrigerant in the refrigerant loop system may exchange heat in the plate heat exchanger 102, or may exchange heat in the plate heat exchanger 106.

In a specific implementation solution, the throttle valve 103 may be fully opened to a pipe diameter, and the throttle valve 109 performs throttling normally. In this case, the high-temperature refrigerant discharged by the compressor 101 sequentially enters the plate heat exchanger 102 and the plate heat exchanger 104 for condensation and heat dissipation, and then is throttled into a low-temperature gas-liquid two-phase refrigerant by using the throttle valve 109 and the throttle valve 105 respectively. The low-temperature gas-liquid two-phase refrigerant respectively passes through an air conditioner evaporator 110 and the plate heat exchanger 106 to absorb heat of a passenger compartment (the air conditioner evaporator is installed in the passenger compartment) and heat of the battery pack. Finally, the low-temperature gas-liquid two-phase refrigerant enters the gas-liquid separator 107 and enters a suction vent of the compressor 101. In this way, the refrigerant is circulated. The coolant in the motor liquid cooling loop system may absorb heat by using the plate heat exchanger 104, and implement heat dissipation by using the motor liquid cooling loop. The coolant in the warm-air liquid cooling loop system may absorb heat by using the plate heat exchanger 102 and the plate heat exchanger 106, and output heat in the warm-air liquid cooling loop. For example, the passenger compartment is heated by using the heater core, to achieve a dehumidification purpose through cooling of the air conditioner evaporator 110.

The thermal management system in this embodiment of this application may be applied to a new energy vehicle (for example, an electric vehicle or a hybrid vehicle).

It can be learned that in this embodiment of this application, when the refrigerant four-way valve is not used, and when the refrigerant loop has only one flow direction, a cooling function and/or a heating function are/is implemented on the passenger compartment, and/or a cooling function and/or a heating function are/is implemented on the battery pack, by using a heat pump air-conditioning system. Three plate heat exchangers are designed, so that the refrigerant in the refrigerant loop can exchange heat with the coolant in the motor liquid cooling loop by using the plate heat exchanger 104, exchange heat with the coolant in the warm-air liquid cooling loop by using the plate heat exchanger 102 and the plate heat exchanger 106, and exchange heat with the coolant in the battery liquid cooling loop by using the plate heat exchanger 106. Therefore, use of a parallel-flow heat exchanger is avoided. Because the plate heat exchanger has a relatively small volume, a structural integration solution and an electronic control integration solution of the thermal management system can be implemented by using the plate heat exchanger and according to a coolant heat exchange method. Therefore, this embodiment of this application helps reduce space occupied by a front compartment in the thermal management system, and also helps reduce costs of the thermal management system.

Figure 15:
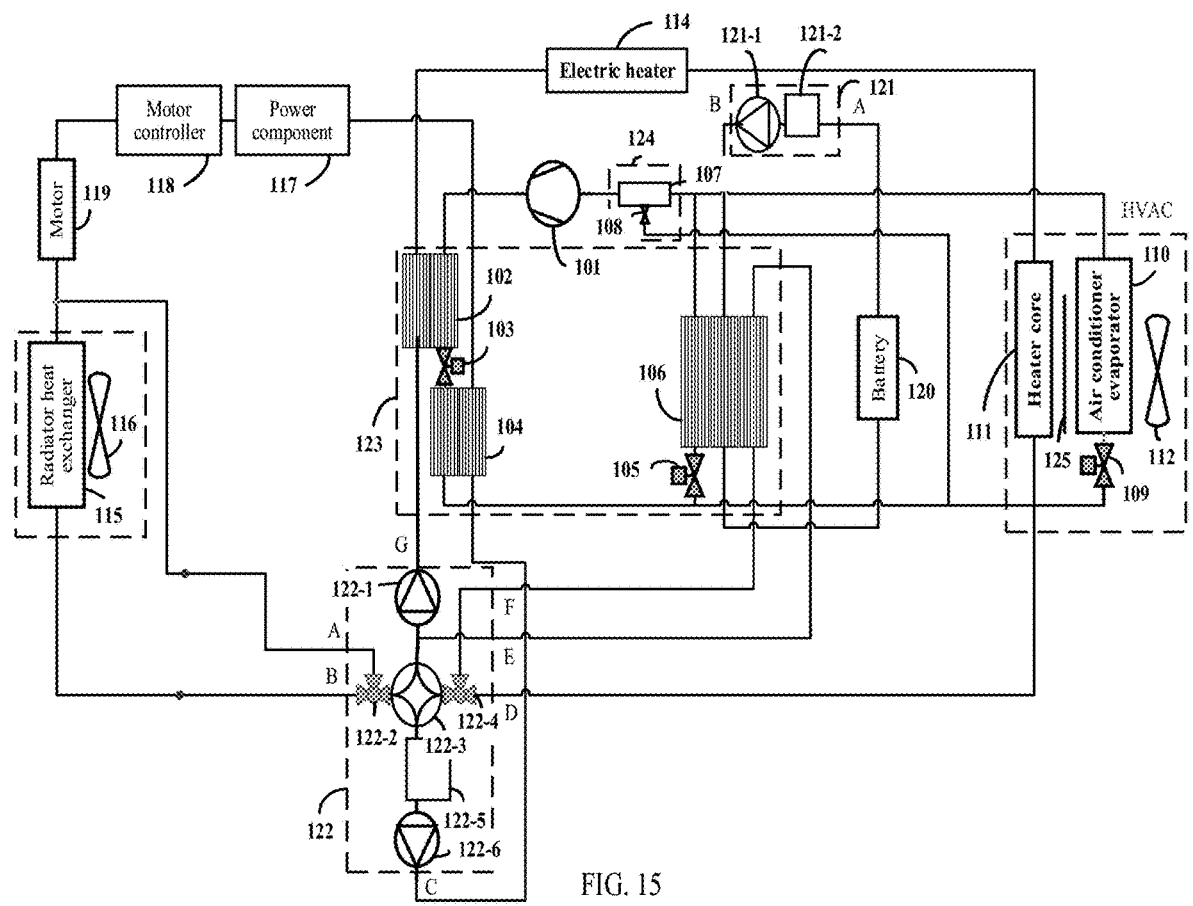
FIG. 15 is a detailed schematic structural diagram of a thermal management system according to an embodiment of this application.

Based on the thermal management system shown in the embodiment in FIG. 14, the following describes a connection relationship between related components in a thermal management system in an implementation scenario by using an example. For details, refer to FIG. 15. FIG. 15 is a detailed schematic structural diagram of a thermal management system according to an embodiment of this application. As shown in FIG. 15, the thermal management system is an integrated thermal management system that does not include a refrigerant four-way reversing valve structure. An integrated kettle pump 121, a multi-functional valve body 122, an integrated body 123, and an integrated body 124 are integrated in the thermal management system.

The integrated kettle pump 121 is an integrated body formed by a water pump 121-1 and an expansion kettle 121-2, and is configured to implement a water pump function and a water storage function. One end of the expansion kettle 121-2 is connected to one end of the water pump 121-12. The other end of the expansion kettle 121-2 provides an external interface (marked as an end A, for example, configured to connect to a battery pack 120). The other end of the water pump 121-12 provides an external interface (marked as an end B, for example, configured to connect to a plate heat exchanger 106).

The multi-functional valve body 122 has the water pump function, a water flow reversing function, and the water storage function. The multi-functional valve body 122 includes the water pump 122-1, a water pump 122-6, a three-way water valve 122-2, a three-way water valve 122-4, a four-way water valve 122-3, and a kettle 122-5. The four-way water valve 122-3 is connected to the water pump 122-1, the three-way water valve 122-2, the three-way water valve 122-4, and the water kettle 122-5. The water kettle 122-5 is further connected to the water pump 122-6. The other end of the water pump 122-6 also provides an external interface (marked as an end C, for example, configured to connect to a plate heat exchanger 104). The three-way water valve 122-2 further provides two external interfaces. For example, one is marked as an end A, and the other is marked as an end B. The end A is configured to connect to a motor 119, and the end B is configured to connect to a radiator heat exchanger 115. The water pump 122-1 further provides two external interfaces, for example, one is marked as an end G, and the other is marked as an end E. For example, the end G is configured to connect to the plate heat exchanger 102, and the end E is configured to connect to the plate heat exchanger 106. The three-way water valve 122-4 further provides two external interfaces, for example, one is marked as an end F, and the other is marked as an end D. For example, the end F is configured to connect to the plate heat exchanger 106, and the end D is configured to connect to the heater core 111.

The integrated body 123 includes the plurality of plate heat exchangers (the plate heat exchanger 102, the plate heat exchanger 104, and the plate heat exchanger 106) and a plurality of throttle valves (a throttle valve 103 and a throttle valve 105). A temperature and pressure sensor may also be arranged on the pipes connected to various integrated components.

The integrated body 124 includes a gas-liquid separator 107 and a solenoid valve 108.

The plate heat exchanger 106 provides three pairs of inlets and outlets to cool and heat the battery.

In the thermal management system shown in FIG. 15, a connection relationship of the refrigerant loop is as follows: An outlet of the compressor 101 is connected to one end of the plate heat exchanger 102 (namely, one end of a refrigerant channel of the plate heat exchanger 102). The other end of the plate heat exchanger 102 (namely, the other end of the refrigerant channel of the plate heat exchanger 102) is connected to one end of the throttle valve 103. The other end of the throttle valve 103 is connected to one end of the plate heat exchanger 104 (namely, one end of a refrigerant channel of the plate heat exchanger 104). The other end of the plate heat exchanger 104 (namely, the other end of the refrigerant channel of the plate heat exchanger 104) is separately connected to one end of the throttle valve 105 and one end of the throttle valve 10. The other end of the throttle valve 105 is connected to one end of the plate heat exchanger 106 (namely, one end of a refrigerant channel of the plate heat exchanger 106). The other end of the throttle valve 109 is connected to one end of the air conditioner evaporator 110. The other end of the air conditioner evaporator 110 and the other end of the plate heat exchanger 106 (namely, the other end of the refrigerant channel of the plate heat exchanger 106) are both connected to an inlet of the gas-liquid separator 107. The other end of the plate heat exchanger 104 (namely, the other end of the refrigerant channel of the plate heat exchanger 104) is connected to one end of the solenoid valve 108. The other end of the solenoid valve 108 is connected to the inlet of the gas-liquid separator 107. An outlet of the gas-liquid separator 107 is connected to an inlet of the compressor 101. The throttle valve 103 can be a full-pass throttle valve, and can be an assembly including the solenoid valve and an ordinary throttle valve. The throttle valve 105 and the throttle valve 106 can be completely closed. The throttle valve may be replaced by a capillary tube, an expansion valve, a baffle plate, or the like that has a throttling function.

In the thermal management system shown in FIG. 15, a connection relationship of the warm-air liquid cooling loop is as follows: An end G of the multi-functional valve body 122 is connected to one end of the plate heat exchanger 102. The other end of the plate heat exchanger 102 is connected to one end of an electric heater 114. The other end of the electric heater 114 is connected to one end of the heater core 111. The other end of the heater core 111 is connected to an end D of the multi-functional valve body 122. An end F of the multi-functional valve body 122 is connected to one end of the plate heat exchanger 106. The other end of the plate heat exchanger 106 is connected to the end D of the multi-functional valve body 122.

In the thermal management system shown in FIG. 15, a connection relationship of the battery liquid cooling loop is as follows: An outlet B of the integrated kettle pump 121 is connected to one end of the plate heat exchanger 106. The other end of the plate heat exchanger 106 is connected to one end of a cooling device of the battery pack 120. The other end of the cooling device of the battery pack 120 is connected to an inlet A of the integrated kettle pump 121.

The cooling device of the battery pack 120 is an apparatus that implements heating or cooling of the battery pack by circulating coolant. For example, the cooling device of the battery pack 120 may be a water-cooling coil pipe, a cooling plate, or the like in contact with the battery pack. This is not limited in this specification.

It should be noted that, in this specification, for ease of description, "the cooling device connected to the battery pack 120" is sometimes briefly described as "the connected battery pack 120", in other words, "the cooling device of the battery pack 120" is briefly described as "the battery pack 120".

In the thermal management system shown in FIG. 15, a connection relationship of the motor liquid cooling loop is as follows: An end C of the multi-functional valve body 122 is connected to one end of the plate heat exchanger 104. The other end of the plate heat exchanger 104 is connected to one end of a cooling device of the power device 117. The other end of the cooling device of the power device 117 is connected to one end of a cooling device of the motor controller 118. The other end of the cooling device of the motor controller 118 is connected to one end of a cooling device of the motor 119. The other end of the cooling device of the motor 119 is separately connected to one end of the radiator heat exchanger 115 and an end A of the multi-functional valve body 122. The other end of the radiator heat exchanger 115 is connected to an end B of the multi-functional valve body 122.

Similarly, in this specification, for ease of description, "the cooling device of the power device 117" is sometimes briefly described as "the power device 117", "the cooling device of the motor controller 118" is briefly described as "the motor controller 118", and "the cooling device of the motor 119" is briefly described as "the motor 119".

For specific integration manners of the integrated kettle pump 121, the multi-functional valve body 122, the integrated body 123, and the integrated body 124, refer to related descriptions in the embodiments of FIG. 3A, FIG. 3B, and FIG. 3C. For brevity of the specification, details are not described herein again.

In addition, the integrated kettle pump 121, the multi-functional valve body 122, the integrated body 123, and the integrated body 124 may also be jointly integrated to become the thermal management integration module described above.

Based on the structural connection relationship in the embodiment in FIG. 15, the following describes an example of a main application scenario.

Figure 16:
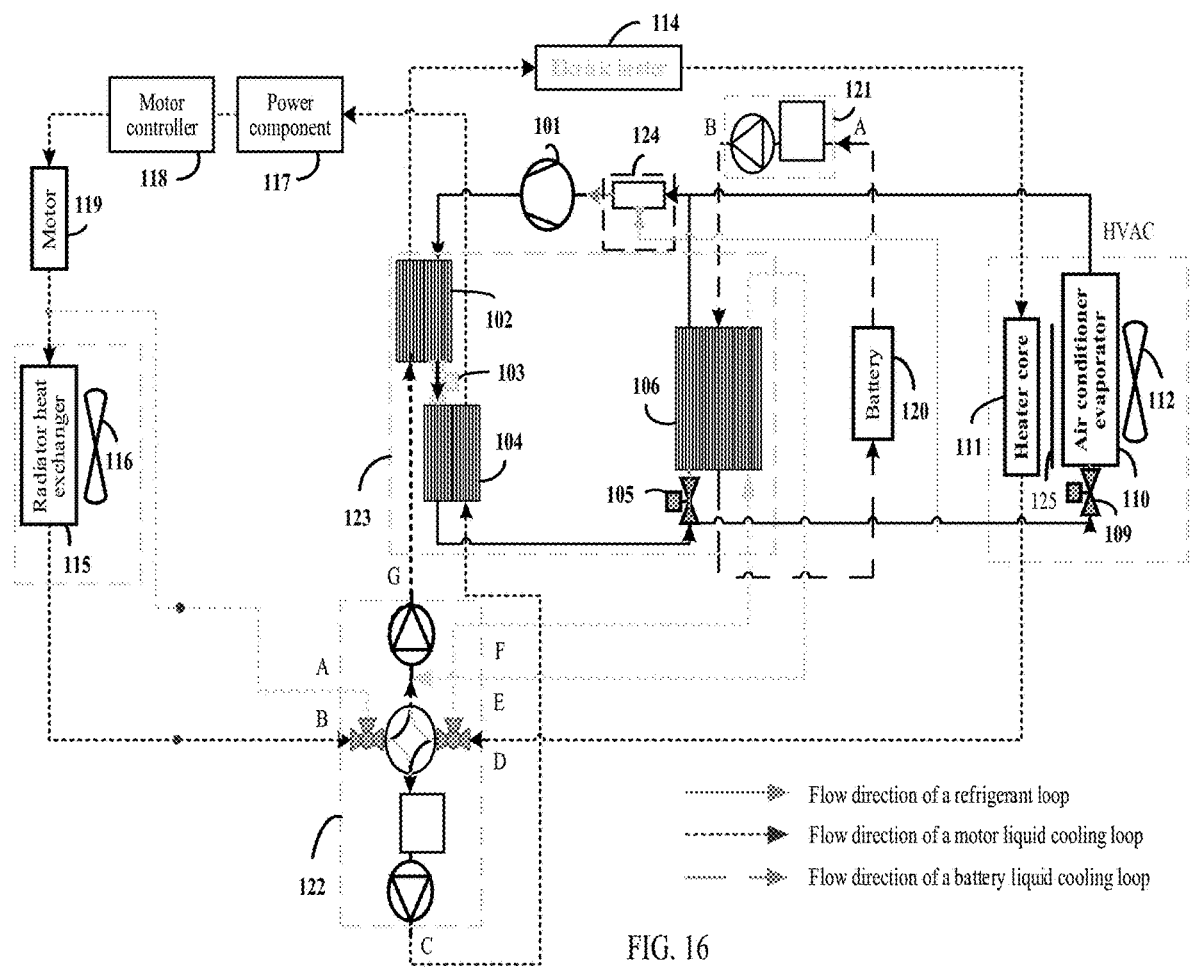
FIG. 16 is a schematic diagram of a flow direction of a related working medium in a thermal management system according to an embodiment of this application.

FIG. 16 is a schematic diagram of a flow direction of a related working medium in a thermal management system in a scenario in which cooling is implemented for a passenger compartment, a battery, and a motor. In some embodiments, the schematic diagram includes a flow direction of a refrigerant loop, a flow direction of a motor liquid cooling loop, and a flow direction of a battery liquid cooling loop. Here, a gray area in the thermal management system indicates a loop that does not require the working medium to pass through.

As shown in FIG. 16, the flow direction of the refrigerant loop is described as follows: A throttle valve 103 is fully opened to a pipe diameter, a throttle valve 105 and a throttle valve 9 are normally throttled, and the solenoid valve 108 is closed. In this case, a high-temperature refrigerant discharged by a compressor 101 sequentially enters a plate heat exchanger 102 and a plate heat exchanger 104 for condensation, and is throttled into a low-temperature gas-liquid two-phase refrigerant by using the throttle valve 105 and the throttle valve 109. The low-temperature gas-liquid two-phase refrigerant separately absorbs heat of the battery liquid cooling loop and heat of a passenger compartment by using a plate heat exchanger 106 and an air conditioner evaporator 110, and finally enter a gas-liquid separator 107, and enter a suction vent of the compressor 101. Herein, switches of the throttle valve 105 and the throttle valve 109 may be controlled to determine whether the low-temperature refrigerant enters the plate heat exchanger 106 and the air conditioner evaporator 110, to cool a single air conditioner or a single battery.

The flow direction of the motor liquid cooling loop is described as follows: An end G of a multi-functional valve body 122 outputs a liquid cooling medium to a plate heat exchanger 3. The high-temperature refrigerant is cooled, and sequentially flows through an electric heater 114 and a heater core 111 to an end D of the multi-functional valve body 122. The electric heater 114 is not opened, only working as a circulation function. A temperature damper 125 is adjusted to a coldest state, and air bypasses the heater core 111. The liquid cooling medium enters from the end D of the multi-functional valve body 122, flows out from an end C to the plate heat exchanger 104 to cool the high-temperature refrigerant again, then sequentially enters a power device 117, a motor controller 118, and a motor 119, enters a radiator heat exchanger for cooling, returns to an end B of the multi-functional valve body 122, and is pumped out from the end G of the multi-functional valve body 122.

The flow direction of the battery liquid cooling loop is described as follows: An integrated kettle pump 121 pumps out high-temperature liquid to the plate heat exchanger 106. The high-temperature liquid is cooled to low-temperature liquid by using the plate heat exchanger 106. The low-temperature liquid flows through a battery pack 120, and absorbs heat of a battery in the battery pack 120, to cool the battery pack 120. The high temperature liquid flows back to the integrated kettle pump 121.

Figure 17:
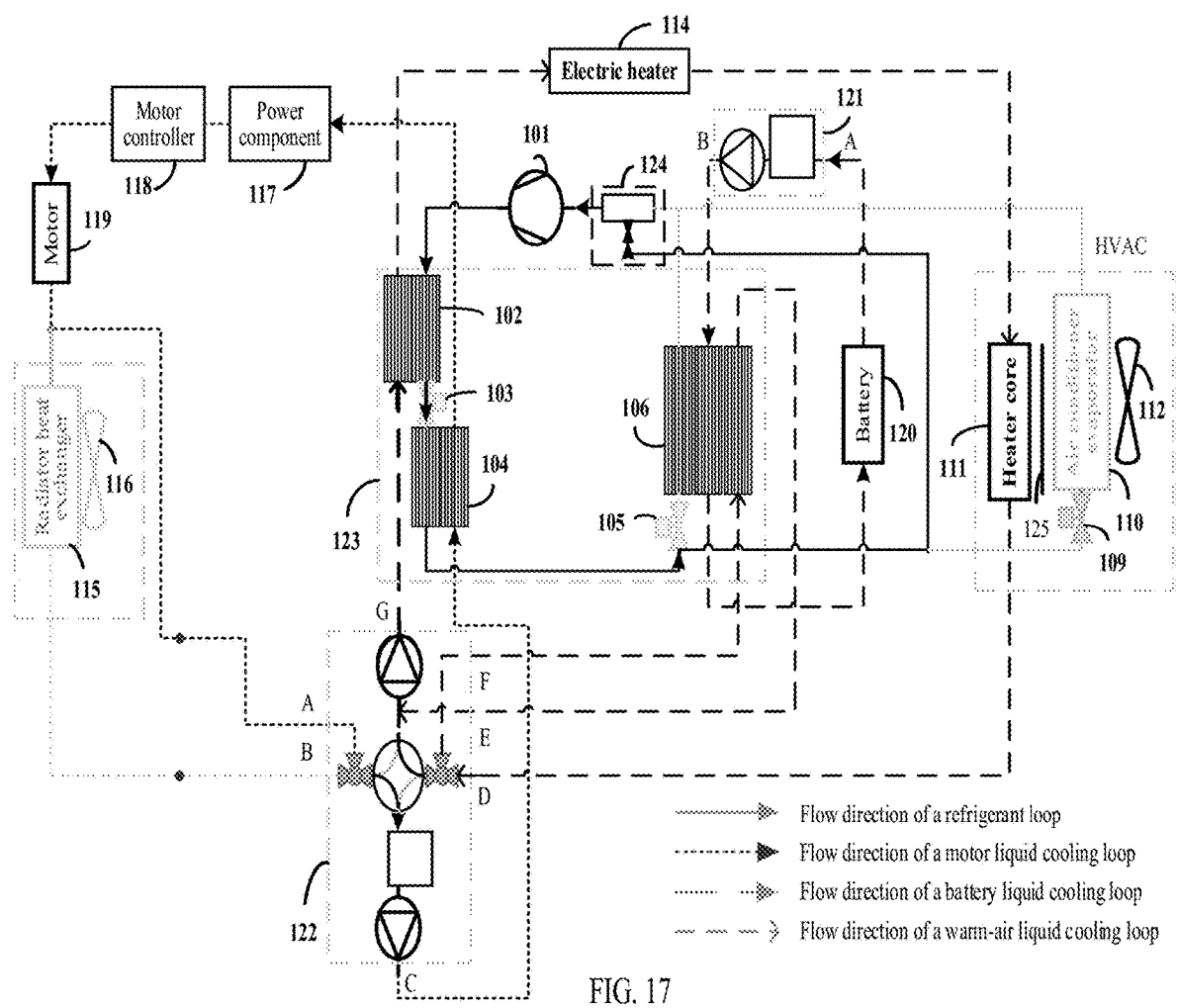
FIG. 17 is a schematic diagram of a flow direction of a related working medium in a thermal management system according to an embodiment of this application.

FIG. 17 is a schematic diagram of a flow direction of a related working medium in a thermal management system in a scenario in which a passenger compartment and a battery are heated. In some embodiments, the schematic diagram includes a flow direction of a refrigerant loop, a flow direction of a motor liquid cooling loop, a flow direction of a battery liquid cooling loop, and a flow direction of a warm-air liquid cooling loop.

As shown in FIG. 17, the flow direction of the refrigerant loop is described as follows: A throttle valve 103 performs throttling normally, a throttle valve 105 and a throttle valve 9 are closed, and a solenoid valve 108 is opened. In this case, the high-temperature refrigerant discharged by the compressor 101 sequentially enters a plate heat exchanger 102 for condensation, passes through a throttle valve 103, enters a plate heat exchanger 104 to absorb heat on a liquid cooling medium side, passes through the solenoid valve 108, enters an inlet of a gas-liquid separator 107, and then enters a suction vent of the compressor 101.

The flow direction of the warm-air liquid cooling loop is described as follows: An end G of a multi-functional valve body 122 pumps out a liquid cooling medium to the plate heat exchanger 102. The liquid cooling medium enters the electric heater 114. The electric heater 114 controls, based on a water temperature, power to output the liquid cooling medium. Then, the liquid cooling medium enters a heater core 111, releases heat to a passenger compartment, enters an end D of the multi-functional valve body 122, then flows to a plate heat exchanger 106 from an end F, returns to an end E of the multi-functional valve, and enters an inlet of a water pump 122-1. A temperature damper 125 may be configured to bypass the heater core 111 to determine whether the passenger compartment is heated. The three-way valve 122-4 has one inlet and two outlets, and controls a liquid cooling medium flow at an outlet F to determine whether to heat the battery.

The flow direction of the motor liquid cooling loop is described as follows: An end C of the multi-functional valve body 122 pumps out a liquid cooling medium. The liquid cooling medium enters the plate heat exchanger 104. A low-temperature refrigerant of the plate heat exchanger 104 is heated, sequentially passes through a power device 117, a motor controller 118, and a motor 119, enters an end A of the multi-functional valve body 122, and return to the end C of the multi-functional valve body 122. In this way, waste heat recovery of an electric drive is implemented.

The flow direction of the battery liquid cooling loop is separately described as follows: An integrated kettle pump 121 pumps out low-temperature liquid to the plate heat exchanger 106. The plate heat exchanger 106 heats the low-temperature liquid to high-temperature liquid. The high-temperature liquid flows through a battery pack 120, to heat the battery pack 120. The high-temperature liquid is cooled to the low-temperature liquid. The low-temperature liquid returns to the integrated kettle pump 121.

Figure 18:
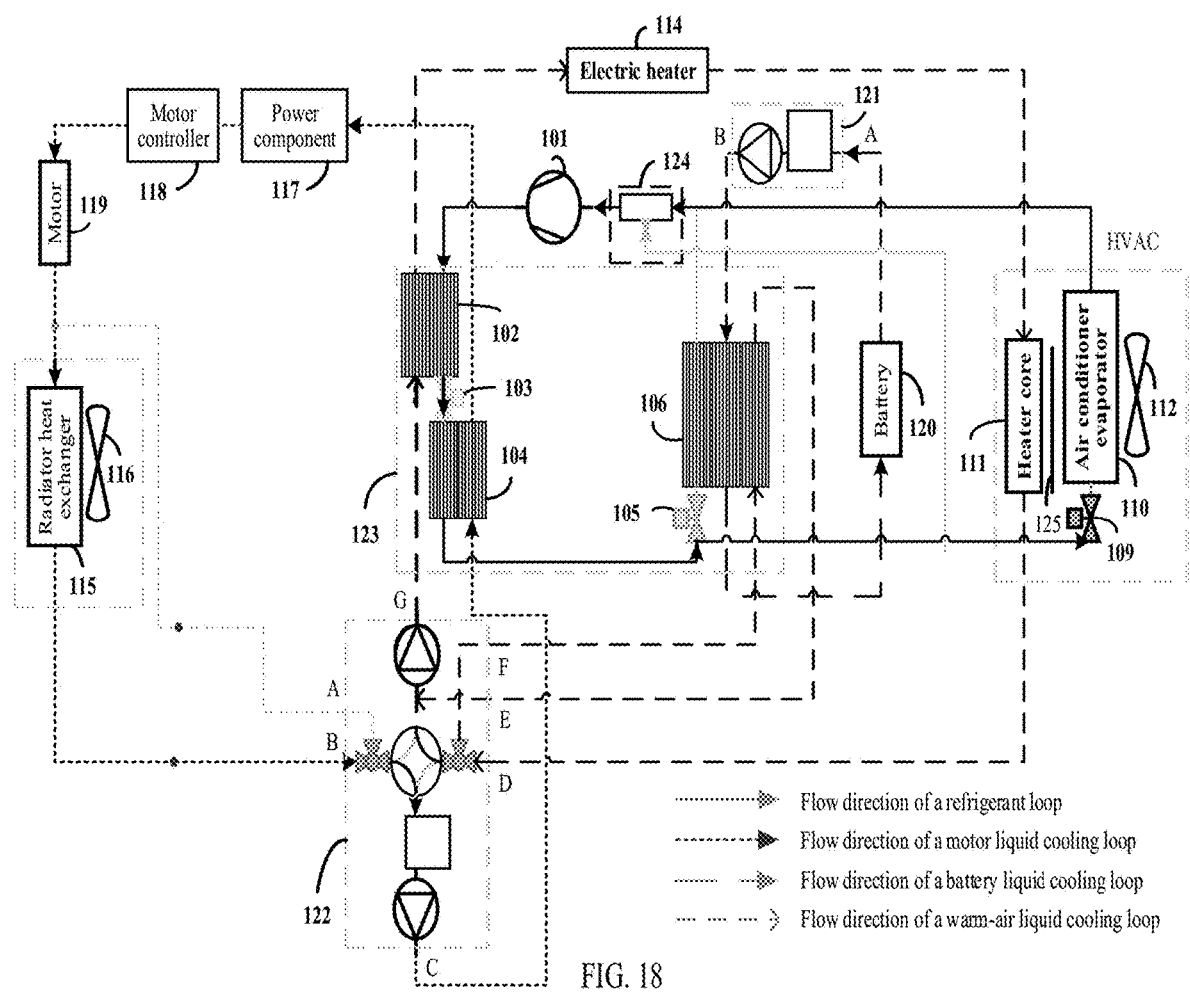
FIG. 18 is a schematic diagram of a flow direction of a related working medium in a thermal management system according to an embodiment of this application.

FIG. 18 is a schematic diagram of a flow direction of a related working medium in a thermal management system in a scenario in which a battery is heated and a passenger compartment is dehumidified. In some embodiments, the schematic diagram includes a flow direction of a refrigerant loop, a flow direction of a motor liquid cooling loop, a flow direction of a battery liquid cooling loop, and a flow direction of a warm-air liquid cooling loop.

As shown in FIG. 18, the flow direction of the refrigerant loop is described as follows: A throttle valve 103 is fully opened to a pipe diameter, a throttle valve 105 is closed, a throttle valve 109 is normally throttled, and a solenoid valve 108 is closed. In this case, a high-temperature refrigerant discharged by a compressor 101 sequentially enters a plate heat exchanger 102 and a plate heat exchanger 4 for condensation. The high-temperature refrigerant is throttled into a low-temperature gas-liquid two-phase refrigerant by the throttle valve 109. The low-temperature gas-liquid two-phase refrigerant passes through an air conditioner evaporator 110 to absorb heat from a passenger compartment. Finally, the low-temperature gas-liquid two-phase refrigerant enters a gas-liquid separator 107 and enters a suction vent of the compressor 101.

The flow direction of the warm-air liquid cooling loop is described as follows: An end G of a multi-functional valve body 122 pumps out a liquid cooling medium to the plate heat exchanger 102. The liquid cooling medium enters an electric heater 114. The electric heater 114 controls, based on a water temperature, power to output the liquid cooling medium. Then, the liquid cooling medium enters a heater core 111, and releases heat to a passenger compartment. In this way, a dehumidification function is achieved. The liquid cooling medium enters an end D of the multi-functional valve body 122, then flows to a plate heat exchanger 106 from an end F to heat a battery, returns to an end E of the multi-functional valve, and enters an inlet of a water pump 122-1.

The flow direction of the motor liquid cooling loop is described as follows: An end C of the multi-functional valve body 122 pumps out low-temperature liquid to the plate heat exchanger 104. The low-temperature liquid sequentially passes through a power device 117, a motor controller 118, and a motor 119, enters an end B of the multi-functional valve body 122, and returns to the end C of the multi-functional valve body 122.

The flow direction of the battery liquid cooling loop is separately described as follows: An integrated kettle pump 121 pumps out low-temperature liquid to the plate heat exchanger 106. The plate heat exchanger 106 heats the low-temperature liquid to high-temperature liquid. The high-temperature liquid flows through a battery pack 120, to heat the battery pack 120. The high-temperature liquid is cooled to the low-temperature liquid. The low-temperature liquid returns to the integrated kettle pump 121.

Figure 19:
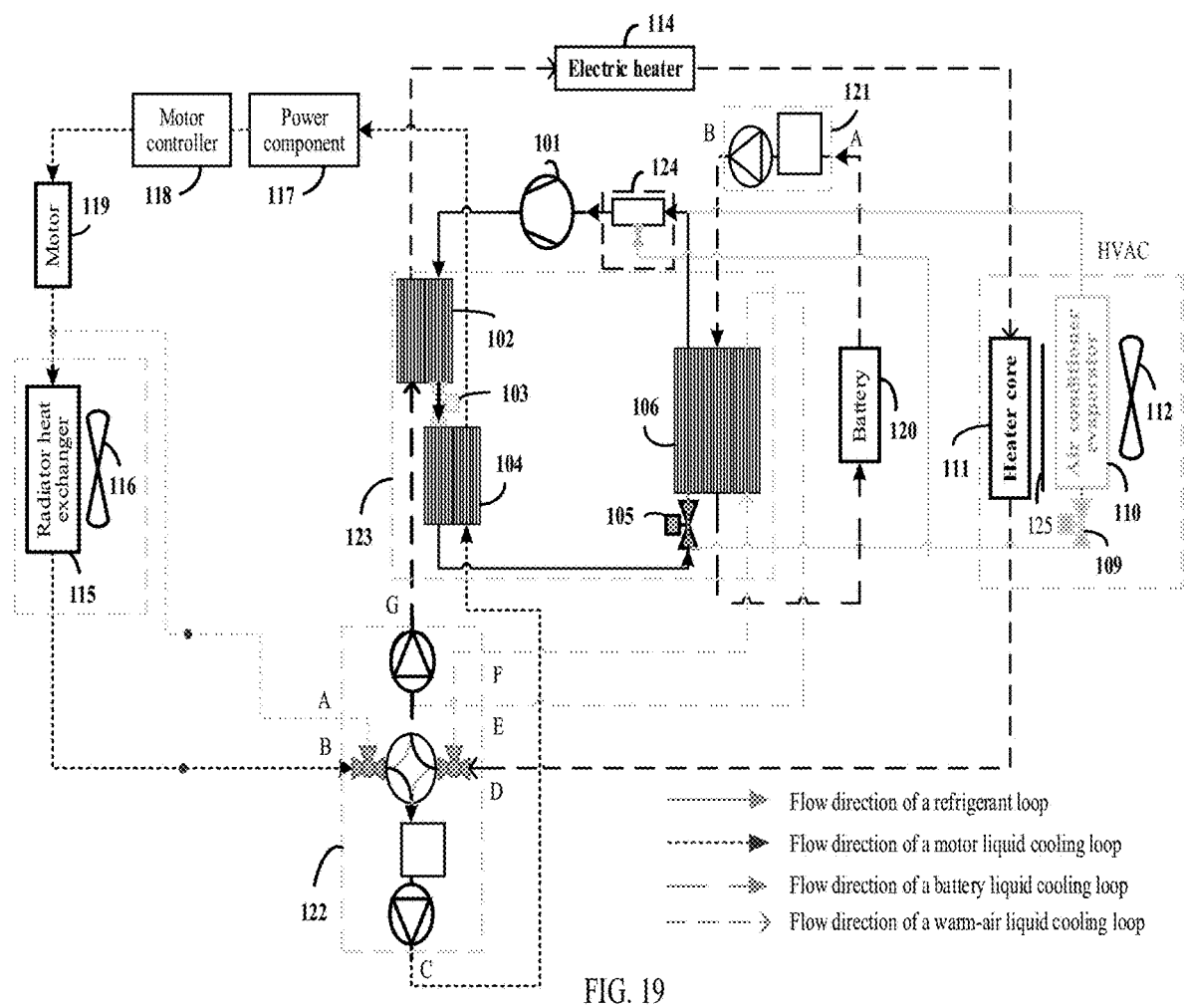
FIG. 19 is a schematic diagram of a flow direction of a related working medium in a thermal management system according to an embodiment of this application.

FIG. 19 is a schematic diagram of a flow direction of a related working medium in a thermal management system in a scenario in which a battery is cooled and a passenger compartment is heated. In some embodiments, the schematic diagram includes a flow direction of a refrigerant loop, a flow direction of a motor liquid cooling loop, a flow direction of a battery liquid cooling loop, and a flow direction of a warm-air liquid cooling loop.

As shown in FIG. 19, the flow direction of the refrigerant loop is described as follows: A throttle valve 103 is fully opened to a pipe diameter, a throttle valve 105 performs throttling normally, a throttle valve 109 is closed, and a solenoid valve 108 is closed. In this case, a high-temperature refrigerant discharged by a compressor 101 sequentially enters a plate heat exchanger 102 and a plate heat exchanger 4 for condensation, and is throttled into a low-temperature gas-liquid two-phase refrigerant by using the throttle valve 105. Then, the low-temperature gas-liquid two-phase refrigerant passes through a plate heat exchanger 106 to absorb heat of a battery loop, enters a gas-liquid separator 107, and enters a suction vent of the compressor 101.

The flow direction of the warm-air liquid cooling loop is described as follows: An end G of a multi-functional valve body 122 pumps out a liquid cooling medium to the plate heat exchanger 102. The liquid cooling medium enters an electric heater 114. The electric heater 114 controls, based on a water temperature, power to output the liquid cooling medium. Then, the liquid cooling medium enters a heater core 111, and releases heat to a passenger compartment to heat the passenger compartment. The liquid cooling medium enters an end D of the multi-functional valve body 122, and then directly returns to an inlet of a water pump 122-1.

The flow direction of the motor liquid cooling loop is described as follows: An end C of the multi-functional valve body 122 pumps out low-temperature liquid to the plate heat exchanger 104. The low-temperature liquid sequentially passes through a power device 117, a motor controller 118, and a motor 119, enters an end B of the multi-functional valve body 122, and returns to the end C of the multi-functional valve body 122.

The flow direction of the battery liquid cooling loop is described as follows: An integrated kettle pump 121 pumps out high-temperature liquid to the plate heat exchanger 106. The high-temperature liquid is cooled to low-temperature liquid by using the plate heat exchanger 106. The low-temperature liquid flows through a battery pack 120, and absorbs heat of a battery in the battery pack 120, to cool the battery pack 120. The high temperature liquid flows back to the integrated kettle pump 121.

It can be learned that in this embodiment of this application, when the refrigerant four-way valve is not used, and when the refrigerant loop has only one flow direction, a cooling function and/or a heating function are/is implemented on the passenger compartment, and/or a cooling function and/or a heating function are/is implemented on the battery pack, by using a heat pump air-conditioning system. A water path four-way reversing valve is used to switch flow directions of different water pipes, so that the cooling loop has only one flow direction and performance of a cooling system can be maximized.

Three plate heat exchangers are designed, so that the refrigerant in the refrigerant loop can exchange heat with the coolant in the motor liquid cooling loop by using the plate heat exchanger 104, exchange heat with the coolant in the warm-air liquid cooling loop by using the plate heat exchanger 102 and the plate heat exchanger 106, and exchange heat with the coolant in the battery liquid cooling loop by using the plate heat exchanger 106. Therefore, use of a parallel-flow heat exchanger is avoided. Because the plate heat exchanger has a relatively small volume, a structural integration solution of the thermal management system can be implemented by using the plate heat exchanger and according to a coolant heat exchange method, and main components in the system can be integrated into different integrated bodies. An electronic control integration solution of the thermal management system can also be implemented to shorten refrigerant pipes and electric control wires. In addition, this embodiment of this application may also be applicable to various actual application scenarios, for example, cooling/heating/dehumidification of the passenger compartment, battery cooling/heating, and motor cooling/heat recovery. Therefore, this embodiment of this application helps reduce space occupied by a front compartment in the thermal management system, and also helps reduce costs of the thermal management system.

Figure 20:
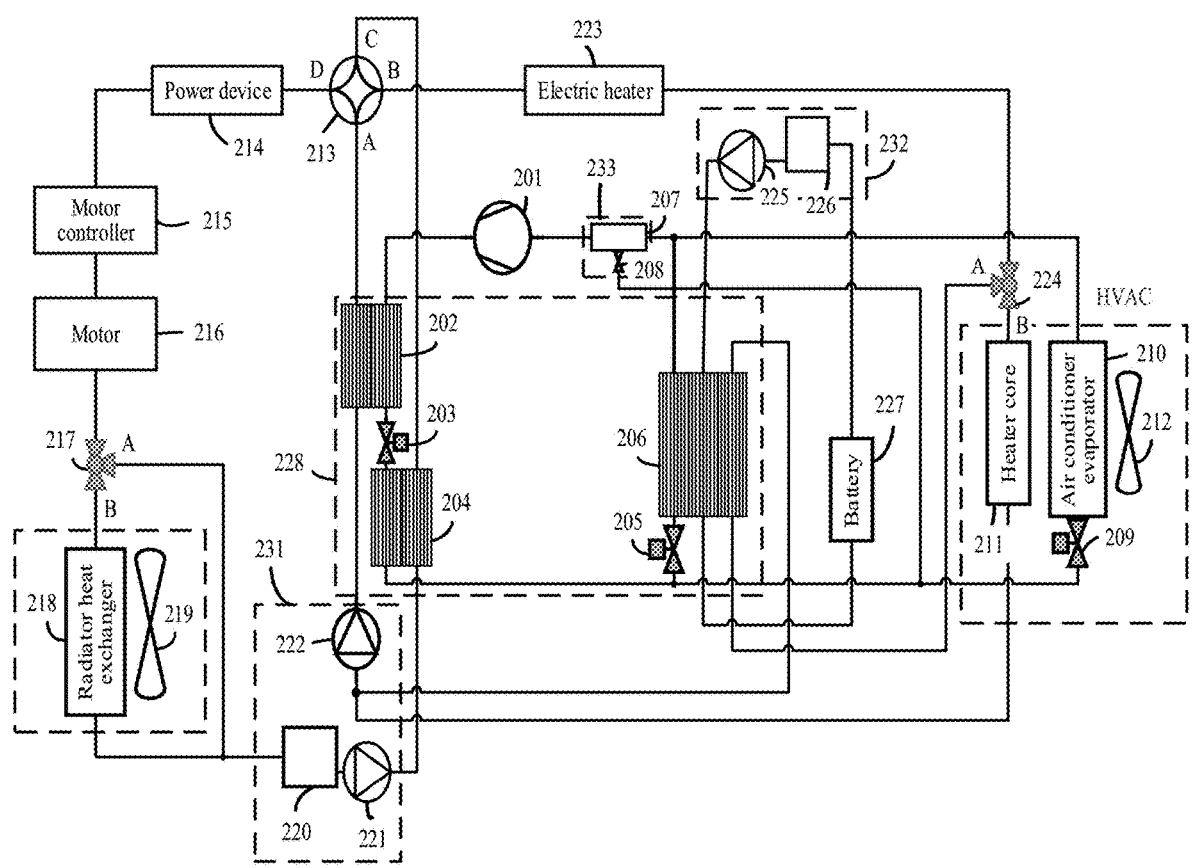
FIG. 20 is a detailed schematic structural diagram of a thermal management system according to an embodiment of this application.

Based on the thermal management system shown in the embodiment in FIG. 14, the following describes a connection relationship between related components in a thermal management system in another implementation scenario by using an example. For details, refer to FIG. 20. FIG. 20 is a detailed schematic structural diagram of a thermal management system according to an embodiment of this application. As shown in FIG. 20, the thermal management system is an integrated thermal management system that does not include a refrigerant four-way reversing valve structure. An integrated kettle pump 231, an integrated kettle pump 232, an integrated body 228, and an integrated body 233 are integrated in the thermal management system.

The integrated kettle pump 231 is an integrated body formed by a kettle 220, a water pump 221, and a water pump 222, and is configured to implement a water pump function and a water storage function.

The integrated kettle pump 232 is an integrated body formed by a kettle 226 and a water pump 225, and is configured to implement the water pump function and the water storage function.

The integrated body 228 includes the plurality of plate heat exchangers (a plate heat exchanger 202, a plate heat exchanger 204, and a plate heat exchanger 206) and the plurality of throttle valves (a throttle valve 203 and a throttle valve 205). A temperature and pressure sensor may also be arranged on pipes connected to various integrated components.

The integrated body 233 includes a gas-liquid separator 207 and a solenoid valve 208.

In the heat management system shown in FIG. 20, a connection relationship of the refrigerant loop is as follows: An outlet of a compressor 101 is connected to one end of the plate heat exchanger 202. The other end of the plate heat exchanger 202 is connected to one end of the throttle valve 203. The other end of the throttle valve 203 is connected to one end of the plate heat exchanger 204. The other end of the plate heat exchanger 204 is separately connected to one end of a throttle valve 205 and one end of a throttle valve 209. The other end of the throttle valve 205 is connected to a plate heat exchanger 206. The other end of the throttle valve 209 is connected to one end of an air conditioner evaporator 210. The other end of the air conditioner evaporator 210 and the other end of the plate heat exchanger 206 are connected to an inlet of a gas-liquid separator 207. The other end of the plate heat exchanger 204 is connected to one end of a solenoid valve 208. The other end of the solenoid valve 208 is connected to the inlet of the gas-liquid separator 207. An outlet of the gas-liquid separator 207 is connected to an inlet of the compressor 101. The throttle valve 203 can be a full-pass throttle valve, and can be an assembly including the solenoid valve and an ordinary throttle valve. The throttle valve 205 and the throttle valve 209 can be completely closed. The throttle valve may be replaced by a capillary tube, an expansion valve, a baffle plate, or the like that has a throttling function.

A connection relationship of the warm-air liquid cooling loop is as follows: An end A of a water path four-way valve 213 is connected to the end of the plate heat exchanger 202, an end B is connected to one end of an electric heater 223, the other end of the electric heater 223 is connected to an inlet of a three-way valve 224, an end B of the three-way valve 224 is connected to one end of a heater core 211, an end A is connected to the end of the plate heat exchanger 206, the other end of the plate heat exchanger 206 and the other end of the heater core are connected to an inlet of a water pump 222, and an outlet of the water pump 222 is connected to the other end of the plate heat exchanger 202.

A connection relationship of the battery liquid cooling loop is as follows: An outlet B of a water pump 225 is connected to the end of the plate heat exchanger 206, the other end of the plate heat exchanger 206 is connected to one end of a cooling device of a battery pack 227, the other end of the cooling device of the battery pack 227 is connected to an inlet of a kettle 226, and an outlet of the kettle 226 is connected to an inlet of the water pump 225.

The cooling device of the battery pack 227 is an apparatus that implements heating or cooling of the battery pack by circulating coolant. For example, the cooling device of the battery pack 227 may be a water-cooling coil pipe, a cooling plate, or the like in contact with the battery pack. This is not limited in this specification.

It should be noted that, in this specification, for ease of description, "the cooling device of the battery pack 227" is sometimes briefly described as "the battery pack 227".

A connection relationship of the motor liquid cooling loop is as follows: An outlet of the water pump 221 is connected to one end of the plate heat exchanger 204. The other end of the plate heat exchanger 204 is connected to an end C of the water path four-way valve 213. An end D of the water path four-way valve 213 is connected to one end of a cooling device of a power device 214. The other end of the cooling device of the power device 214 is connected to one end of a cooling device of a motor controller 215. The other end of the cooling device of the motor controller 215 is connected to one end of a cooling device of a motor 216. The other end of the cooling device of the motor 216 is connected to an inlet of a three-way valve 217. An end A of the three-way valve 217 is directly connected to an inlet of the kettle 220. An end B of the three-way valve is connected to one end of a radiator heat exchanger 218. The other end of the radiator heat exchanger 218 is connected to the inlet of the kettle 220. An outlet of the kettle 220 is connected to an inlet of the water pump 221.

Similarly, in this specification, for ease of description, "the cooling device of the power device 214" is sometimes briefly described as "the power device 214", "the cooling device of the motor controller 215" is briefly described as "the motor controller 215", and "the cooling device of the motor 216" is briefly described as "the motor 216".

For specific integration manners of the integrated kettle pump 231, the integrated kettle pump 232, the integrated body 228, and the integrated body 233, refer to related descriptions in the embodiments of FIG. 3A, FIG. 3B, and FIG. 3C. For brevity of the specification, details are not described herein again.

In addition, the integrated kettle pump 231, the integrated kettle pump 232, the integrated body 228, and the integrated body 233 may also be jointly integrated to become the thermal management integration module described above.

Based on the structural connection relationship in the embodiment in FIG. 20, the following describes an example of a main application scenario.

Figure 21:
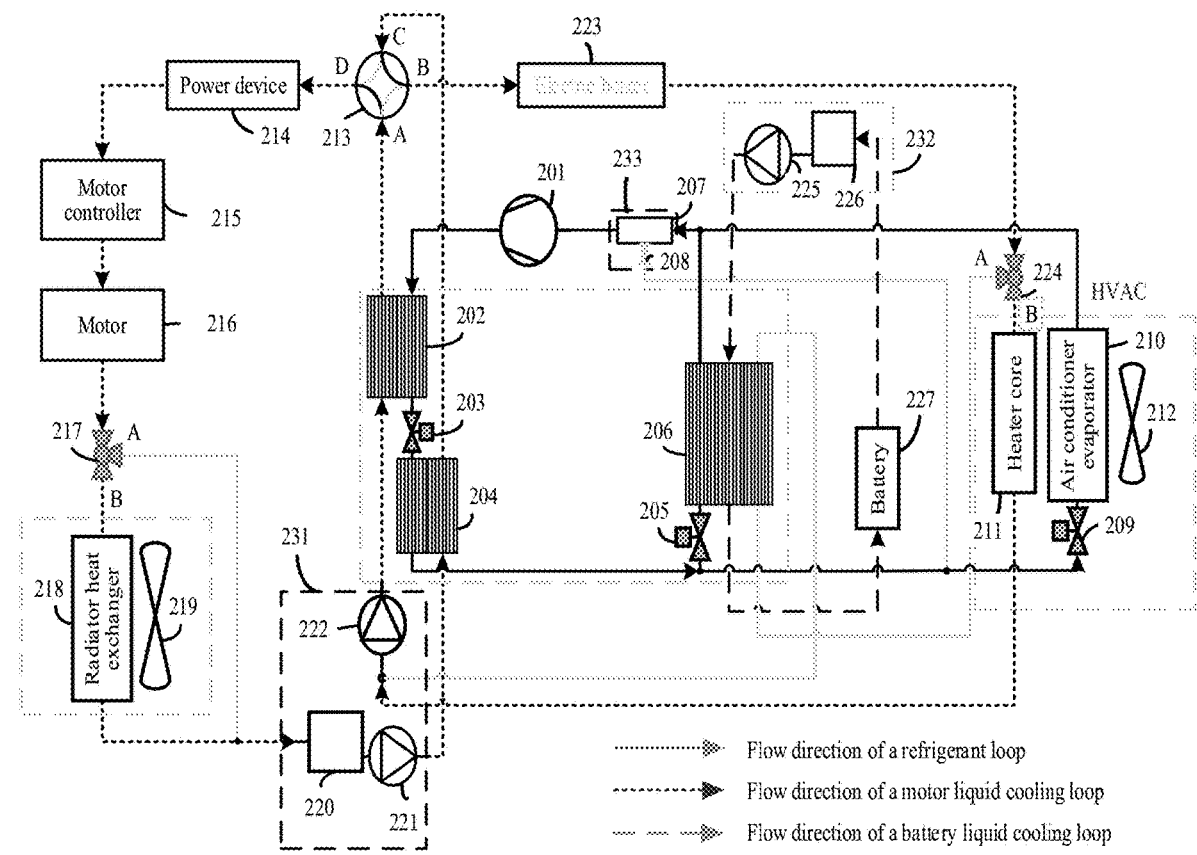
FIG. 21 is a schematic diagram of a flow direction of a related working medium in a thermal management system according to an embodiment of this application.

FIG. 21 is a schematic diagram of a flow direction of a related working medium in a thermal management system in a scenario in which a passenger compartment, a battery, and a motor are cooled. In some embodiments, the schematic diagram includes a flow direction of a refrigerant loop, a flow direction of a motor liquid cooling loop, and a flow direction of a battery liquid cooling loop. Here, a gray area in the thermal management system indicates a loop that does not require the working medium to pass through.

As shown in FIG. 21, the flow direction of the refrigerant loop is described as follows: A throttle valve 203 is fully opened to the size of the pipe diameter, a throttle valve 205 and a throttle valve 209 are normally throttled, and a solenoid valve 208 is closed. In this case, a high-temperature refrigerant discharged by a compressor 101 sequentially enters a plate heat exchanger 202 and a plate heat exchanger 4 for condensation, and is throttled into a low-temperature gas-liquid two-phase refrigerant separately by using the throttle valve 205 and the throttle valve 209. The low-temperature gas-liquid two-phase refrigerant passes through a plate heat exchanger 206 and an air conditioner evaporator 210 to respectively absorb heat of a battery liquid cooling loop and heat of a passenger compartment, enters a gas-liquid separator 207, and enters a suction vent of the compressor 101. Herein, switches of the throttle valve 205 and the throttle valve 209 may be controlled to determine whether the low-temperature refrigerant enters the plate heat exchanger 206 and the air conditioner evaporator 210, to cool a single air conditioner or a single battery.

The flow direction of the motor liquid cooling loop is described as follows: An outlet of a water pump 221 outputs a liquid cooling medium to the plate heat exchanger 204 to cool a high-temperature refrigerant. The liquid cooling medium simultaneously flows into an end C of a water path four-way valve 213, flows out from an end B of the water path four-way valve 213, sequentially flows through an electric heater 223 and a three-way valve 224, enters a heater core 211 from an end B of the three-way valve 224, and enters the inlet of the water pump 22 from an outlet of the heater core 211. A temperature damper of the heater core 211 is adjusted to a coldest state, and air bypasses the heater core 211. The outlet of the water pump 22 outputs the liquid cooling medium to the plate heat exchanger 202, and then cools the high temperature medium in the plate heat exchanger 202 again. The liquid cooling medium enters an end A of the water path four-way valve 213 from the outlet of the plate heat exchanger 202, flows out from the end B, sequentially enters a power device 214, a motor controller 215, and a motor 216, enters an inlet of a three-way valve 217, and enters a radiator heat exchanger 218 from an end B of the three-way valve 217. The radiator heat exchanger 218 cools the high-temperature liquid. The liquid cooling medium enters the inlet of the water pump 221 through a kettle 220.

Figure 22:
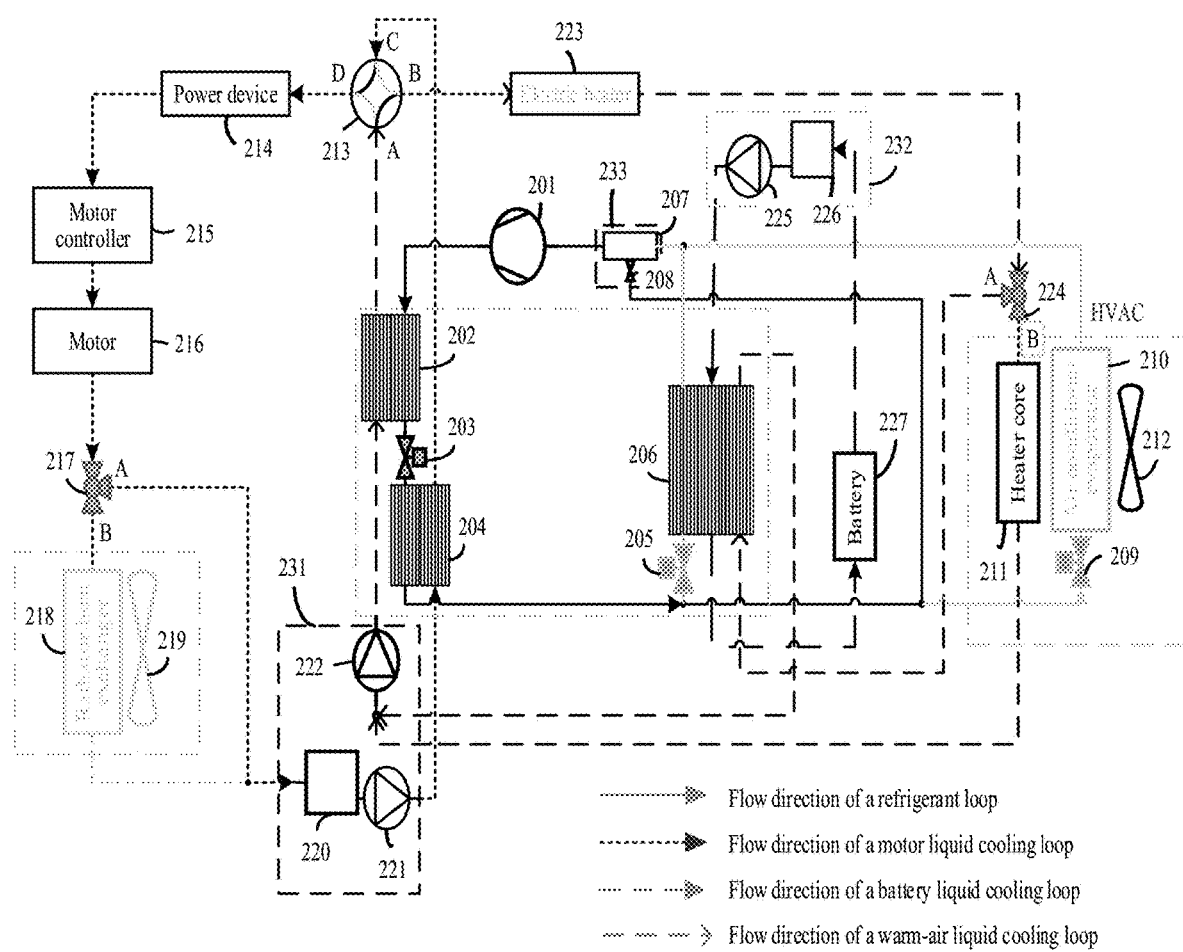
FIG. 22 is a schematic diagram of a flow direction of a related working medium in a thermal management system according to an embodiment of this application.

FIG. 22 is a schematic diagram of a flow direction of a related working medium in a thermal management system in a scenario in which a passenger compartment and a battery are heated. In some embodiments, the schematic diagram includes a flow direction of a refrigerant loop, a flow direction of a motor liquid cooling loop, a flow direction of a battery liquid cooling loop, and a flow direction of a warm-air liquid cooling loop.

As shown in FIG. 22, the flow direction of the refrigerant loop is described as follows: A throttle valve 203 performs throttling normally, a throttle valve 205 and a throttle valve 209 are closed, and a solenoid valve 208 is opened. In this case, the high-temperature refrigerant discharged by the compressor 101 sequentially enters a plate heat exchanger 202 for condensation, passes through the throttle valve 203, enters a plate heat exchanger 204 to absorb heat on a liquid cooling medium side, passes through the solenoid valve 208, enters an inlet of a gas-liquid separator 207, and then enters a suction vent of the compressor 101.

The flow direction of the warm-air liquid cooling loop is described as follows: An outlet of a water pump 22 pumps out liquid to the plate heat exchanger 202. The liquid enters an end A of a water path four-way valve 213, and then enters an electric heater 223 from an end B. The electric heater 223 controls, based on a water temperature, power to output the liquid. The liquid cooling medium enters from an inlet of a three-way valve 224. The three-way valve 224 has one inlet and two outlets, and can control liquid cooling medium flow of an outlet A and an outlet B, to determine whether to heat a battery and a passenger compartment. The heated liquid is returned to an inlet of the water pump 22.

The flow direction of the motor liquid cooling loop is described as follows: The outlet of the water pump 221 pumps out liquid. The liquid enters the plate heat exchanger 204. The low-temperature refrigerant of the plate heat exchanger 204 is heated, sequentially passes through an end C and an end D of the water path four-way valve 213, a power component 214, a motor controller 215, and a motor 216, enters a kettle 220 from an end A of a three-way valve 217, and then returns to the inlet of the water pump 221. In this way, waste heat recovery of an electric drive is implemented.

The flow direction of the battery liquid cooling loop is separately described as follows: An integrated kettle pump 232 pumps out low-temperature liquid to a plate heat exchanger 206. The plate heat exchanger 206 heats the low-temperature liquid to high-temperature liquid. The high-temperature liquid flows through a battery pack 227, to heat the battery pack 227. The high-temperature liquid is cooled to the low-temperature liquid. The low-temperature liquid returns to the integrated kettle pump 232.

Figure 23:
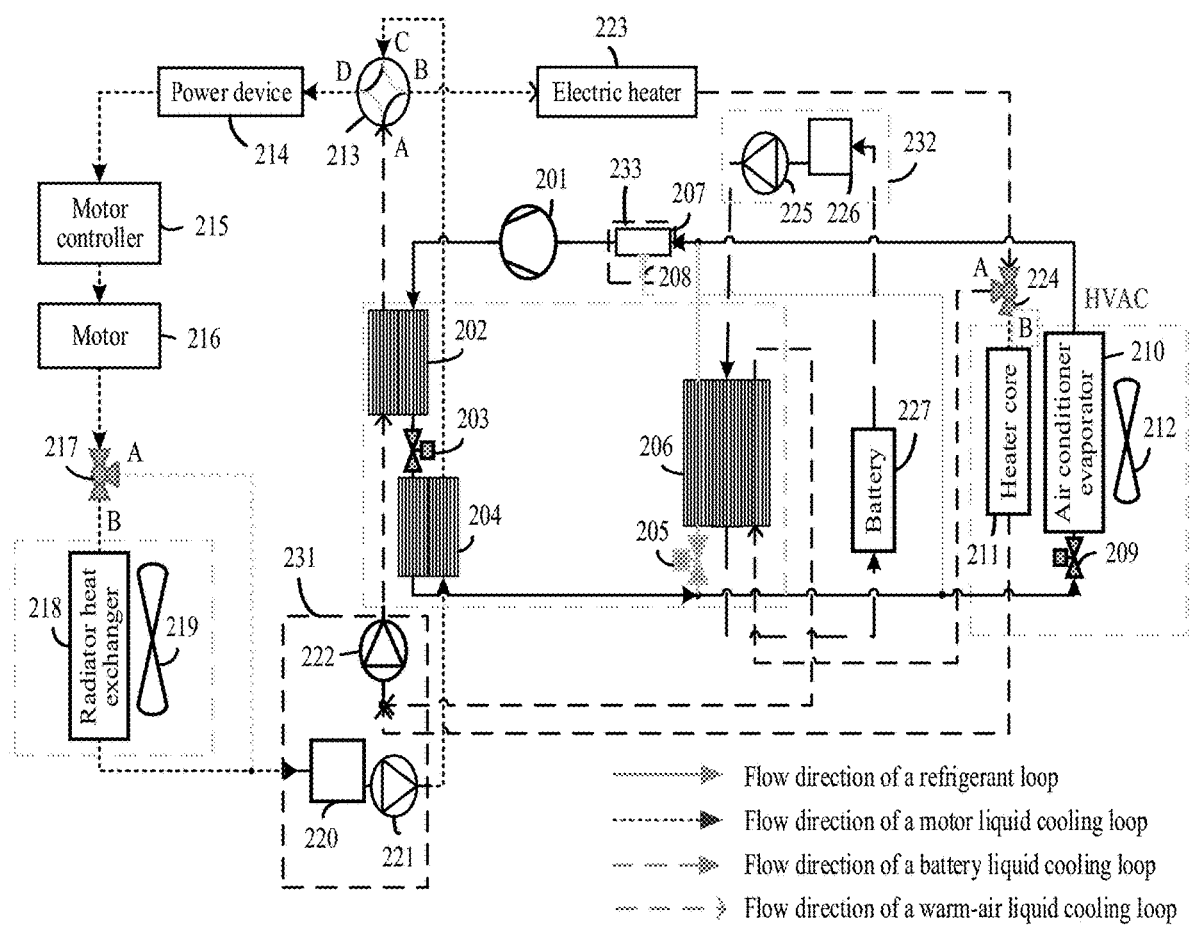
FIG. 23 is a schematic diagram of a flow direction of a related working medium in a thermal management system according to an embodiment of this application.

FIG. 23 is a schematic diagram of a flow direction of a related working medium in a thermal management system in a scenario in which a battery is heated and a passenger compartment is dehumidified. In some embodiments, the schematic diagram includes a flow direction of a refrigerant loop, a flow direction of a motor liquid cooling loop, a flow direction of a battery liquid cooling loop, and a flow direction of a warm-air liquid cooling loop.

As shown in FIG. 23, the flow direction of the refrigerant loop is described as follows: A throttle valve 203 is fully opened to a pipe diameter, a throttle valve 205 is closed, a throttle valve 209 is normally throttled, and a solenoid valve 208 is closed. In this case, a high-temperature refrigerant discharged by a compressor 101 sequentially enters a plate heat exchanger 202 and a plate heat exchanger 4 for condensation, and is throttled into a low-temperature gas-liquid two-phase refrigerant by using the throttle valve 209. Then, the ow-temperature gas-liquid two-phase refrigerant passes through an air conditioner evaporator 210 to absorb heat of a passenger compartment, enters a gas-liquid separator 207, and enters a suction vent of the compressor 101.

The flow direction of the warm-air liquid cooling loop is described as follows: An outlet of a water pump 22 pumps out liquid to the plate heat exchanger 202. The liquid enters an end A of a water path four-way valve 213, and then enters an electric heater 223 from an end B. The electric heater 223 controls, based on a water temperature, power to output the liquid. The liquid cooling medium enters from an inlet of a three-way valve 224. An end A and an end B of the three-way valve simultaneously discharge the liquid cooling medium, to heat a battery and a passenger compartment, respectively. The heated liquid is returned to an inlet of the water pump 222.

The flow direction of the motor liquid cooling loop is described as follows: An outlet of a water pump 221 pumps out liquid to the plate heat exchanger 204. The low-temperature refrigerant of the plate heat exchanger 204 is heated, then sequentially passes through an end C and an end D of the water path four-way valve 213, a power component 214, a motor controller 215, and a motor 216, enters a radiator heat exchanger 218 from an end B of a three-way valve 217, and then returns to an inlet of the water pump 221 through a kettle 220.

The flow direction of the battery liquid cooling loop is separately described as follows: An integrated kettle pump 232 pumps out low-temperature liquid to a plate heat exchanger 206. The plate heat exchanger 206 heats the low-temperature liquid to high-temperature liquid. The high-temperature liquid flows through a battery pack 227, to heat the battery pack 227. The high-temperature liquid is cooled to the low-temperature liquid. The low-temperature liquid returns to the integrated kettle pump 232.

Figure 24:
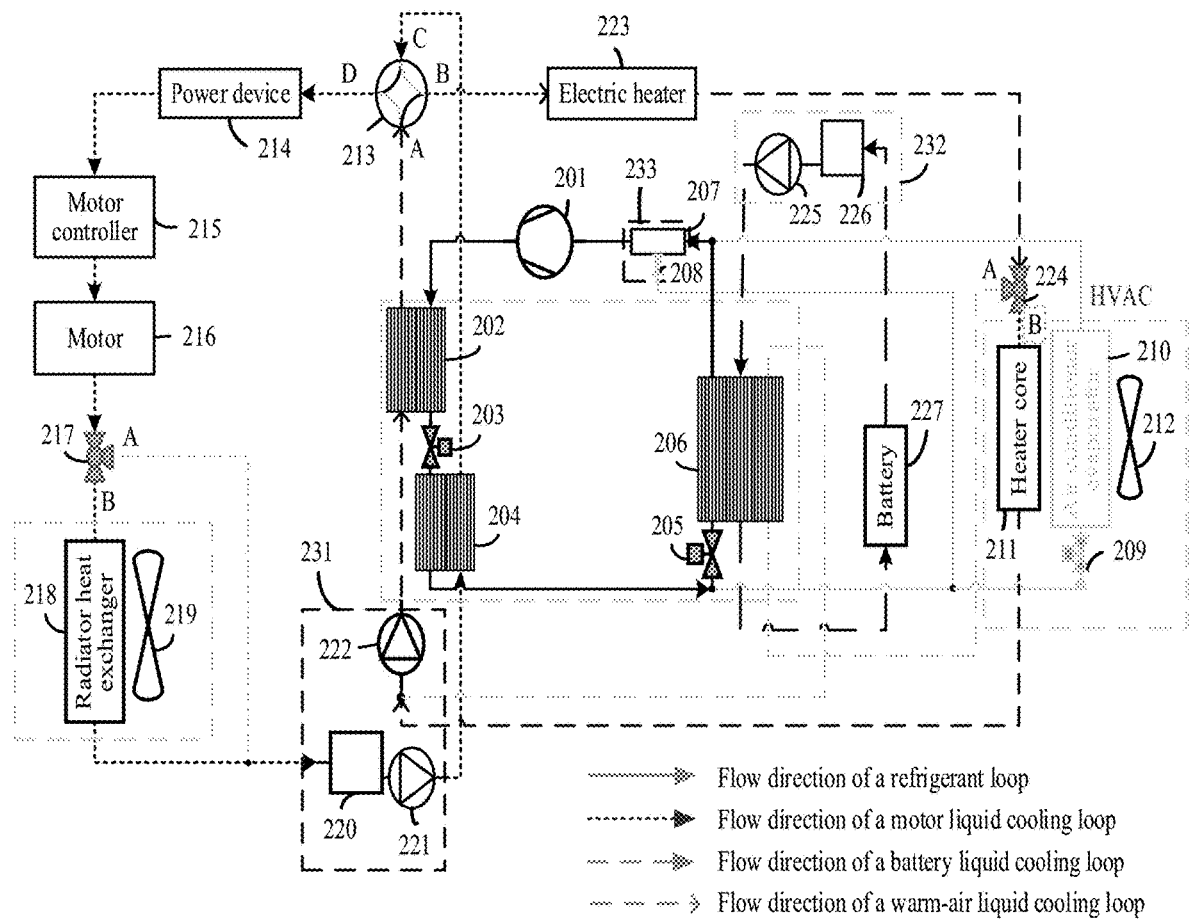
FIG. 24 is a schematic diagram of a flow direction of a related working medium in a thermal management system according to an embodiment of this application.

FIG. 24 is a schematic diagram of a flow direction of a related working medium in a thermal management system in a scenario in which a battery is cooled and a passenger compartment is heated. In some embodiments, the schematic diagram includes a flow direction of a refrigerant loop, a flow direction of a motor liquid cooling loop, a flow direction of a battery liquid cooling loop, and a flow direction of a warm-air liquid cooling loop.

As shown in FIG. 24, the flow direction of the refrigerant loop is described as follows: A throttle valve 203 is fully opened to a pipe diameter, a throttle valve 205 performs throttling normally, a throttle valve 209 is closed, and a solenoid valve 208 is closed. In this case, a high-temperature refrigerant discharged by a compressor 101 sequentially enters a plate heat exchanger 202 and a plate heat exchanger 204 for condensation, and is throttled into a low-temperature gas-liquid two-phase refrigerant by using the throttle valve 205. Then, the low-temperature gas-liquid two-phase refrigerant passes through a plate heat exchanger 206 to absorb heat of the battery loop, enters a gas-liquid separator 207, and finally enter a suction vent of the compressor 101.

The flow direction of the warm-air liquid cooling loop is described as follows: An outlet of a water pump 22 pumps out liquid to the plate heat exchanger 202. The liquid enters an end A of a water path four-way valve 213, and then enters an electric heater 223 from an end B. The electric heater 223 controls, based on a water temperature, power to output the liquid. The liquid cooling medium enters from an inlet of a three-way valve 224. An end B of the three-way valve discharge the liquid cooling medium, to heat a passenger compartment. The heated liquid is returned to an inlet of the water pump 22.

The flow direction of the motor liquid cooling loop is described as follows: An outlet of a water pump 221 pumps out liquid to the plate heat exchanger 204. The low-temperature refrigerant of the plate heat exchanger 204 is heated, then sequentially passes through an end C and an end D of the water path four-way valve 213, a power component 214, a motor controller 215, and a motor 216, enters a radiator heat exchanger 218 from an end B of a three-way valve 217, and then returns to an inlet of the water pump 221 through a kettle 220.

The flow direction of the battery liquid cooling loop is described as follows: An integrated kettle pump 232 pumps out high-temperature liquid to the plate heat exchanger 206. The high-temperature liquid is cooled to low-temperature liquid by using the plate heat exchanger 206. The low-temperature liquid flows through a battery pack 227 to absorb heat of a battery in a battery pack 227, to cool the battery pack 227. The high temperature liquid flows back to the integrated kettle pump 232.

It can be learned that in this embodiment of this application, when the refrigerant four-way valve is not used, and when the refrigerant loop has only one flow direction, a cooling function and/or a heating function are/is implemented on the passenger compartment, and/or a cooling function and/or a heating function are/is implemented on the battery pack, by using a heat pump air-conditioning system. After a position of the water path four-way reversing valve is changed, the coolant passes through the plate heat exchanger 204 which is at the rear of the refrigerant loop and then the plate heat exchanger 202 which is at the front. This improves energy efficiency of the system during cooling, and reduces energy consumption of the system during cooling.

Three plate heat exchangers are designed, so that the refrigerant in the refrigerant loop can exchange heat with the coolant in the motor liquid cooling loop by using the plate heat exchanger, exchange heat with the coolant in the warm-air liquid cooling loop by using the plate heat exchanger, and exchange heat with the coolant in the battery liquid cooling loop by using the plate heat exchanger. Therefore, use of a parallel-flow heat exchanger is avoided. Because the plate heat exchanger has a relatively small volume, a structural integration solution of the thermal management system can be implemented by using the plate heat exchanger and according to a coolant heat exchange method, and main components in the system can be integrated into different integrated bodies. An electronic control integration solution of the thermal management system can also be implemented to shorten refrigerant pipes and electric control wires. In addition, this embodiment of this application may also be applicable to various actual application scenarios, for example, cooling/heating/dehumidification of the passenger compartment, battery cooling/heating, and motor cooling/heat recovery. Therefore, this embodiment of this application helps reduce space occupied by a front compartment in the thermal management system, and also helps reduce costs of the thermal management system.

Figure 25:
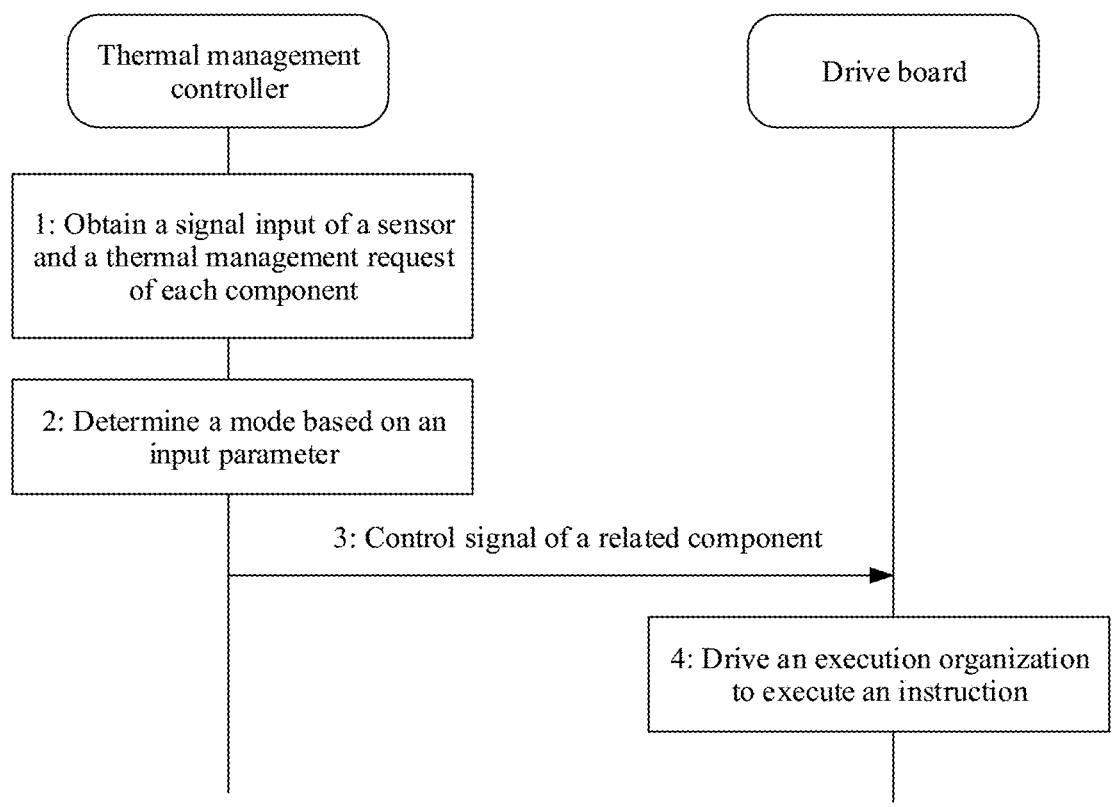
FIG. 25 is a schematic flowchart of a thermal management method according to an embodiment of this application.

The foregoing describes various thermal management systems and various specific application scenarios of the thermal management systems in the embodiments of this application. The following describes thermal management methods of the thermal management controller for the various thermal management systems. Referring to FIG. 25, the method includes but is not limited to the following steps.

Step S1: Obtain data. In the step, before working, a thermal management controller obtains a signal of a sensor installed on a pipe of a thermal management system and a thermal management request of another controller (for example, an air conditioning board controller), such as a temperature signal, a pressure signal, a humidity signal, and a battery heating/cooling request.

Step S2: Determine a mode. In the step, the thermal management controller performs data processing and determining on the obtained data according to a set thermal management policy, and determines a most suitable vehicle thermal management system mode through integration based on different thermal management requests. The thermal management controller calculates a working state of each component according to a set thermal management policy and the determined system mode. For example, in a cooling mode, the thermal management controller calculates rotational speed requirements of a compressor and a water pump, and a switch requirement of each valve, and then, generates a control signal (or referred to as a control instruction, or referred to as control information, or referred to as a requirement signal) for a related controlled component of the thermal management system. The related controlled components are several components that can actively provide a cooling flow, a heating flow, and a water flow that are required by the thermal management system. For example, thermal management components are the compressor, the water pump, a throttle device, a heat exchanger, a gas-liquid separator, a solenoid valve, and a valve.

Step S3: Output a signal. In the step, the thermal management controller sends these control signals to a drive board. The drive board separates, from an execution mechanism, a drive unit (or referred to as a drive circuit, or referred to as a drive element, or referred to as a drive module, or referred to as a drive single board) of the controlled component such as the water pump, the valve, the compressor, or the throttle device. Then, the drive units of the controlled components are jointly integrated on a drive board (or referred to as an integrated drive board, or referred to as an integrated circuit board). For related content, refer to the foregoing description of electric control integration.

Step S4: Drive the execution. In the step, the integrated drive board performs signal conversion based on the control signal sent by the thermal management controller, and further drives the different thermal management components (the controlled components) to execute the corresponding instructions, to implement functions of various specific application scenarios in the thermal management system, for example, cooling/heating/dehumidification in a passenger compartment, battery cooling/heating, and motor cooling/heat recovery.

It can be seen that, in this embodiment of this application, because an electric control integration integrates an independent drive board of each thermal management component into an integrated drive board, a thermal management controller only needs to send the control signal (a requirement signal) to the integrated drive board, and subsequently, the integrated drive board performs corresponding signal conversion based on the control signal (the requirement signal), and simultaneously drives execution mechanisms of the plurality of components to execute corresponding instructions. Therefore, this application can effectively shorten a wire length of the thermal management system, save cabling space, reduce cabling costs, and further ensure normal implementation of functions in various specific application scenarios.

The heat management system and the control method provided in the embodiments of this application are described in detail above. The principle and implementation of this application are described herein through specific examples. The description about the embodiments is merely provided to help understand the method and core ideas of this application. In addition, persons of ordinary skill in the art can make variations and modifications to this application in terms of the specific implementations and application scopes according to the ideas of this application. Therefore, the content of specification shall not be construed as a limit to this application.

What is claimed is:
1. A system, comprising:
   a refrigerant loop system comprising:
      a compressor comprising an inlet and an outlet;
      a refrigerant four-way reversing valve comprising:
         a first end coupled to the outlet using a pipe;
         a second end;
         a third end; and a fourth end;
a first plate heat exchanger comprising a first liquid cooling channel and a first refrigerant channel, wherein the first refrigerant channel comprises:
 a fifth end coupled to the second end; and
 a sixth end;
a throttle valve comprising:
 a seventh end coupled to the sixth end; and
 an eighth end;
a second plate heat exchanger comprising a second liquid cooling channel and a second refrigerant channel, wherein the second refrigerant channel comprises:
 a ninth end coupled to the seventh end; and
 a tenth end coupled to the third end; and
a gas-liquid separator comprising:
 an eleventh end coupled to the fourth end; and
 a twelfth end coupled to the inlet;
a motor liquid cooling loop system comprising a motor liquid cooling loop configured to circulate coolant through a motor, wherein first pipes in the motor liquid cooling loop are respectively connected to a thirteenth end and a fourteenth end of the first liquid cooling channel, and wherein the motor liquid cooling loop system and the refrigerant loop system are configured to exchange heat using the first plate heat exchanger;
an air conditioner liquid cooling loop system comprising an air conditioner liquid cooling loop configured to circulate the coolant through a heating, ventilation, and air conditioning (HVAC) device, and comprising second pipes that are respectively connected to a fifteenth end and a sixteenth end of the second liquid cooling channel, wherein the air conditioner liquid cooling loop system and the refrigerant loop system are configured to exchange the heat using the second plate heat exchanger; and
a battery liquid cooling loop system comprising a battery liquid cooling loop configured to circulate the coolant through a battery pack and connect the second pipes to the fifteenth end and the sixteenth end,
wherein the battery liquid cooling loop system and the refrigerant loop system are configured to exchange the heat using the second plate heat exchanger.

2. The system of claim 1, wherein the system is applied to an electric vehicle or a hybrid vehicle.

3. The system of claim 1, wherein the motor liquid cooling loop system further comprises:
a multi-functional valve coupled to the thirteenth end and configured to implement a water pump function, a water flow reversing function, and a water storage function;
a power device;
a motor controller;
a motor;
a radiator heat exchanger; and
an integrated valve coupled to the fourteenth end and the motor and configured to implement the water flow reversing function, wherein the multi-functional valve, the power device, the motor controller, the motor, the radiator heat exchanger, and the integrated valve are serially connected.

4. The system of claim 3, wherein the air conditioner liquid cooling loop system further comprises:
an air conditioner heat exchanger connected to the fifteenth end; and
an integrated valve pump connected to the air conditioner heat exchanger and the sixteenth end.

5. The system of claim 4, wherein the battery pack is connected to the fifteenth end, wherein the battery liquid cooling loop system further comprises an electric heater, wherein the battery pack, the electric heater, and the integrated valve pump are serially connected, and wherein the integrated valve pump is configured to implement the water pump function and the water flow reversing function.

6. The system of claim 5, further comprising a warm-air liquid cooling loop system, wherein the warm-air liquid cooling loop system comprises a warm-air liquid cooling loop configured to circulate the coolant through a heater core, and wherein the warm-air liquid cooling loop comprises:
an integrated kettle pump configured to implement the water pump function and the water storage function; and
an electric heater, wherein the integrated kettle pump, the electric heater, and the heater core are serially connected.

7. The system of claim 6, wherein the integrated kettle pump comprises:
a first water pump coupled to the electric heater; and
a first expansion kettle coupled to the first water pump and the heater core.

8. The system of claim 7, wherein the multi-functional valve comprises:
a second water pump coupled to the power device;
a second expansion kettle coupled to the second water pump; and
a first water path three-way valve comprising:
 a seventeenth end coupled to the second expansion kettle;
 an eighteenth end coupled to the battery pack; and
 a nineteenth end coupled to the thirteenth end.

9. The system of claim 8, wherein the integrated valve comprises:
a second water path three-way valve comprising:
 a twentieth end coupled to the motor;
 a twenty-first end coupled to the radiator heat exchanger; and
 a twenty-second end, and
wherein a three-way water pipe comprises:
 a twenty-third end coupled to the twenty-second end;
 a twenty-fourth end coupled to the fourteenth end; and
 a twenty-fifth end coupled to the integrated valve pump.

10. The system of claim 9, wherein the integrated valve pump comprises:
a third water pump coupled to the sixteenth end; and
a third water path three-way valve comprising:
 a twenty-sixth end coupled to the third water pump;
 a twenty-seventh end coupled to the three-way water pipe and the electric heater; and
 a twenty-eighth end coupled to the air conditioner heat exchanger.

11. The system of claim 9, wherein at least one of the integrated kettle pump, the multi-functional valve, the integrated valve, or the integrated valve pump is configured as an integrated structure.

12. A system comprising:
a refrigerant loop system comprising a compressor, a first plate heat exchanger comprising a first liquid cooling channel, a first throttle valve, a second plate heat exchanger comprising a second liquid cooling channel, a second throttle valve, an air conditioner evaporator, a gas-liquid separator, and a refrigerant branch, wherein the refrigerant branch comprises a third throttle valve and a third plate heat exchanger comprising a third liquid cooling channel and a fourth liquid cooling channel, wherein the compressor, the first plate heat exchanger, the first throttle valve, the second plate heat exchanger, the second throttle valve, the air conditioner evaporator, and the gas-liquid separator are serially connected to form a first refrigerant loop, and wherein the compressor, the first plate heat exchanger, the first throttle valve, the second plate heat exchanger, the third throttle valve, the third plate heat exchanger, and the gas-liquid separator are serially connected to form a second refrigerant loop;

a motor liquid cooling loop system comprising a motor liquid cooling loop configured to circulate coolant through a motor, wherein first pipes in the motor liquid cooling loop are respectively connected to a first end and a second end of the second liquid cooling channel, and wherein the motor liquid cooling loop system and the refrigerant loop system are configured to exchange heat using the second plate heat exchanger;

a warm-air liquid cooling loop system comprising a warm-air liquid cooling loop configured to circulate the coolant through a heater core, and comprising second pipes that are respectively connected to a third end and a fourth end of the first liquid cooling channel, wherein the warm-air liquid cooling loop system and the refrigerant loop system are configured to exchange the heat using the first plate heat exchanger; and a battery liquid cooling loop system comprising a battery liquid cooling loop configured to circulate the coolant through a battery pack and comprising two pipes that are respectively connected to a seventeenth end and an eighteenth end of the third liquid cooling channel, wherein the second pipes are respectively connected to a nineteenth end and a twentieth end of the fourth liquid cooling channel, wherein the battery liquid cooling loop system and the refrigerant loop system are configured to exchange the heat using the third plate heat exchanger, and wherein either the warm-air liquid cooling loop system and the refrigerant loop system are configured to exchange the heat using the third plate heat exchanger, or wherein the warm-air liquid cooling loop system and the battery liquid cooling loop system are configured to exchange the heat using the third plate heat exchanger.

13. The system of claim 12, wherein the compressor comprises an inlet and an outlet, wherein the first plate heat exchanger comprises a first refrigerant channel, wherein the first refrigerant channel comprises:
a fifth end coupled to the outlet using a pipe; and
a sixth end,
wherein the first throttle valve comprises:
a seventh end coupled to the sixth end; and
an eighth end,
wherein the second plate heat exchanger comprises a second refrigerant channel, wherein the second refrigerant channel comprises:
a ninth end coupled to the eighth end; and
a tenth end,
wherein the second throttle valve comprises:
an eleventh end coupled to the tenth end; and
a twelfth end,
wherein the air conditioner evaporator comprises:
a thirteenth end coupled to the twelfth end; and
a fourteenth end, and
wherein the gas liquid separator comprises:
a fifteenth end coupled to the fourteenth end; and
a sixteenth end coupled to the inlet.

14. The system of claim 12, wherein the system is applied to an electric vehicle.

15. The system of claim 12, wherein the system is applied to a hybrid vehicle.

16. The system of claim 12, wherein the third throttle valve comprises:
a twenty-first end coupled to the tenth end;
a twenty-second end,
wherein the third plate heat exchanger comprises a third refrigerant channel comprising:
a twenty-third end coupled to the twenty-second end; and
a twenty-fourth end coupled to the fifteenth end.

17. The system of claim 16, wherein the motor liquid cooling loop system further comprises:
a power device connected to the first end;
a motor controller;
a radiator heat exchanger;
a multi-functional valve body coupled to the second end and the fourth end and, configured to implement a water pump function, a water flow reversing function, and a water storage function; and
a motor coupled to the multi-functional valve body, wherein the power device, the motor controller, the motor, the radiator heat exchanger, and the multi-functional valve body are serially connected.

18. The system of claim 17, wherein the battery liquid cooling loop system further comprises an integrated kettle pump coupled to the seventeenth end and configured to implement the water pump function and the water storage function, and wherein the battery pack is coupled to the integrated kettle pump and the eighteenth end.

19. The system of claim 18, wherein the warm-air liquid cooling loop system further comprises the multi-functional valve body, an electric heater, and the heater core, wherein the multi-functional valve body, the electric heater, and the heater core are serially connected, and wherein the multi-functional valve body is further coupled to the fourth end, the nineteenth end, and the twentieth end.

20. The system of claim 19, wherein the multi-functional valve body comprises:
a first water pump coupled to the fourth end and the nineteenth end;
a second water pump coupled to the second end;
a first three-way water valve coupled to the motor and radiator heat exchanger;
a second three-way water valve coupled to the twentieth end and the heater core;
a kettle coupled to the second water pump; and
a water path four-way valve coupled to the first water pump, the first three-way water valve, the second three-way water valve, and the kettle.

* * * * *